(12) United States Patent
Ko et al.

(10) Patent No.: US 11,402,937 B2
(45) Date of Patent: Aug. 2, 2022

(54) TOUCH SENSOR AND DISPLAY DEVICE HAVING THE SAME

(71) Applicant: Samsung Display Co., Ltd., Yongin-si (KR)

(72) Inventors: Gwang Bum Ko, Yongin-si (KR); Sang Hyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/134,463

(22) Filed: Dec. 27, 2020

(65) Prior Publication Data

US 2021/0357056 A1 Nov. 18, 2021

(30) Foreign Application Priority Data

May 12, 2020 (KR) .................. 10-2020-0056710

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05); *G06F 3/0445* (2019.05); *G06F 3/0446* (2019.05); *G06F 3/0448* (2019.05)

(58) Field of Classification Search
CPC ................ G06F 3/0443; G06F 3/0448; G06F 3/044–0448; G06F 3/0446; G06F 3/0412; G06F 3/0445; G06F 3/03547; G06F 3/04164; G06F 3/047; G06F 3/0416
See application file for complete search history.

(56) References Cited

U.S. PATENT DOCUMENTS

| 9,323,295 | B2 | 4/2016 | Chang et al. | |
| 9,658,726 | B2 | 5/2017 | Rowe et al. | |
| 10,108,289 | B2 | 10/2018 | Kim | |
| 2009/0273573 | A1* | 11/2009 | Hotelling | G06F 3/0445 345/173 |
| 2010/0295819 | A1* | 11/2010 | Ozeki | G06F 3/0443 345/174 |
| 2010/0301879 | A1* | 12/2010 | Philipp | H03K 17/962 324/679 |

(Continued)

FOREIGN PATENT DOCUMENTS

| KR | 10-1471349 | 12/2014 |
| KR | 10-2015-0114405 | 10/2015 |

(Continued)

*Primary Examiner* — Sanjiv D. Patel
(74) *Attorney, Agent, or Firm* — H.C. Park & Associates, PLC

(57) ABSTRACT

A touch sensor for a display device includes: a sensing area having a closed shape and including a plurality of sections, and a non-sensing area at least partially surrounding the sensing area; first touch electrodes disposed in the sensing area; and second touch electrodes disposed in the sensing area. The first touch electrodes include first groups of first sub-touch electrodes, and first sub-touch electrodes of at least some of the first groups are spaced at a first substantially equal distance from a center of the closed shape. The second touch electrodes include second groups of second sub-touch electrodes, and second sub-touch electrodes of at least some of the second groups are spaced at a second substantially equal distance from the center of the closed shape.

24 Claims, 48 Drawing Sheets

(56) References Cited

U.S. PATENT DOCUMENTS

| | | | |
|---|---|---|---|
| 2017/0147106 A1* | 5/2017 | Kwon | G06F 3/04883 |
| 2017/0307924 A1* | 10/2017 | Liu | G02F 1/13338 |
| 2019/0235678 A1* | 8/2019 | Kim | G06F 3/0445 |
| 2020/0201462 A1 | 6/2020 | Ko et al. | |

FOREIGN PATENT DOCUMENTS

| | | |
|---|---|---|
| KR | 10-1786119 | 10/2017 |
| KR | 10-2019-0001977 | 1/2019 |
| WO | 2010/099132 | 4/2011 |

* cited by examiner

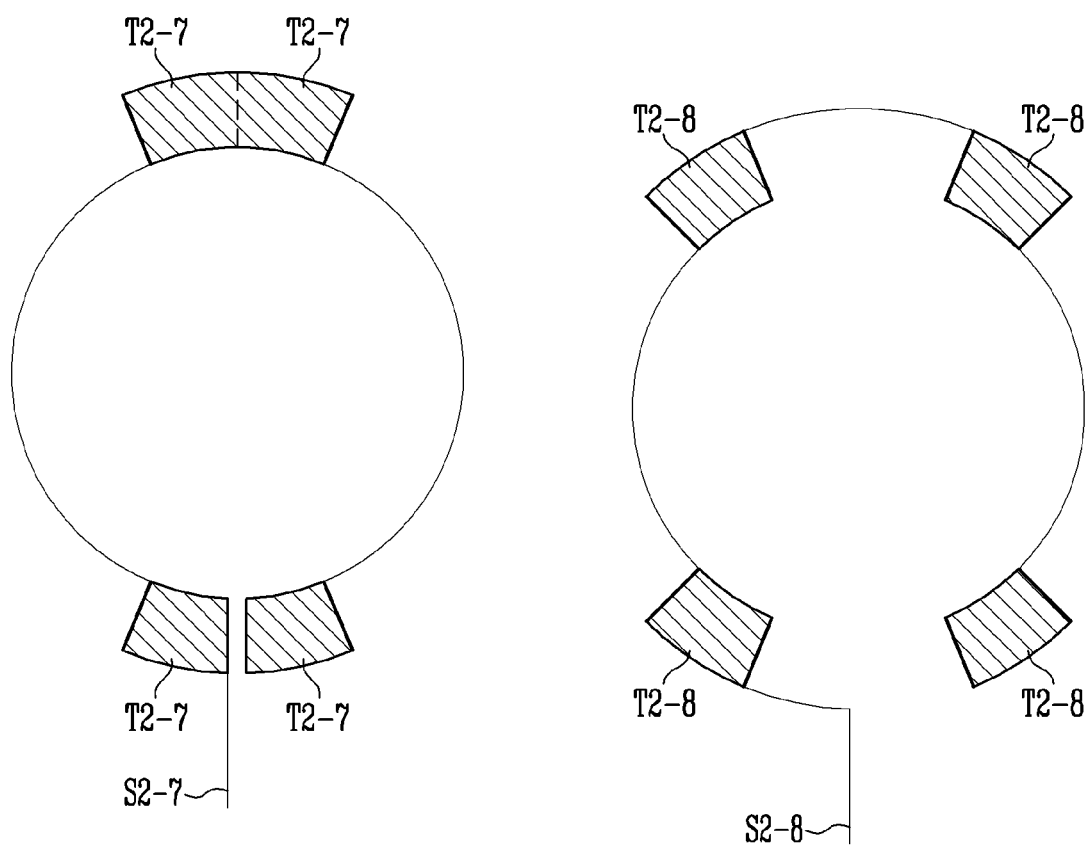

FIG. 40
FIG. 41
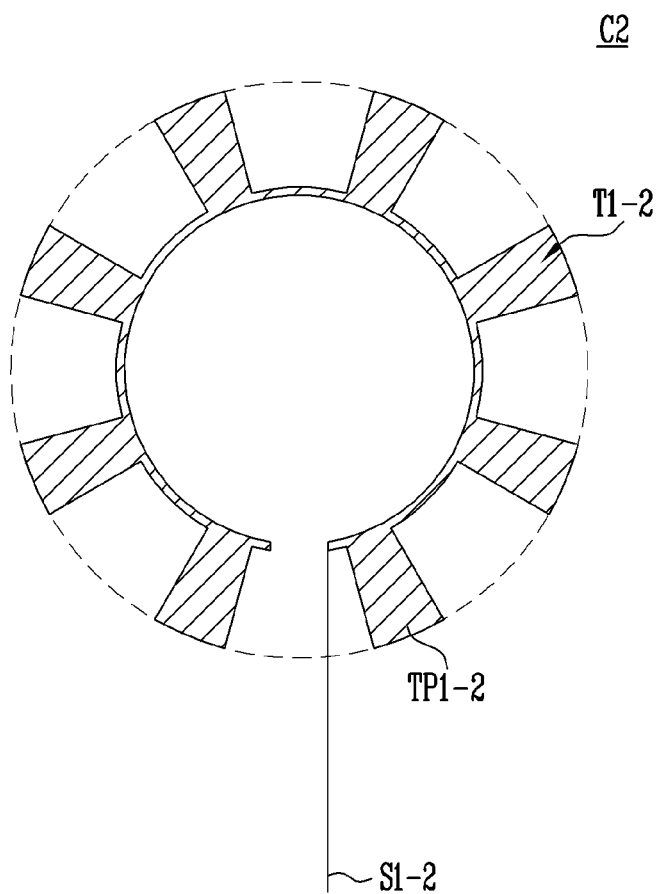
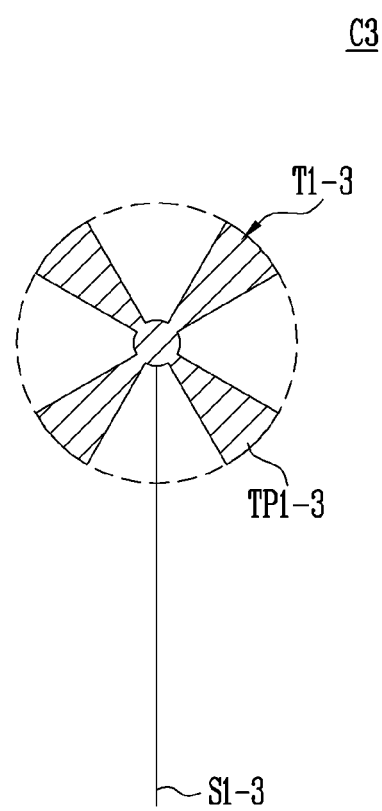

TOUCH SENSOR AND DISPLAY DEVICE HAVING THE SAME

CROSS-REFERENCE TO RELATED APPLICATION

This application claims priority from and the benefit of Korean Patent Application No. 10-2020-0056710 filed on May 12, 2020, which is hereby incorporated by reference for all purposes as if fully set forth herein.

BACKGROUND

Field

Exemplary implementations of the invention relate generally to display devices and, more specifically, to a touch sensor and a display device having the touch sensor.

Discussion of the Background

Mobile devices have evolved in various forms, and small-sized mobile devices, such as smartwatches, have recently been developed.

A smartwatch not only provides visual information to a user, but also supports various functions, such as calls, emails, messages (short message service (SMS) and multimedia message service (MMS)), social network service (SNS), music, pictures, a camera, video, near-field communication (NFC), global positioning system (GPS), Wi-Fi, FM radio, travel distance or velocity checking, and interworking with other devices, for example, a smartphone, a tablet PC or a laptop computer.

A display device, which is implemented to provide visual information, may be used in mobile devices for various purposes. For example, the display device may be applied to small-sized mobile devices such as smartwatches. The mobile devices and/or the display devices may include touch sensors as well. The shape of the touch sensor should conform to the shape of the mobile device and/or the display device.

The above information disclosed in this Background section is only for understanding of the background of the inventive concepts, and, therefore, it may contain information that does not constitute prior art.

SUMMARY

Applicant realized that the sensitivity of touch sensors having a shape that conforms to the shape of the touch sensor can be improved when the electrodes and signal lines are designed to account for the shape of the touch sensor, such as a circular shape commonly used in smartwatches Touch sensors and display devices including the same constructed according to the principles and exemplary implementations of the invention have improved touch-sensing sensitivity. For example, the touch sensor may include a decreased number of internal lines in the sensing area, which may allow the sensing area to have an increased area of touch electrodes while having a decreased area of the internal lines. Accordingly, a loss in the size of the sensing area may be reduced and/or prevented, and thus the touch-sensing sensitivity may be improved.

Additional features of the inventive concepts will be set forth in the description which follows, and in part will be apparent from the description, or may be learned by practice of the inventive concepts.

According to one aspect of the invention, a touch sensor for a display device includes: a sensing area having a closed shape and including a plurality of sections, and a non-sensing area at least partially surrounding the sensing area; first touch electrodes disposed in the sensing area; and second touch electrodes disposed in the sensing area, wherein the first touch electrodes include first groups of first sub-touch electrodes, and first sub-touch electrodes of at least some of the first groups are spaced at a first substantially equal distance from a center of the closed shape, and wherein the second touch electrodes include second groups of second sub-touch electrodes, and second sub-touch electrodes of at least some of the second groups are spaced at a second substantially equal distance from the center of the closed shape.

The first sub-touch electrodes of the first groups disposed in each of the sections may be connected to receive a common signal.

The touch sensor may further include coupling pads disposed in the non-sensing area, wherein the first sub-touch electrodes of the first groups may be respectively coupled to first signal lines, and the first signal lines coupled to the first sub-touch electrodes of the first groups disposed in each of the sections may be electrically coupled to one of the coupling pads.

The closed shape may include a closed curve, at least some of the first groups of first sub-touch electrodes may form a first ring, and at least some of the second groups of second sub-touch electrodes may form a second ring, and the sections may include partition regions. The partition regions may include first to fourth partition regions, the first sub-touch electrodes of the first groups may include one or more of 1-1-th sub-touch electrodes, one or more of 1-2-th sub-touch electrodes, one or more of 1-3-th sub-touch electrodes, and one or more of 1-4-th sub-touch electrodes in each of the first to fourth partition regions, and numbers of the one or more of 1-1-th sub-touch electrodes, the one or more of 1-2-th sub-touch electrodes, the one or more of 1-3-th sub-touch electrodes, and the one or more of 1-4-th sub-touch electrodes may be identical to each other.

In one of the first touch electrodes and one of the second touch electrodes corresponding to each other, a number of the second sub-touch electrodes of the second groups may be greater than a number of the first sub-touch electrodes of the first groups, and the numbers of the second sub-touch electrodes of the second groups may be different from each other.

The second sub-touch electrodes of the second groups may be disposed in the partition regions, and at least some of the second sub-touch electrodes of the second ring spaced at a third substantially equal distance along the second ring from a boundary between the partition regions may be coupled to a second signal line.

A number of second sub-touch electrodes of one of the second groups may be greater than a number of second sub-touch electrodes of another one of the second groups closer to the center than the one of the second groups.

According to another aspect of the invention, a display device includes: a display panel; and a touch sensor disposed on the display panel, wherein the touch sensor includes: a sensing area having a closed shape and including a plurality of sections, and a non-sensing area at least partially surrounding the sensing area; first touch electrodes disposed in the sensing area; and second touch electrodes disposed in the sensing area, wherein the first touch electrodes include first groups of first sub-touch electrodes, and first sub-touch electrodes of at least some of the first groups are spaced at a first substantially equal distance from a center of the closed shape, and wherein the second touch electrodes include second groups of second sub-touch electrodes, and second sub-touch electrodes of at least some of the second groups are spaced at a second substantially equal distance from the center of the closed shape.

The first sub-touch electrodes of the first groups disposed in each of the sections may be connected to receive a common signal.

The display device may further include coupling pads disposed in the non-sensing area, wherein the first sub-touch electrodes of the first groups may be respectively coupled to first signal lines, and the first signal lines coupled to the first sub-touch electrodes of the first groups disposed in each of the sections may be electrically coupled to one of the coupling pads.

The closed shape may include a closed curve, at least some of the first groups of first sub-touch electrodes may form a first ring, and at least some of the second groups of second sub-touch electrodes may form a second ring, and the sections may include partition regions. The partition regions may include first to fourth partition regions, the first sub-touch electrodes of the first groups may include one or more of 1-1-th sub-touch electrodes, one or more of 1-2-th sub-touch electrodes, one or more of 1-3-th sub-touch electrodes, and one or more of 1-4-th sub-touch electrodes in each of the first to fourth partition regions, numbers of the one or more of 1-1-th sub-touch electrodes, the one or more of 1-2-th sub-touch electrodes, the one or more of 1-3-th sub-touch electrodes, and the one or more of 1-4-th sub-touch electrodes are identical to each other, in one of the first touch electrodes and one of the second touch electrodes corresponding to each other, a number of the second sub-touch electrodes of the second groups may be greater than a number of the first sub-touch electrodes of the first groups, and the numbers of the second sub-touch electrodes of the second groups may be different from each other.

The second sub-touch electrodes of the second groups are disposed in the partition regions, and at least some of the second sub-touch electrodes of the second ring spaced at a third substantially equal distance along the second ring from a boundary between the partition regions are coupled to a second signal lines.

According to still another aspect of the invention, a touch sensor for a display device includes: a sensing area having a closed curve shape and a non-sensing area at least partially surrounding the sensing area; a first touch electrode disposed in the sensing area; and a second touch electrode disposed in the sensing area, wherein the first touch electrode includes a plurality of first sub-touch electrodes in the form of first generally concentric circles, and each of the first sub-touch electrodes includes a plurality of first touch patterns, and wherein the second touch electrode includes a plurality of second sub-touch electrodes in the form of second generally concentric circles concentric with the first concentric circles, and each of the second sub-touch electrodes includes a plurality of second touch patterns.

The first sub-touch electrodes may include 1-1-th to 1-3-th sub-touch electrodes; the 1-1-th sub-touch electrode may include a plurality of 1-1-th touch patterns electrically coupled to each other through a 1-1-th signal line; the 1-2-th sub-touch electrode may include a plurality of 1-2-th touch patterns electrically coupled to each other through a 1-2-th signal line; and the 1-3-th sub-touch electrode may include a plurality of 1-3-th touch patterns electrically coupled to each other through a 1-3-th signal line.

The second sub-touch electrodes may include 2-1-th to 2-3-th sub-touch electrodes, the second touch patterns of the 2-1-th sub-touch electrode may include a plurality of touch pattern pairs, and each of the touch pattern pairs of the 2-1-th sub-touch electrode is arranged on both sides of a corresponding one of the 1-1-th touch patterns, the second touch patterns of the 2-2-th sub-touch electrode may include a plurality of touch pattern pairs, and each of the touch pattern pairs of the 2-2-th sub-touch electrode is arranged on both sides of a corresponding one of the 1-2-th touch patterns, and the second touch patterns of the 2-3-th sub-touch electrode may include a plurality of touch pattern pairs, and each of the touch pattern pairs of the 2-3-th sub-touch electrode is arranged on both sides of a corresponding one of the 1-3-th touch patterns.

A number of the 1-1-th touch patterns may be greater than a number of the 1-2-th touch patterns and the number of the 1-2-th touch patterns may be greater than a number of the 1-3-th touch patterns, and a number of the touch pattern pairs of the 2-1-th sub-touch electrode may be identical to the number of the 1-1-th touch patterns, a number of the touch pattern pairs of the 2-2 sub-touch electrode may be identical to the number of the 1-2-th touch patterns, and a number of the touch pattern pairs of the 2-3-th sub-touch electrode may be identical to the number of the 1-3-th touch patterns.

The 1-1-th sub-touch electrode may include a 1-11-th sub-touch electrode and a 1-12-th sub-touch electrode, the 1-11-th sub-touch electrode may include a plurality of 1-11-th touch patterns electrically coupled to each other through a 1-11-th signal line, and the 1-12-th sub-touch electrode may include a plurality of 1-12-th touch patterns electrically coupled to each other through a 1-12-th signal line.

The 1-1-th sub-touch electrode may include a 1-11-th sub-touch electrode and a 1-12-th sub-touch electrode, wherein the 1-11-th sub-touch electrode may include a plurality of 1-11 touch patterns electrically coupled to each other through a 1-11-th signal line, and the 1-12-th sub-touch electrode may include a plurality of 1-12-th touch patterns electrically coupled to each other through a 1-12-th signal line, and the 1-2-th sub-touch electrode may include a 1-21-th sub-touch electrode and a 1-22-th sub-touch electrode, wherein the 1-21-th sub-touch electrode may include a plurality of 1-21 touch patterns electrically coupled to each other through a 1-21-th signal line and the 1-22-th sub-touch electrode may include a plurality of 1-22-th touch patterns electrically coupled to each other through a 1-22-th signal line.

According to yet another aspect of the invention, a display device includes: a display panel; and a touch sensor disposed on the display panel, wherein the touch sensor includes: a sensing area having a closed curve shape and a non-sensing area at least partially surrounding the sensing area; a first touch electrode disposed in the sensing area; and a second touch electrode disposed in the sensing area, wherein the first touch electrode includes a plurality of first sub-touch electrodes in the form of first generally concentric circles, and each of the first sub-touch electrodes includes a plurality of first touch patterns, and wherein the second touch electrode includes a plurality of second sub-touch electrodes in the form of second generally concentric circles concentric with the first concentric circles, and each of the second sub-touch electrodes includes a plurality of second touch patterns.

The first sub-touch electrodes may include 1-1-th to 1-3-th sub-touch electrodes, the 1-1-th sub-touch electrode may include a plurality of 1-1-th touch patterns electrically coupled to each other through a 1-1-th signal line, the 1-2-th sub-touch electrode may include a plurality of 1-2-th touch patterns electrically coupled to each other through a 1-2-th signal line, and the 1-3-th sub-touch electrode may include a plurality of 1-3-th touch patterns electrically coupled to each other through a 1-3-th signal line.

The second sub-touch electrodes may include 2-1-th to 2-3-th sub-touch electrodes, the second touch patterns of the 2-1-th sub-touch electrode may include a plurality of touch pattern pairs, and each of the touch pattern pairs of the 2-1-th sub-touch electrode may be arranged on both sides of a corresponding one of the 1-1-th touch patterns, the second touch patterns of the 2-2-th sub-touch electrode may include a plurality of touch pattern pairs, and each of the touch pattern pairs of the 2-2-th sub-touch electrode may be arranged on both sides of a corresponding one of the 1-2-th touch patterns, and the second touch patterns of the 2-3-th sub-touch electrode may include a plurality of touch pattern pairs, and each of the touch pattern pairs of the 2-3-th sub-touch electrode may be arranged on both sides of a corresponding one of the 1-3-th touch patterns.

A number of the 1-1-th touch patterns may be greater than a number of the 1-2-th touch patterns and the number of the 1-2-th touch patterns may be greater than a number of the 1-3-th touch patterns, and a number of the touch pattern pairs of the 2-1-th sub-touch electrode may be identical to the number of the 1-1-th touch patterns, a number of the touch pattern pairs of the 2-2 sub-touch electrode may be identical to the number of the 1-2-th touch patterns, and a number of the touch pattern pairs of the 2-3-th sub-touch electrode may be identical to the number of the 1-3-th touch patterns.

The 1-1-th sub-touch electrode may include a 1-11-th sub-touch electrode and a 1-12-th sub-touch electrode, the 1-11-th sub-touch electrode may include a plurality of 1-11-th touch patterns electrically coupled to each other through a 1-11-th signal line, and the 1-12-th sub-touch electrode may include a plurality of 1-12-th touch patterns electrically coupled to each other through a 1-12-th signal line.

The 1-1-th sub-touch electrode may include a 1-11-th sub-touch electrode and a 1-12-th sub-touch electrode, wherein the 1-11-th sub-touch electrode may include a plurality of 1-11 touch patterns electrically coupled to each other through a 1-11-th signal line, and the 1-12-th sub-touch electrode may include a plurality of 1-12-th touch patterns electrically coupled to each other through a 1-12-th signal line, and the 1-2-th sub-touch electrode may include a 1-21-th sub-touch electrode and a 1-22-th sub-touch electrode, wherein the 1-21-th sub-touch electrode may include a plurality of 1-21 touch patterns electrically coupled to each other through a 1-21-th signal line and the 1-22-th sub-touch electrode may include a plurality of 1-22-th touch patterns electrically coupled to each other through a 1-22-th signal line.

According to still yet aspect of the invention, a touch sensor for a display device includes: a sensing area having a closed shape and a non-sensing area at least partially surrounding the sensing area; and a first touch electrode and a second touch electrode disposed in the sensing area, wherein the first touch electrode includes a plurality of first columns, each including a plurality of first sub-touch electrodes, wherein the second touch electrode includes a plurality of second columns each including a plurality of second sub-touch electrodes and arranged alternately with the first columns, wherein the first sub-touch electrodes of the first columns are arranged in rows, and some of the first sub-touch electrodes of the first columns arranged in one of the rows are electrically coupled to each other, and wherein, in at least one of the second columns, some of the second sub-touch electrodes spaced apart from each other with another one of the second sub-touch electrodes therebetween are electrically coupled to each other.

The closed shape may include a closed curve, the first columns may include 1-1-th to 1-5-th touch electrode columns, each including 1-1-th to 1-3-th sub-touch electrodes of the first sub-touch electrodes, the 1-1-th to 1-3-th sub-touch electrodes may be coupled to 1-1-th to 1-3-th signal lines, respectively, the second columns may include 2-1-th to 2-4-th touch electrode columns, each including 2-1-th to 2-4-th sub-touch electrodes of the second sub-touch electrodes, in the 2-1-th touch electrode column, the 2-1-th sub-touch electrode and the 2-3-th sub-touch electrode may be coupled to a 2-1-th signal line, and the 2-2-th sub-touch electrode and the 2-4-th sub-touch electrode may be coupled to a 2-2-th signal line, in the 2-2-th touch electrode column, the 2-1-th sub-touch electrode and the 2-3-th sub-touch electrode may be coupled to a 2-3-th signal line, and the 2-2-th sub-touch electrode and the 2-4-th sub-touch electrode may be coupled to a 2-4-th signal line, in the 2-3-th touch electrode column, the 2-1-th sub-touch electrode and the 2-3-th sub-touch electrode may be coupled to a 2-5-th signal line, and the 2-2-th sub-touch electrode and the 2-4-th sub-touch electrode may be coupled to a 2-6-th signal line, and in the 2-4-th touch electrode column, the 2-1-th sub-touch electrode and the 2-3-th sub-touch electrode may be coupled to a 2-7-th signal line, and the 2-2-th sub-touch electrode and the 2-4-th sub-touch electrode may be coupled to a 2-8-th signal line.

The touch sensor may further include 1-4-th to 1-6-th signal lines respectively coupled to the 1-1-th to 1-3-th sub-touch electrodes in the 1-5-th touch electrode column.

The touch sensor may further include: a 1-7-th signal line coupled to the 1-1-th sub-touch electrode in the 1-3-th touch electrode column.

The 1-1-th sub-touch electrode in the 1-3-th touch electrode column may include a 1-11-th sub-touch electrode and a 1-12-th sub-touch electrode spaced apart from each other, the 1-11-th sub-touch electrode may be coupled to a 1-71-th signal line, and the 1-12-th sub-touch electrode is coupled to a 1-72-th signal line, and the 1-11-th sub-touch electrode may be electrically coupled to the 1-1-th sub-touch electrodes in the 1-1-th and 1-2-th touch electrode columns, and the 1-12-th sub-touch electrode may be electrically coupled to the 1-1-th sub-touch electrodes in the 1-4-th and 1-5-th touch electrode columns.

The touch sensor may further include: a 1-8-th signal line coupled to the 1-2-th sub-touch electrode in the 1-3-th touch electrode column, wherein the 1-8-th signal line passes through a space between the 1-11-th sub-touch electrode and the 1-12-th sub-touch electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIGS. 20 to 23 are plan views of the 2-7-th to 2-10-th sub-touch electrodes of FIG. 19.

FIG. 40 is a plan view of a 1-2-th sub-touch electrode of the first touch electrode of FIG. 37.

FIG. 41 is a plan view of a 1-3-th sub-touch electrode of the first touch electrode of in FIG. 37.

DETAILED DESCRIPTION

Figure 1:
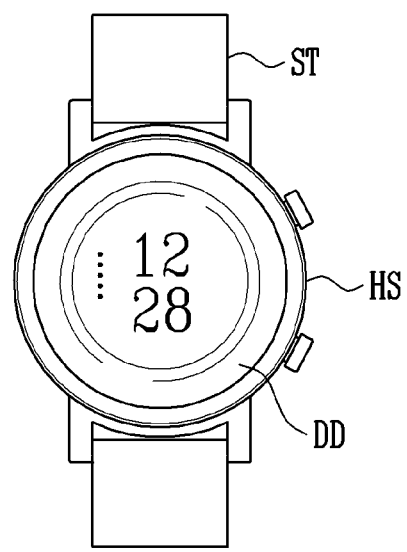
FIGS. 1 and 2 are plan views of exemplary embodiments of mobile devices having display devices constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order.

For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
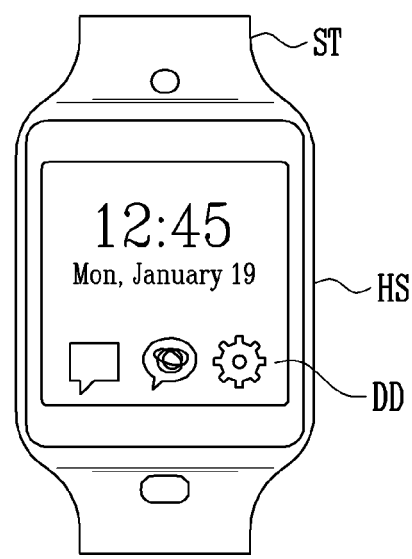

FIGS. 1 and 2 are plan views of exemplary embodiments of mobile devices having display devices constructed according to the principles of the invention.

Referring to FIGS. 1 and 2, a small-sized mobile device, among mobile devices, has been developed in a form which is capable of being attached to a part of a user's body while providing visual information to the user. In particular, a small-sized mobile device such as a smartwatch may be directly worn by the user.

A smartwatch may include a display device DD, which provides information to the user, a housing HS, which accommodates the display device DD, and a strap ST, which is coupled to the housing HS to allow the user to wear the smartwatch. The display device DD may include a display panel, which displays information, and a touch sensor, which allows the user to input information.

Furthermore, the display device DD applied to the smartwatch may have various shapes. For example, the display device DD may have any of various shapes, such as a closed polygon having sides, a circle and an ellipse, each having a curved side, or a semicircle and a semiellipse, each having a straight side and a curved side. That is, the display device DD may have the shape of a closed curve. Hereinafter, for convenience of description, a structure in which the display device DD has a generally circular or generally rectangular shape will be described by way of example.

Figure 3:
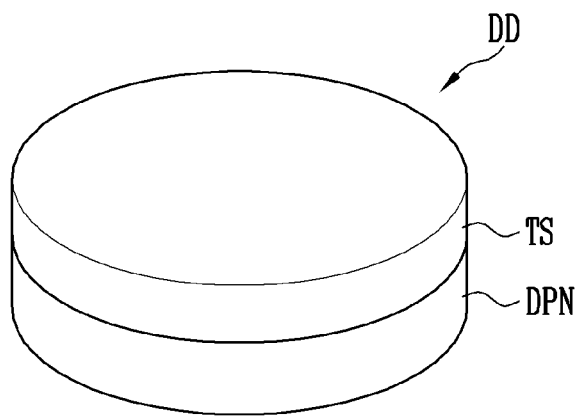
FIG. 3 is a perspective view of an exemplary embodiment of a display device that may be used in mobile device of FIG. 1.
Figure 4:
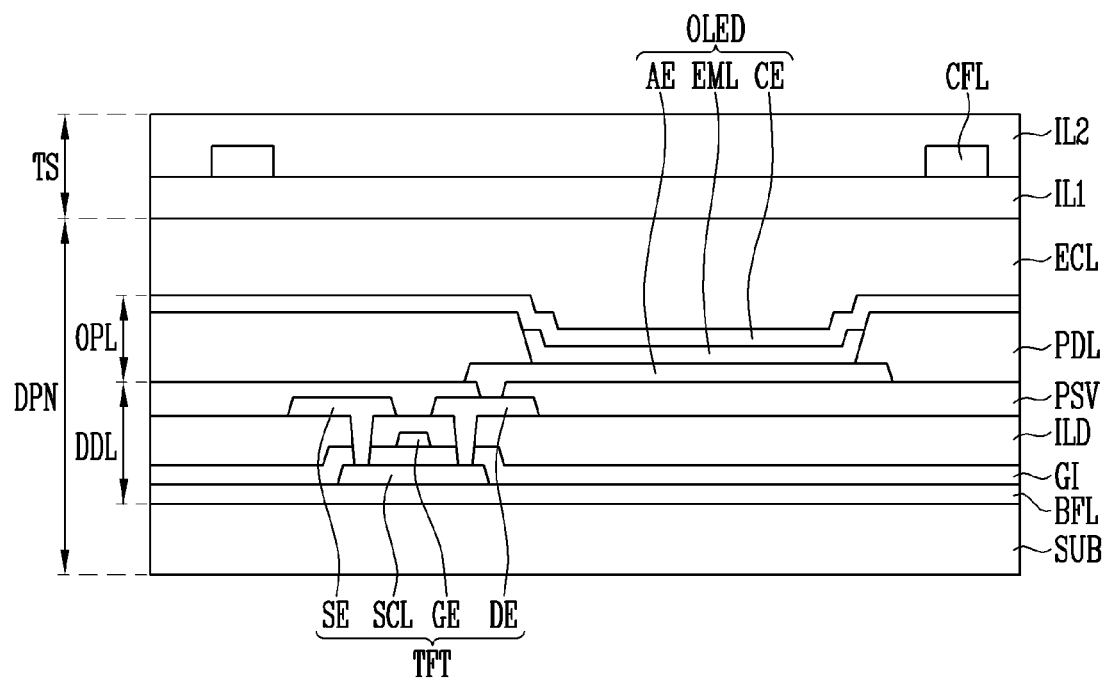
FIG. 4 is a cross-sectional view of a portion of the display device of FIG. 3.

FIG. 3 is a perspective view of an exemplary embodiment of a display device that may be used in mobile device of FIG. 1. FIG. 4 is a cross-sectional view of a portion of the display device of FIG. 3.

Referring to FIGS. 3 and 4, the display device DD may include a display panel DPN and a touch sensor TS.

The display panel DPN may display an image. The display panel DPN is not limited to a particular structure. For example, a display panel that includes a light-emitting element enabling self-emission, such as an organic light-emitting diode (OLED), a micro light-emitting diode (Micro LED), or a nano light-emitting diode (NED), may be used as the display panel DPN. Further, a non-emissive display panel, such as a liquid crystal display (LCD) panel, an electrophoretic display (EPD) panel, or an electrowetting display (EWD) panel, may be used as the display panel DPN. In the case where a non-emissive display panel is used as the display panel DPN, the display device may include a backlight unit configured to supply light to the display panel DPN. The case where an OLED panel is used as the display panel DPN will be described by way of example.

The display panel DPN may include a plurality of pixels. Each pixel may be any one of a red pixel, a green pixel, a blue pixel, and a white pixel, but exemplary embodiments are not limited thereto. For instance, the pixel may be any one of a magenta pixel, a cyan pixel, and a yellow pixel. Each pixel may include a display element (OLED). The display element OLED may be an organic light-emitting element.

The display panel DPN may include a base substrate SUB, a drive layer DDL provided on the base substrate SUB, an optical layer OPL provided on the drive layer DDL, and an encapsulating layer ECL provided on the optical layer OPL.

The base substrate SUB may include pixel areas in which pixels are arranged.

The base substrate SUB may include a transparent insulating material, thereby being capable of transmitting light. Furthermore, the base substrate SUB may be a rigid substrate or a flexible substrate. Examples of the rigid substrate may include a glass substrate, a quartz substrate, a glass ceramic substrate, and a crystalline glass substrate. Examples of the flexible substrate may include a film substrate and a plastic substrate, each of which includes a polymer organic material. For example, the flexible substrate may include one of polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), triacetate cellulose (TAC), and cellulose acetate propionate (CAP). Further, the flexible substrate may include fiber glass reinforced plastic (FRP).

The material applied to the base substrate BS may have resistance (thermal resistance) to high treatment temperatures during the process of manufacturing the display device.

The drive layer DDL may be provided on the base substrate SUB, and may include at least one thin film transistor TFT provided in each pixel area. Furthermore, the drive layer DDL may include a buffer layer BFL provided between the base substrate SUB and the thin film transistor TFT. The buffer layer BFL may include an inorganic insulating material. For example, the buffer layer BFL may include at least one of silicon oxide, silicon nitride, and silicon oxynitride. Further, the buffer layer BFL may have a single-layer structure or a multilayer structure. For example, the buffer layer BFL may have a single-layer structure including any one of silicon oxide, silicon nitride, and silicon oxynitride. The buffer layer BFL may include a silicon oxide layer and a silicon nitride layer disposed on the silicon oxide layer. The buffer layer BFL may include three or more insulating layers that are sequentially stacked.

The buffer layer BFL may prevent impurities from diffusing from the base substrate SUB to the thin film transistor TFT. Further, the buffer layer BFL may planarize the surface of the base substrate SUB.

The thin film transistor TFT may be coupled to a gate line and a data line. The thin film transistor TFT may include a semiconductor layer SCL, a gate electrode GE, a source electrode SE, and a drain electrode DE.

The semiconductor layer SCL may be disposed on the buffer layer BFL. The semiconductor layer SCL may include any one of amorphous silicon (Si), polycrystalline silicon (Si), an oxide semiconductor, and an organic semiconductor. Regions on the semiconductor layer SCL that are coupled to the source electrode SE and the drain electrode DE may be a source region and a drain region, which are doped with impurities or into which impurities are injected. The area between the source region and the drain region may be a channel area.

If the semiconductor layer SCL includes an oxide semiconductor, a light-blocking layer may be disposed on or under the semiconductor layer SCL so as to prevent light from entering the semiconductor layer SCL.

A gate insulating layer GI may be disposed on the semiconductor layer SCL. The gate insulating layer GI may cover the semiconductor layer SCL, and may insulate the semiconductor layer SCL from the gate electrode GE. The gate insulating layer GI may include at least one of an organic insulating material and an inorganic insulating material. For example, the gate insulating layer GI may include at least one of silicon oxide and silicon nitride.

The gate electrode GE may be disposed on the gate insulating layer GI. The gate electrode GE may be coupled to the gate line. The gate electrode GE may include a low-resistance conductive material, and may overlap the semiconductor layer SCL.

An interlayer insulating layer ILD may be disposed on the gate electrode GE. The interlayer insulating layer ILD may include at least one of an organic insulating material and an inorganic insulating material. For example, the interlayer insulating layer ILD may include at least one of silicon oxide and silicon nitride. The interlayer insulating layer ILD may insulate the source electrode SE, the drain electrode DE, and the gate electrode GE from each other.

Contact holes formed through the gate insulating layer GI and the interlayer insulating layer ILD may expose the source region and the drain region of the semiconductor layer SCL.

The source electrode SE and the drain electrode DE may be disposed on the interlayer insulating layer ILD so as to be spaced apart from each other. Each of the source electrode SE and the drain electrode DE may include a low-resistance conductive material. A first end of the source electrode SE may be coupled to the data line. A second end of the source electrode SE may be coupled to the source region through one of the contact holes. A first end of the drain electrode DE may be coupled to the drain region through another one of the contact holes. A second end of the drain electrode DE may be coupled to the display element OLED.

While the case where the thin film transistor TFT is a thin film transistor having a top gate structure is described by way of example, the exemplary embodiments are not limited thereto. For example, the thin film transistor TFT may be a thin film transistor having a bottom gate structure.

A protective layer PSV may be provided on the drive layer DDL. The protective layer PSV may cover the thin film transistor TFT. A portion of the protective layer PSV may be removed to expose one of the source electrode SE and the drain electrode DE, for example, the drain electrode DE.

The protective layer PSV may include at least one layer. For example, the protective layer PSV may include an inorganic protective layer and an organic protective layer disposed on the inorganic protective layer. The inorganic protective layer may include at least one of silicon oxide and silicon nitride. The organic protective layer may include one of acryl, polyimide (PI), polyamide (PA), and benzocyclobutene (BCB). Furthermore, the organic protective layer may be a planarization layer that is transparent and flexible, thus making it possible to mitigate the unevenness of a lower structure and planarize the lower structure.

The optical layer OPL may be provided on the protective layer PSV, and may include the display element OLED, which is coupled to a portion of the thin film transistor TFT, for example, the drain electrode DE.

The display element OLED may include a first electrode AE coupled to the drain electrode DE, a light-emitting layer EML disposed on the first electrode AE, and a second electrode CE disposed on the light-emitting layer EML.

Any one of the first electrode AE and the second electrode CE may be an anode electrode, and the other one thereof may be a cathode electrode. For example, the first electrode AE may be an anode electrode, and the second electrode CE may be a cathode electrode.

Furthermore, at least one of the first electrode AE and the second electrode CE may be a transmissive electrode. For example, in the case where the display element OLED is a bottom-emission-type organic light-emitting element, the first electrode AE may be a transmissive electrode, and the second electrode CE may be a reflective electrode. In the case where the display element OLED is a top-emission-type organic light-emitting element, the first electrode may be a reflective electrode, and the second electrode may be a transmissive electrode. In the case where the display element OLED is a both-side-emission-type organic light-emitting element, both the first electrode AE and the second electrode CE may be transmissive electrodes. The case where the display element OLED is a top-emission type organic light-emitting element and the first electrode AE is an anode electrode will be described by way of example.

In each pixel area, the first electrode AE may be disposed on the protective layer PSV. The first electrode AE may include a reflective layer, which is capable of reflecting light, and a transparent conductive layer, which is disposed on or under the reflective layer. At least one of the transparent conductive layer and the reflective layer may be coupled to the drain electrode DE.

The reflective layer may include material that is capable of reflecting light. For example, the reflective layer may include at least one of aluminum (Al), silver (Ag), chrome (Cr), molybdenum (Mo), platinum (Pt), nickel (Ni), and an alloy thereof.

The transparent conductive layer may include transparent conductive oxide. For example, the transparent conductive layer may include transparent conductive oxide corresponding to at least one of indium tin oxide (ITO), indium zinc oxide (IZO), aluminum zinc oxide (AZO), gallium doped zinc oxide (GZO), zinc tin oxide (ZTO), gallium tin oxide (GTO) and fluorine doped tin oxide (FTO).

A pixel-defining layer PDL may be disposed on the first electrode AE. The pixel-defining layer PDL may be disposed between the pixel areas, and may expose the first electrode AE. Further, the pixel-defining layer PDL may overlap the edge of the first electrode AE. Further, the pixel-defining layer PDL may expose most of the surface of the first electrode AE.

The pixel-defining layer PDL may include an inorganic insulating material or an organic insulating material. For example, the pixel-defining layer PDL may include at least one of polystyrene, polymethylmethacrylate (PMMA), polyacrylonitrile (PAN), polyamide (PA), polyimide (PI), polyarylether (PAE), heterocyclic polymer, parylene, epoxy, benzocyclobutene (BCB), siloxane-based resin, and silane-based resin.

The light-emitting layer EML may be disposed on the exposed surface of the first electrode AE. The light-emitting layer EML may have a multilayer thin-film structure including at least a light generation layer (LGL). For instance, the light-emitting layer EML may include a hole injection layer (HIL), into which holes are injected, a hole transport layer (HTL), which has excellent hole transportation performance and prevents the movement of electrons that have not been coupled with holes in the light generation layer, thus increasing the chances of recombination between holes and electrons, the light generation layer, which emits light by recombination between injected electrons and holes, a hole-blocking layer (HBL), which prevents the movement of holes that have not been coupled with electrons in the light generation layer, an electron transport layer (ETL), which is provided to smoothly transport electrons to the light generation layer, and an electron injection layer (EIL), into which electrons are injected.

The color of the light generated in the light generation layer may be one of red, green, blue, and white, but exemplary embodiments are not limited thereto. For example, the color of the light generated in the light generation layer of the light-emitting layer EML may be one of magenta, cyan, and yellow.

The hole injection layer, the hole transport layer, the hole-blocking layer, the electron transport layer, and the electron injection layer may be common layers coupled between adjacent pixel areas.

The second electrode CE may be disposed on the light-emitting layer EML. The second electrode CE may be a semi-transmissive reflective layer. For example, the second electrode CE may be a thin metal layer that is sufficiently thin to allow light to pass therethrough. The second electrode CE may allow part of the light generated in the light generation layer to pass therethrough, and may reflect the remaining part of the light generated in the light generation layer.

The second electrode CE may include material having a work function lower than that of the transparent conductive layer. For instance, the second electrode CE may include at least one of molybdenum (Mo), tungsten (W), silver (Ag), magnesium (Mg), aluminum (Al), platinum (Pt), palladium (Pd), gold (Au), nickel (Ni), neodymium (Nd), iridium (Ir), chrome (Cr), lithium (Li), calcium (Ca), and an alloy thereof.

Some of the light emitted from the light-emitting layer EML may not pass through the second electrode CE, and the light reflected from the second electrode CE may be reflected again from the reflective layer. That is, light emitted from the light-emitting layer EML may resonate between the reflective layer and the second electrode CE. The light extraction efficiency of the display element OLED may be enhanced by the resonance of light.

The distance between the reflective layer and the second electrode CE may change depending on the color of the light generated in the light generation layer. That is, depending on the color of the light generated in the light generation layer, the distance between the reflective layer and the second electrode CE may be adjusted to correspond to a resonance distance.

The encapsulating layer ECL may be provided on the second electrode CE. The encapsulating layer ECL may cover the display element OLED, and may prevent oxygen or water from permeating into the display element OLED. The encapsulating layer ECL may include a plurality of insulating layers. For instance, the encapsulating layer ECL may include a plurality of inorganic layers and a plurality of organic layers. In addition, the encapsulating layer ECL may include a plurality of encapsulating units, each including an inorganic layer and an organic layer disposed on the inorganic layer. The inorganic layer may include at least one of silicon oxide, silicon nitride, silicon oxynitride, aluminum oxide, titanium oxide, zirconium oxide, and tin oxide. The organic layer may include one of acryl, polyimide (PI), polyamide (PA), and benzocyclobutene (BCB).

The touch sensor TS may be disposed on one surface of the display panel DPN. For example, the touch sensor TS may be provided on the encapsulating layer ECL.

The touch sensor TS may include a first insulating layer IL1 provided on the encapsulating layer ECL, touch electrodes provided on the first insulating layer IL1 and configured in a mesh structure of a plurality of conductive lines CFL, and a second insulating layer IL2 configured to cover the conductive lines CFL.

Hereinafter, the touch sensor TS will be described in detail with reference to FIGS. 5 to 27.

Figure 5:
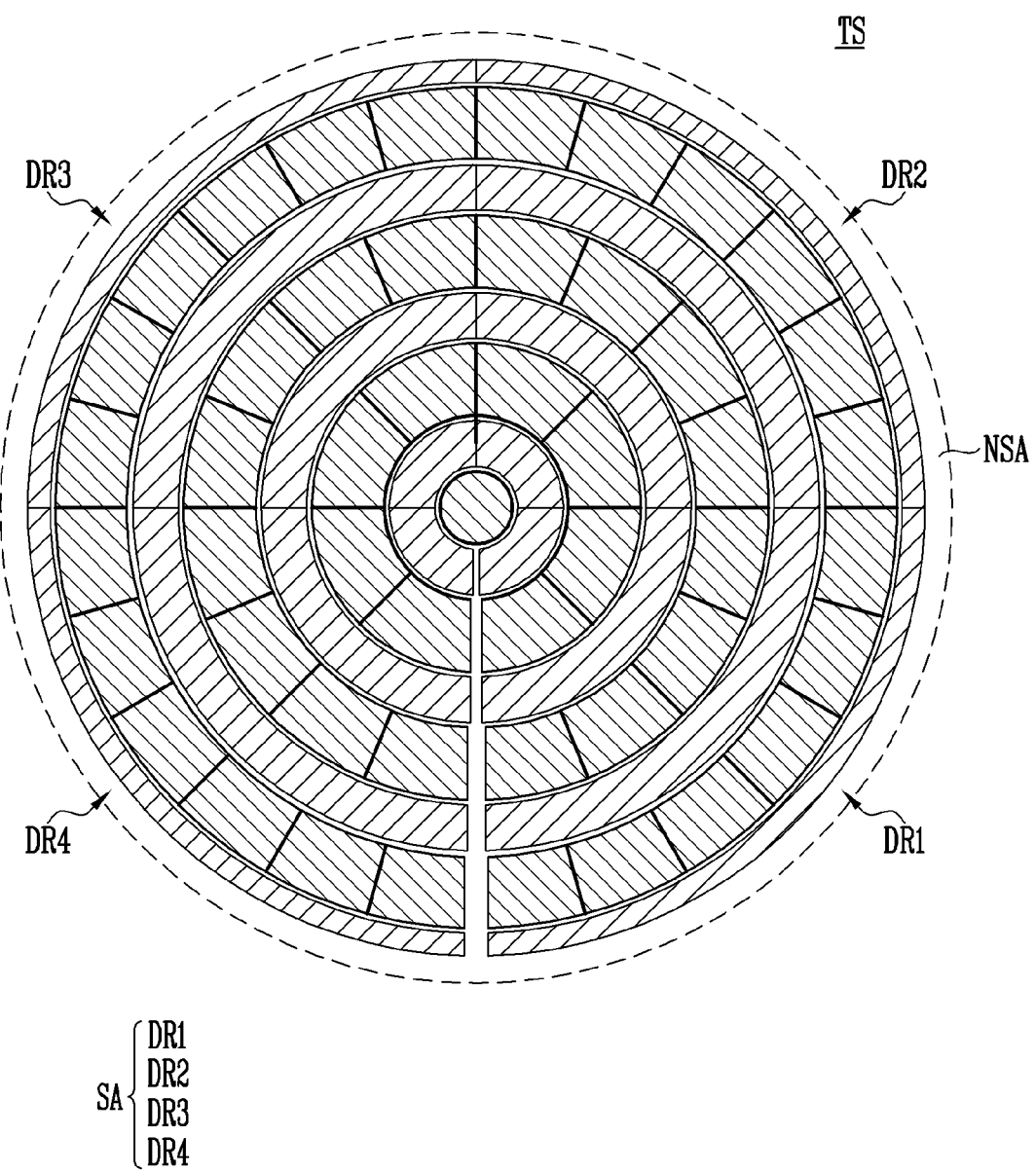
FIG. 5 is a plan view of an exemplary embodiment of the touch sensor of FIG. 3 constructed according to the principles of the invention.
Figure 6:
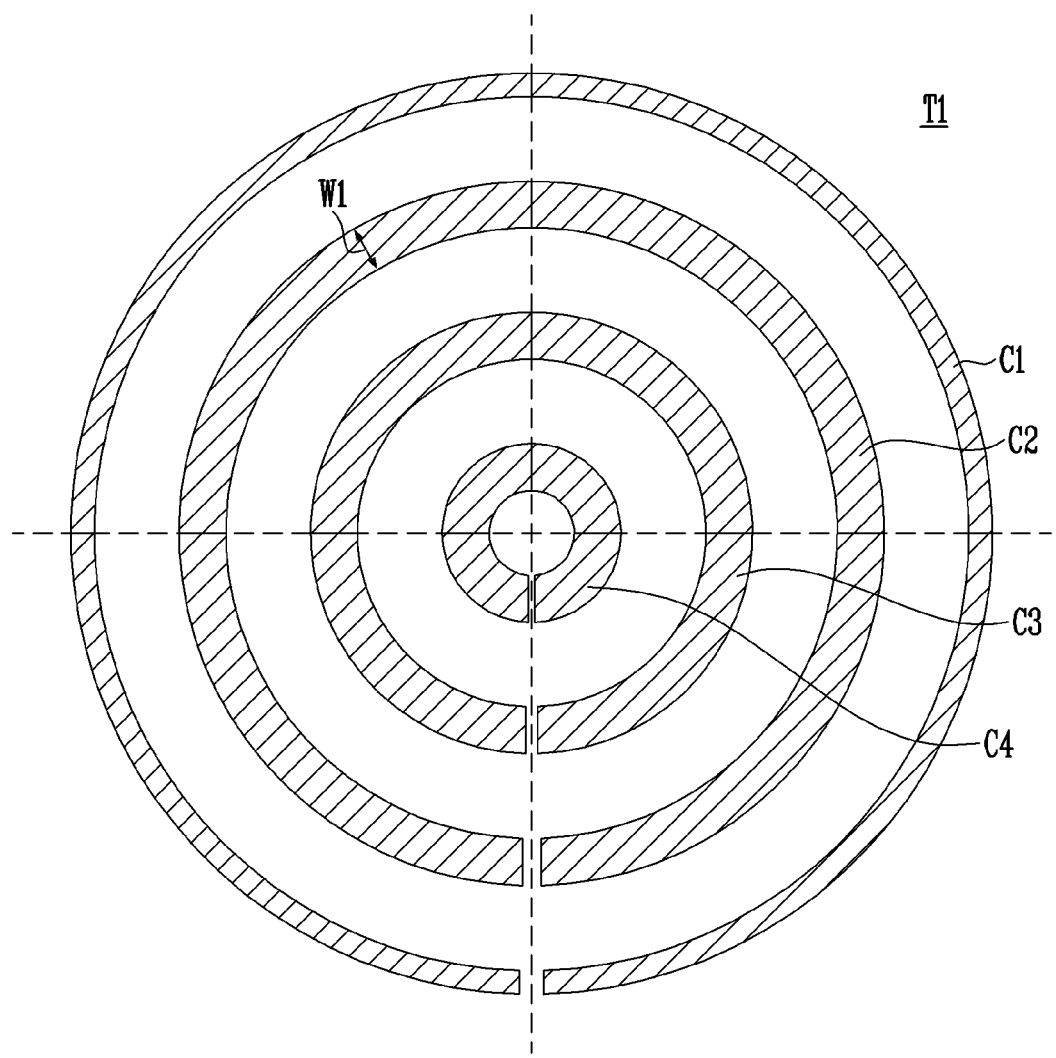
FIG. 6 is a plan view of first touch electrodes of the touch sensor of FIG. 5.
Figure 7:
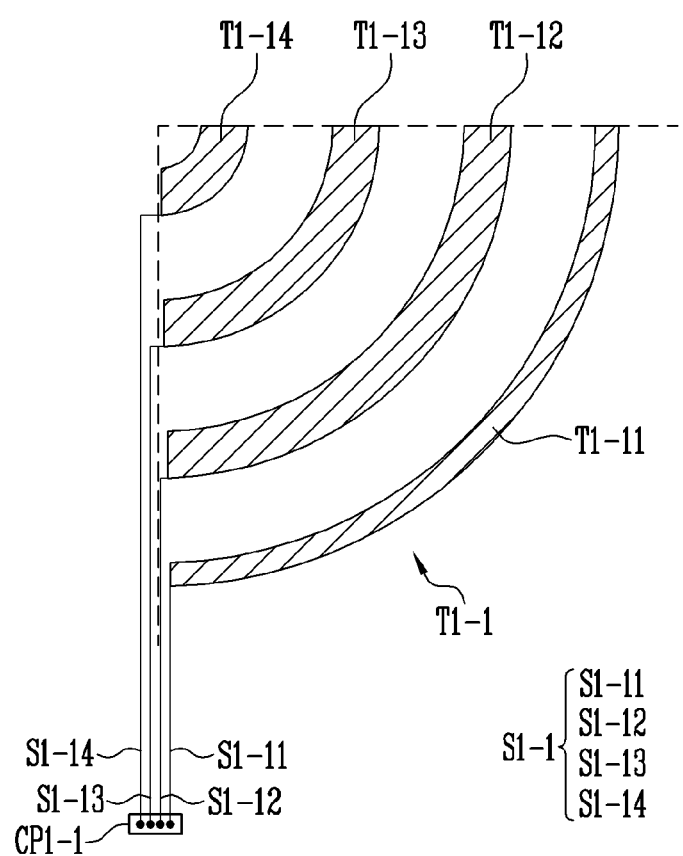
FIGS. 7 to 10 are plan views of 1-1-th to 1-4-th sub-touch electrodes included in the first touch electrodes of FIG. 6.
Figure 8:
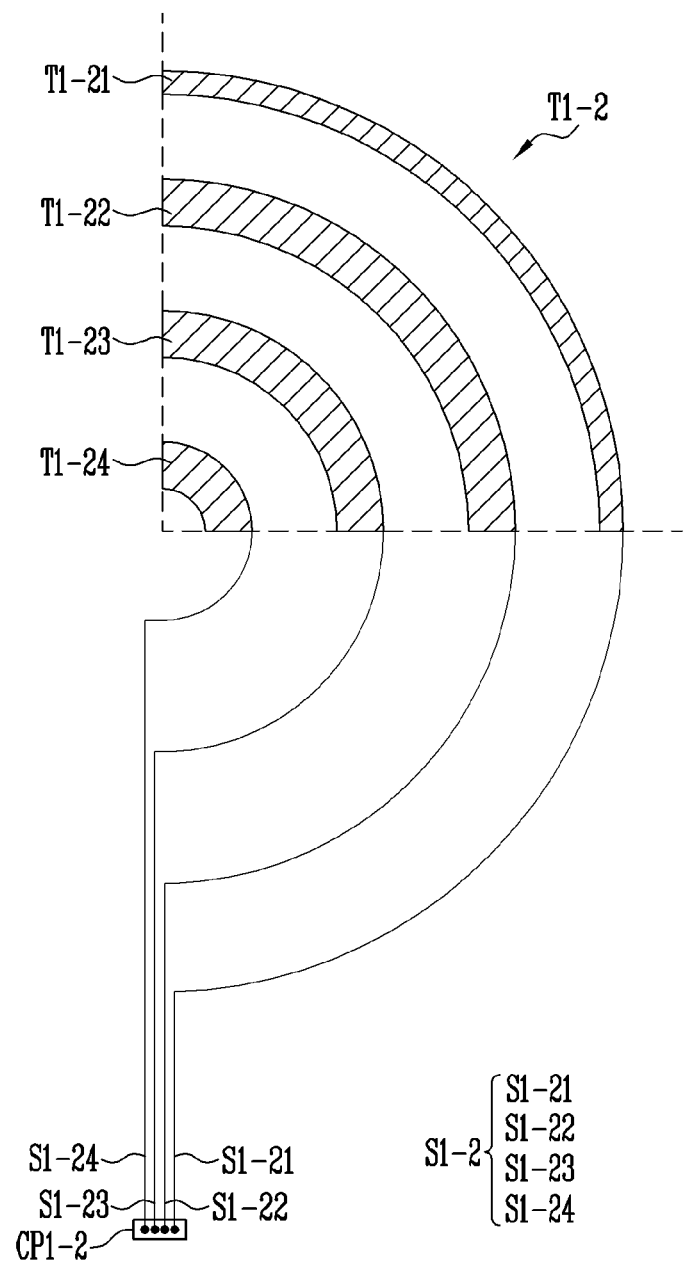
Figure 9:
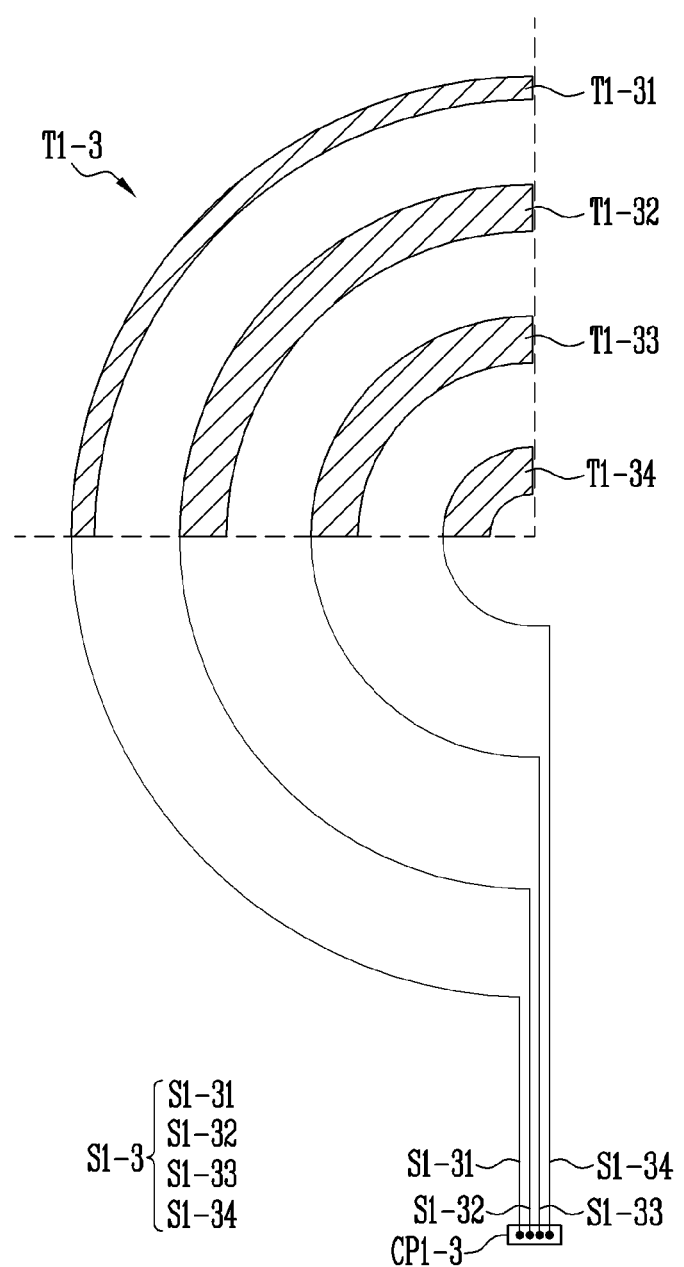
Figure 10:
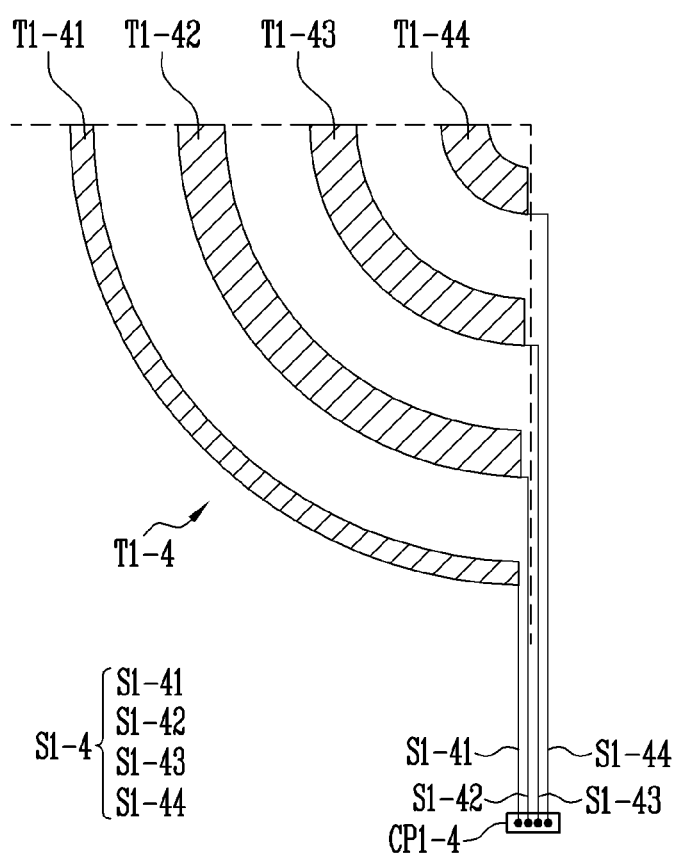
Figure 11:
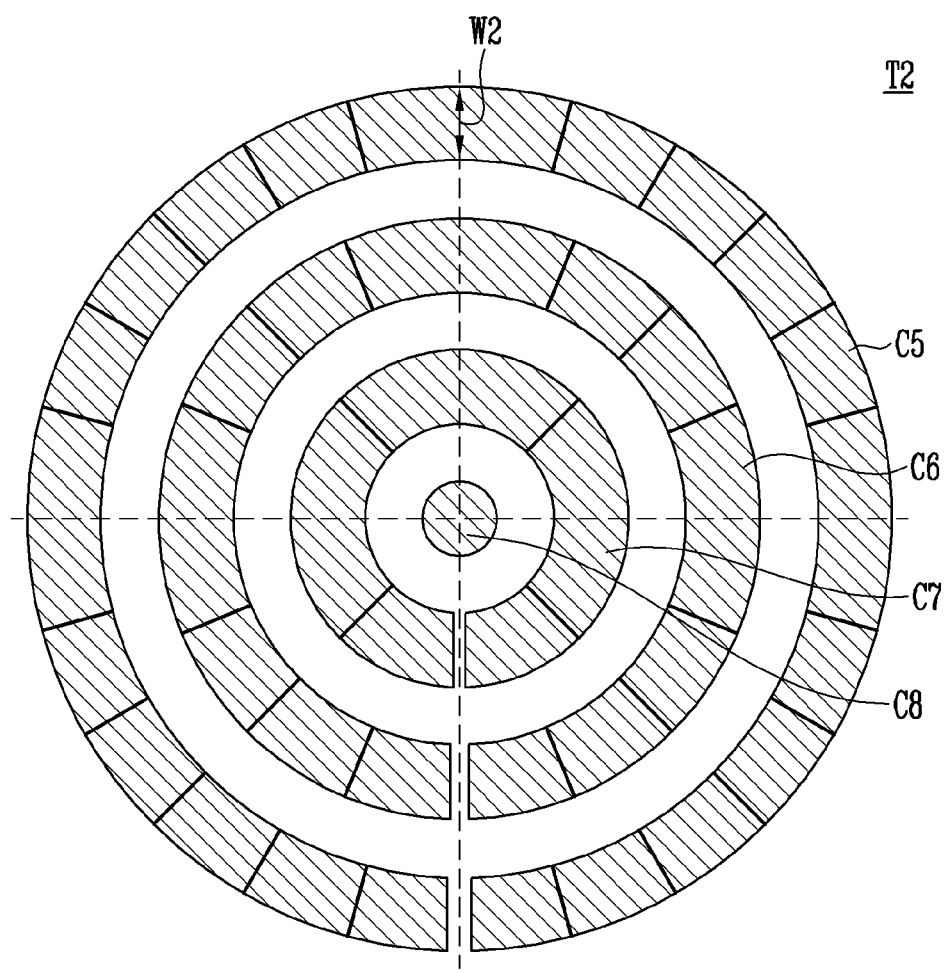
FIG. 11 is a plan view of second touch electrodes of the touch sensor of FIG. 5.
Figure 12:
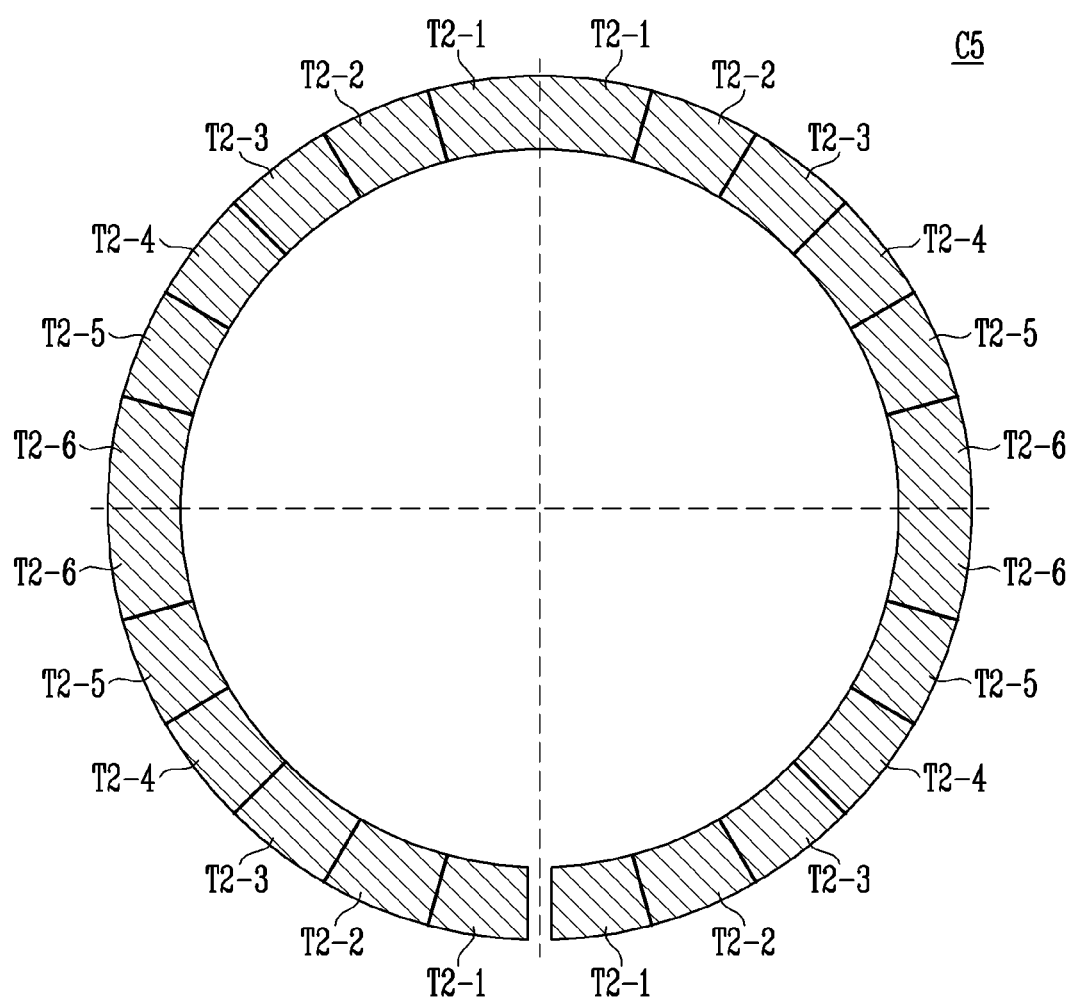
FIG. 12 is a plan view of 2-1-th to 2-6-th sub-touch electrodes included in the second touch electrodes of FIG. 11.
Figure 13:
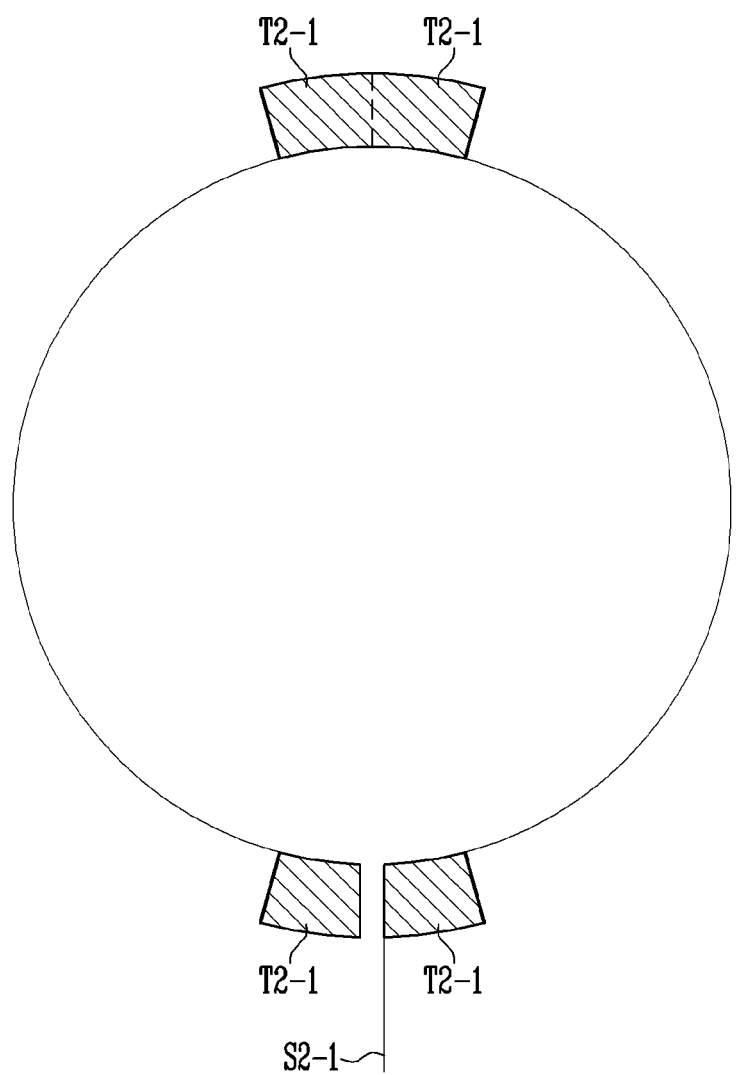
FIGS. 13 to 18 are plan views of the 2-1-th to 2-6-th sub-touch electrodes of FIG. 12.
Figure 14:
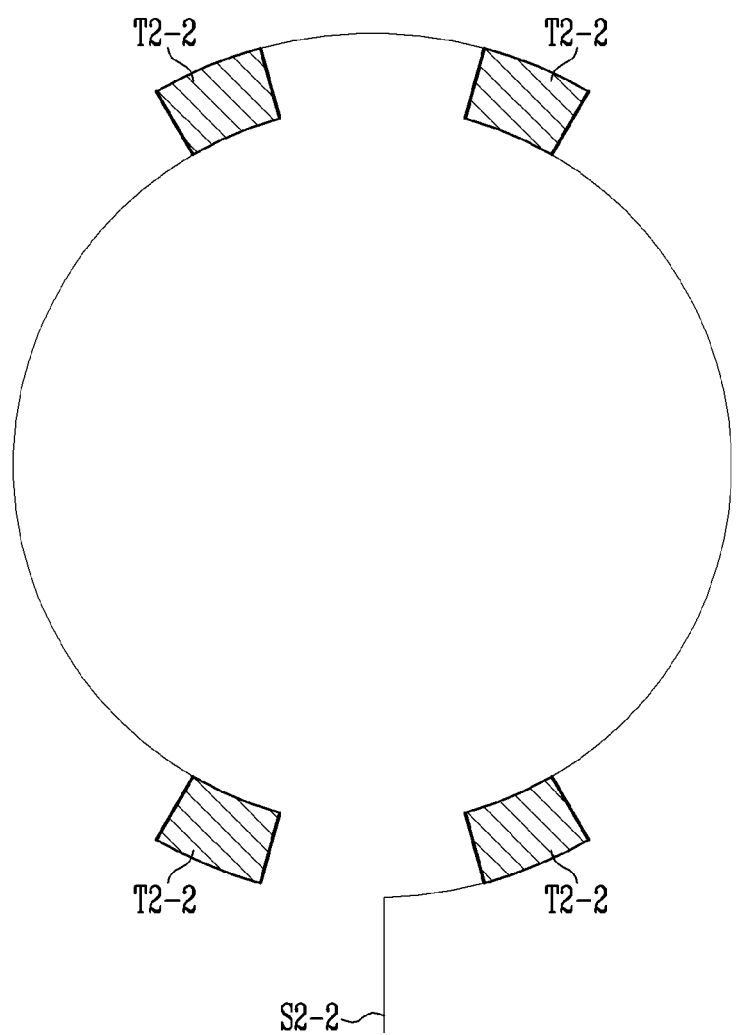
Figure 15:
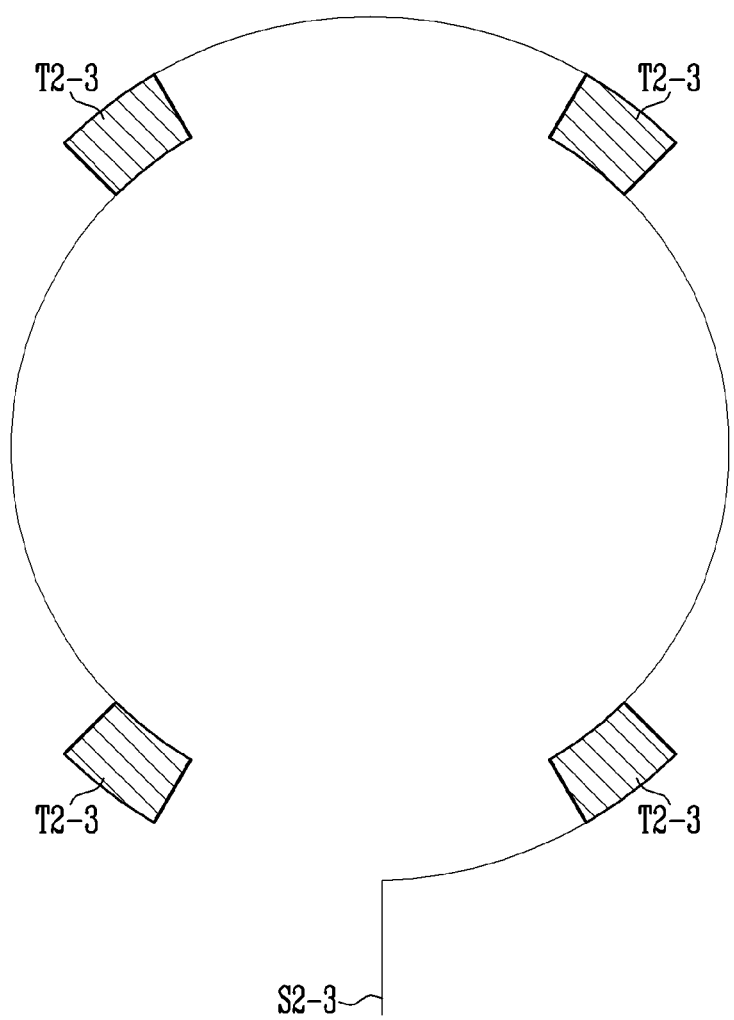
Figure 16:
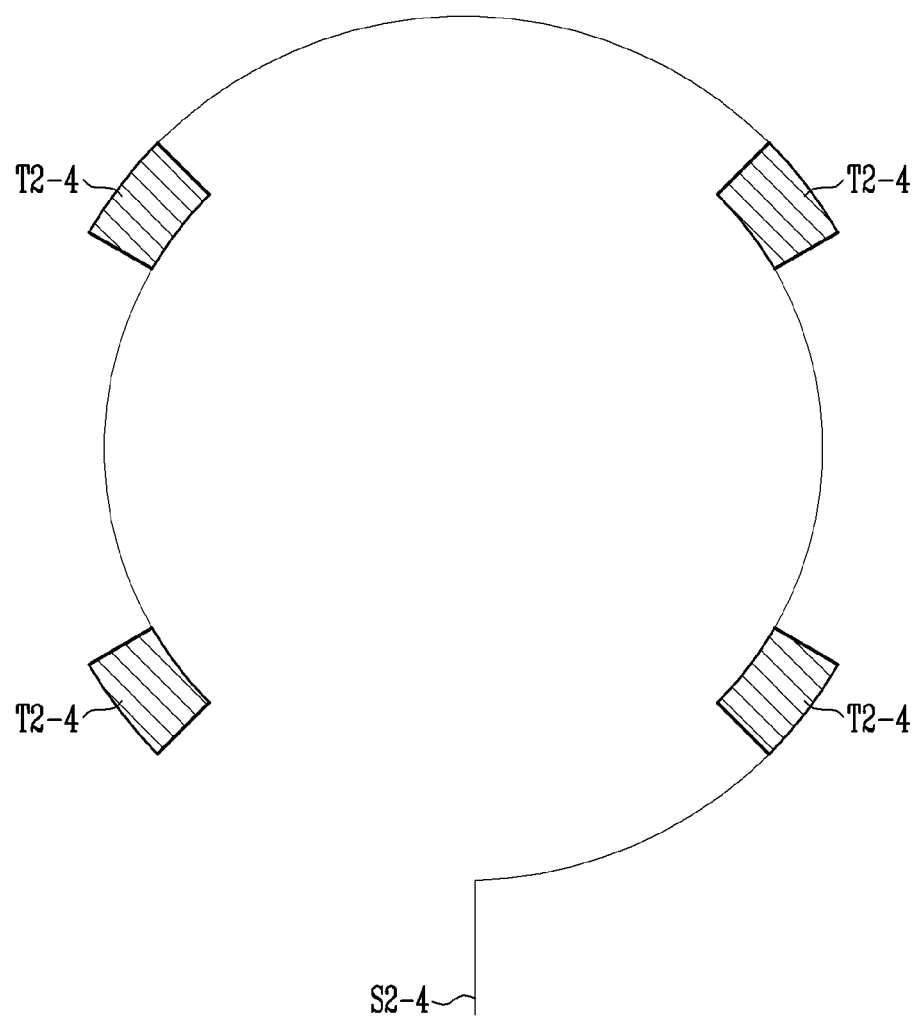
Figure 17:
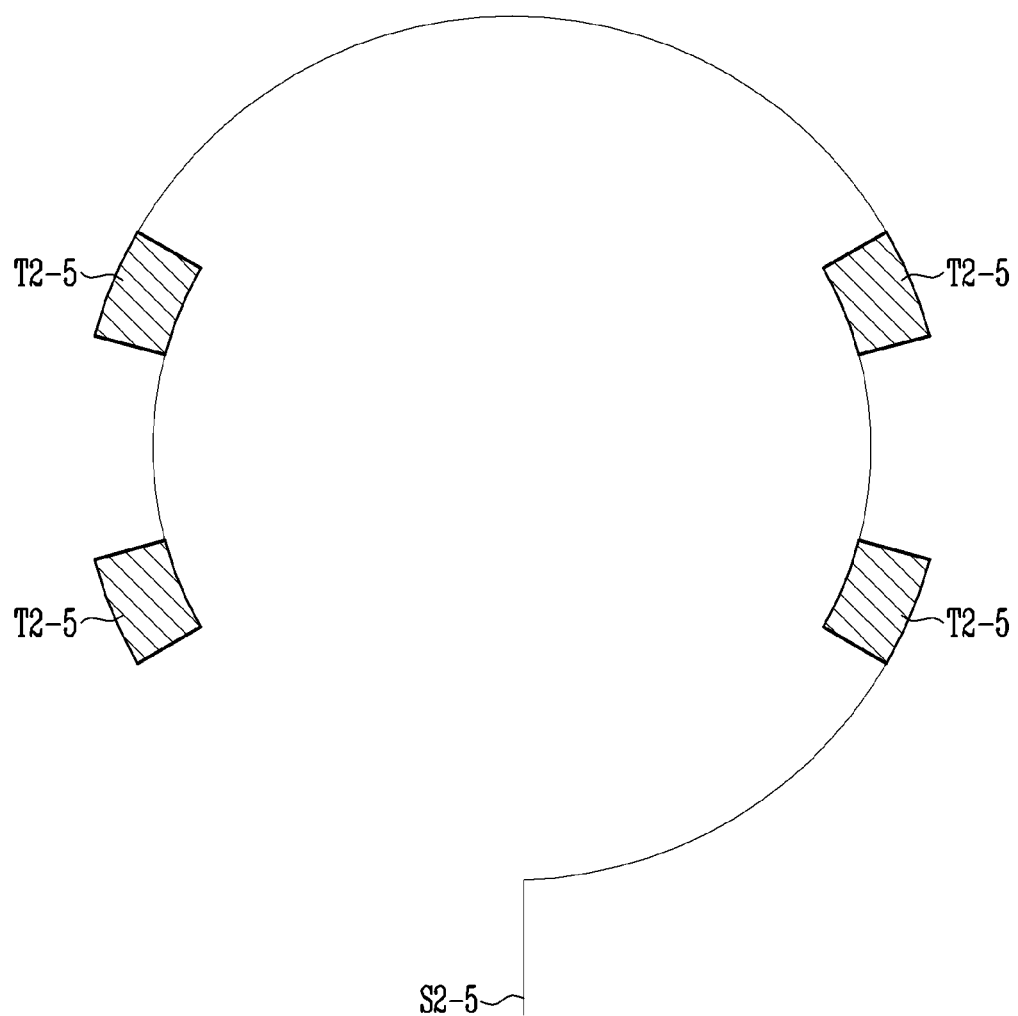
Figure 18:
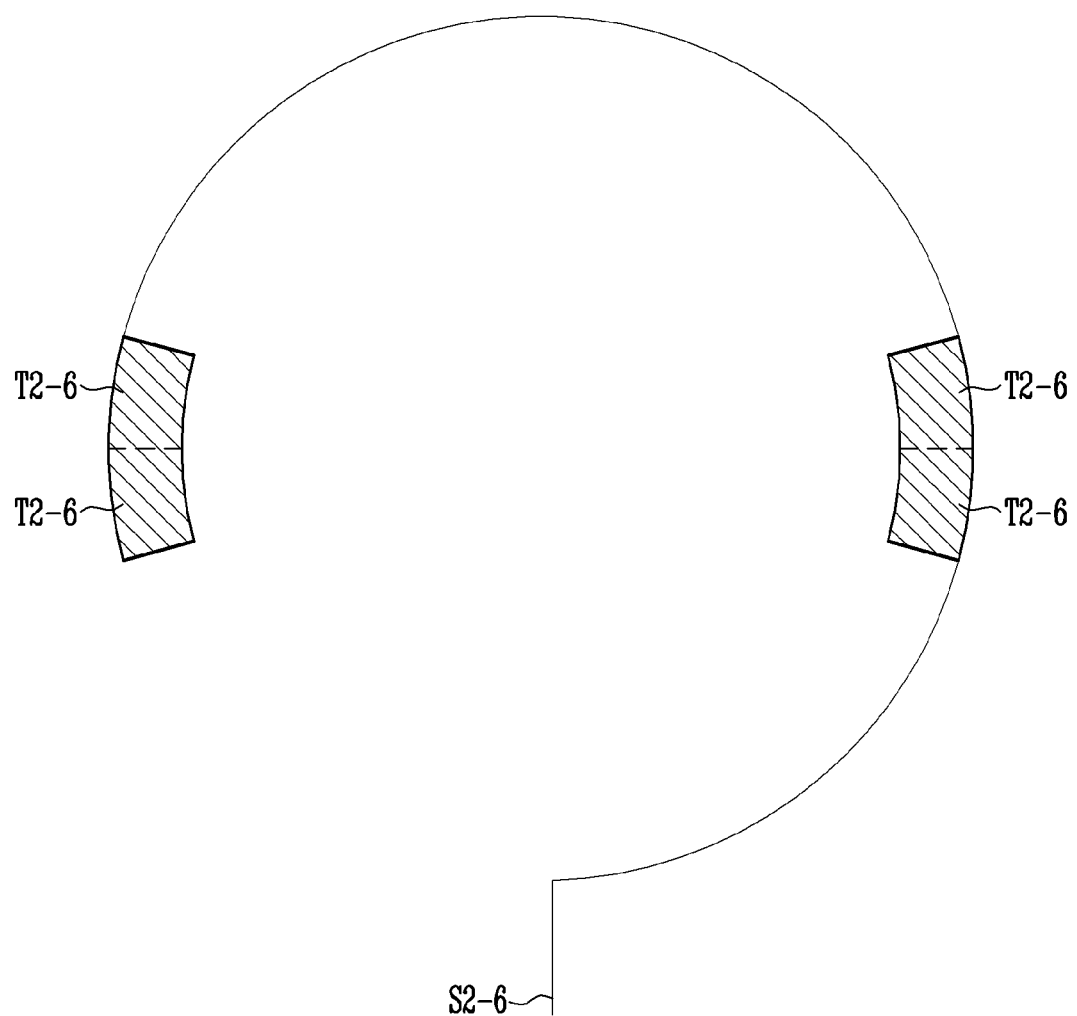
Figure 19:
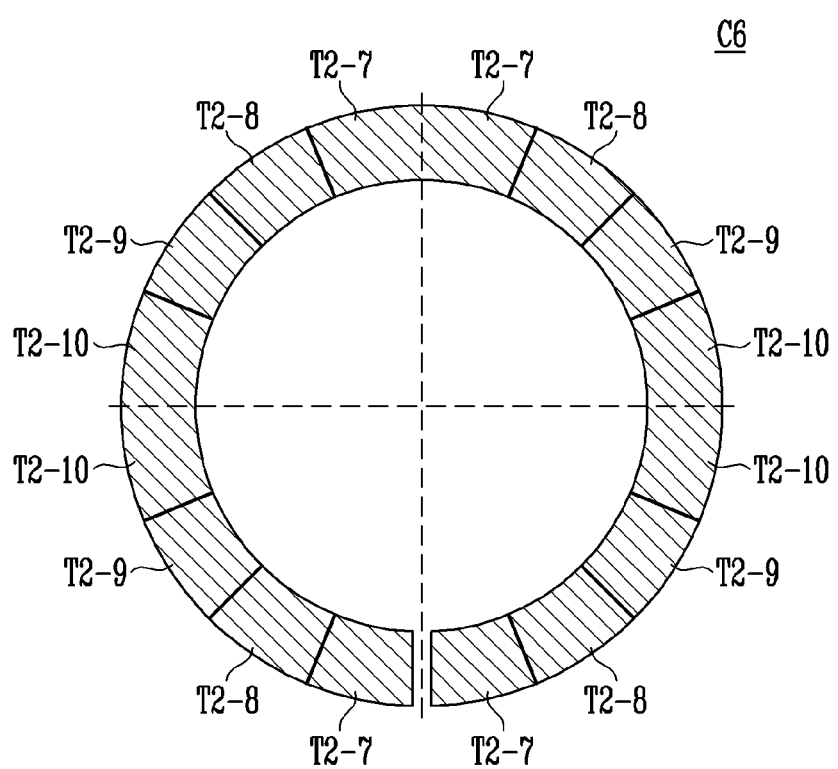
FIG. 19 is a plan view of 2-7-th to 2-10-th sub-touch electrodes included in the second touch electrodes of FIG. 11.
Figure 22:
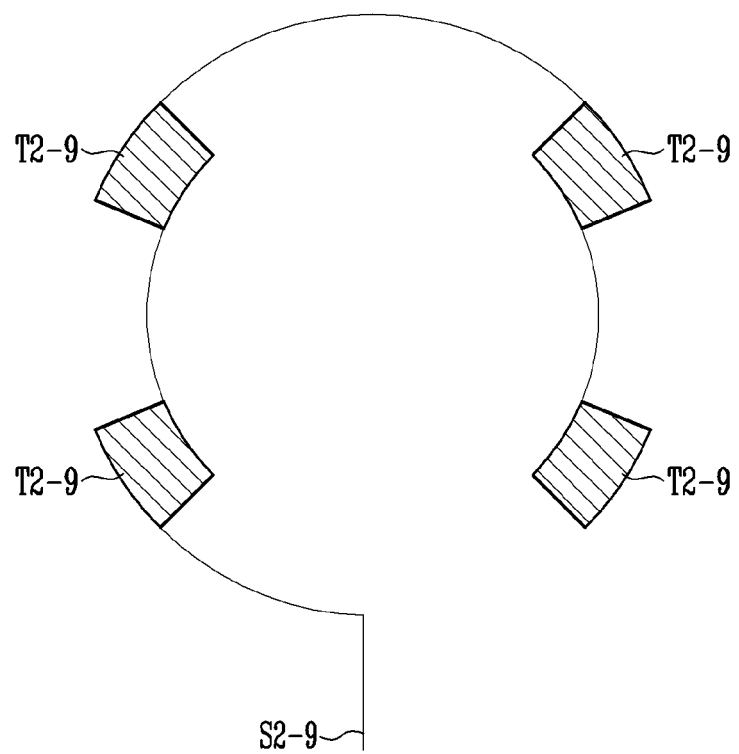
Figure 23:
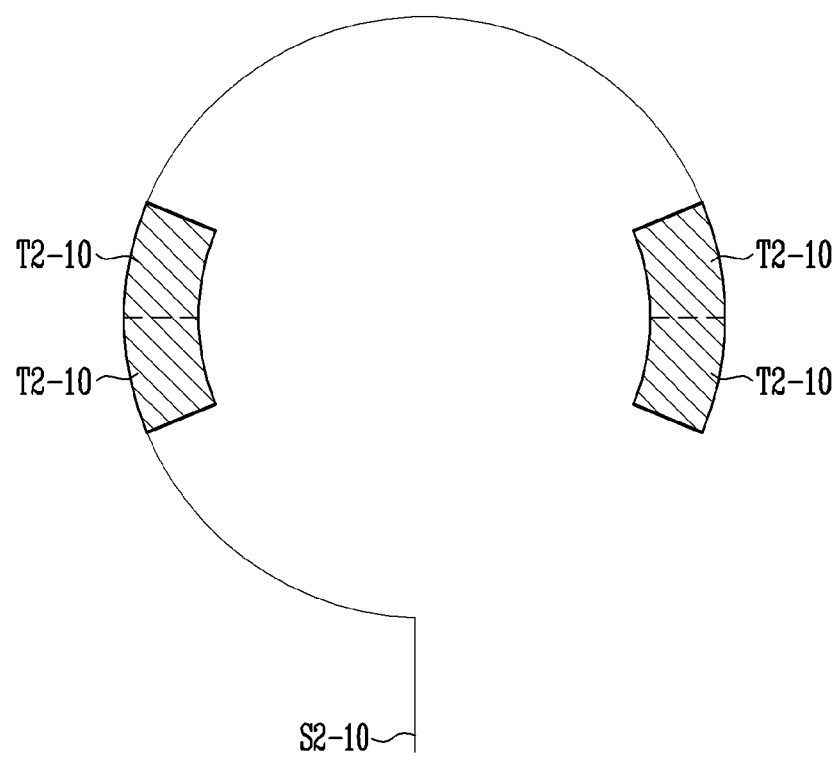
Figure 24:
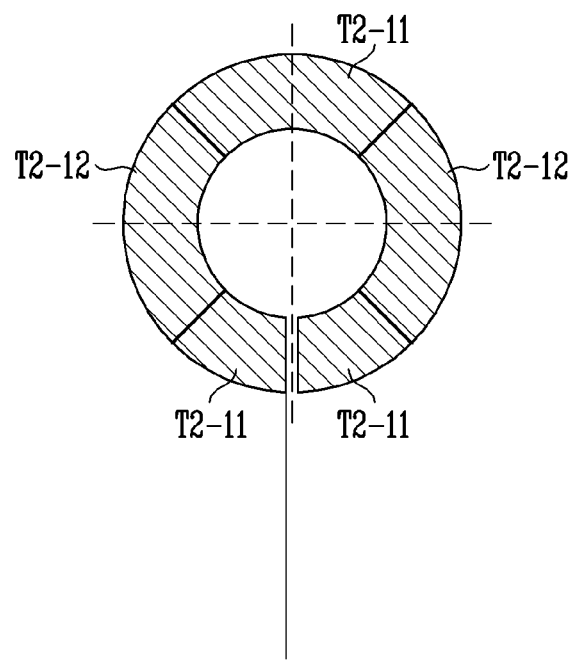
FIG. 24 is a plan view of 2-11-th and 2-12-th sub-touch electrodes included in the second touch electrodes of FIG. 11.
Figure 25:
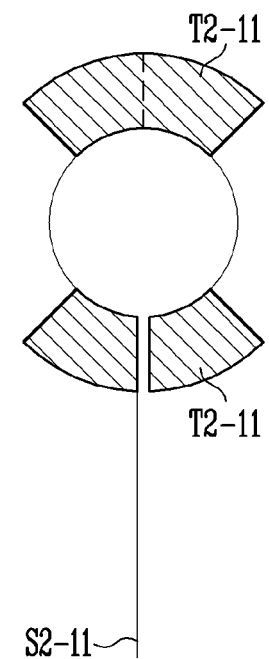
FIGS. 25 and 26 are plan views of exemplary embodiments of the 2-11-th and 2-12-th sub-touch electrodes of FIG. 24.
Figure 26:
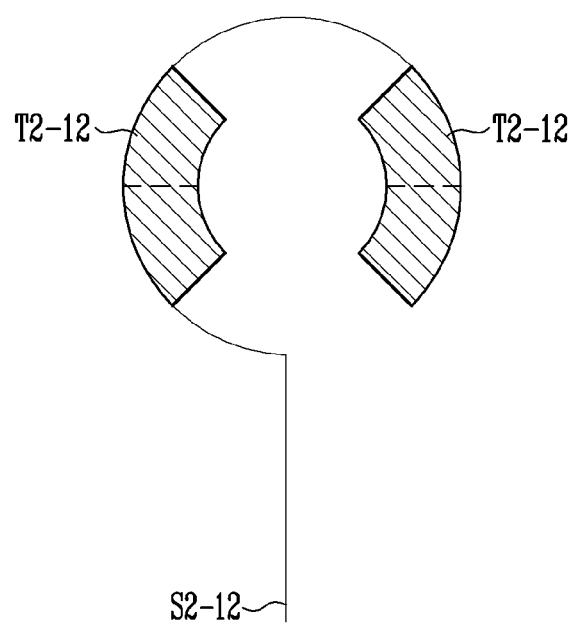
Figure 27:
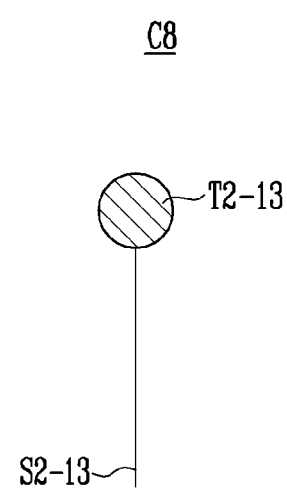
FIG. 27 is a plan view of a 2-13-th sub-touch electrode included in the second touch electrodes of FIG. 11.

FIG. 5 is a plan view of an exemplary embodiment of the touch sensor of FIG. 3 constructed according to the principles of the invention. FIG. 6 is a plan view of first touch electrodes of the touch sensor of FIG. 5. FIGS. 7 to 10 are plan views of 1-1-th to 1-4-th sub-touch electrodes included in the first touch electrodes of FIG. 6. FIG. 11 is a plan view of second touch electrodes of the touch sensor of FIG. 5. FIG. 12 is a plan view of 2-1-th to 2-6-th sub-touch electrodes included in the second touch electrodes of FIG. 11. FIGS. 13 to 18 are plan views of the 2-1-th to 2-6-th sub-touch electrodes of FIG. 12. FIG. 19 is a plan view of 2-7-th to 2-10-th sub-touch electrodes included in the second touch electrodes of FIG. 11. FIGS. 20 to 23 are plan views of the 2-7-th to 2-10-th sub-touch electrodes of FIG. 19. FIG. 24 is a plan view of 2-11-th and 2-12-th sub-touch electrodes included in the second touch electrodes of FIG. 11. FIGS. 25 and 26 are plan views of exemplary embodiments of the 2-11-th and 2-12-th sub-touch electrodes of FIG. 24. FIG. 27 is a plan view of a 2-13-th sub-touch electrode included in the second touch electrodes of FIG. 11.

Referring to FIGS. 5 to 27, the touch sensor TS may include a sensing area SA and a non-sensing area NSA, wherein the sensing area SA may have a closed shape, for example, a closed curve such as a circle. While the sensing area SA is described as being a generally circular shape, exemplary embodiments are not limited thereto. The sensing area SA may have shapes other than a generally circular shape. For example, the sensing area SA may have various shapes, such as a closed polygon having sides, an ellipse having a curved side, or a semicircle or a semi-ellipse having a straight side and a curved side.

In the sensing area SA, first touch electrodes T1 and second touch electrodes T2 may be provided. The sensing area SA may be divided into a plurality of sections in the form of partition regions which may be quadrants of the circular shape. For example, the sensing area SA may be divided by an angle of 90° into first to fourth partition regions DR1, DR2, DR3, and DR4. In FIGS. 6 to 10, the case where the first to fourth partition regions DR1, DR2, DR3, and DR4 are arranged counterclockwise is described by way of example, but exemplary embodiments are not limited thereto. For example, the first to fourth partition regions DR1, DR2, DR3, and DR4 may be arranged clockwise.

The first touch electrodes T1 may include a plurality of first sub-touch electrodes T1-1, T1-2, T1-3, and T1-4. For instance, the first touch electrodes T1 may include 1-1-th to 1-4-th sub-touch electrodes T1-1, T1-2, T1-3, and T1-4.

Among the 1-1-th to 1-4-th sub-touch electrodes T1-1, T1-2, T1-3, and T1-4, portions of the 1-1-th to 1-4-th sub-touch electrodes T1-1, T1-2, T1-3, and T1-4 having substantially equal distances to the center of the closed curve may form ring shapes. That is, the first touch electrodes T1 may include a plurality of groups of sub-touch electrodes in the form of a plurality of rings, for example, first to fourth rings C1, C2, C3, and C4, which have the shape of generally concentric circles. Here, in the sequence of the first to fourth rings C1, C2, C3, and C4, the outermost concentric circle may be the first ring C1, and the innermost concentric circle may be the fourth ring C4.

In the first to fourth rings C1, C2, C3, and C4, the 1-1-th to 1-4-th sub-touch electrodes T1-1, T1-2, T1-3, and T1-4 may be arranged in the first to fourth partition regions DR1, DR2, DR3, and DR4, respectively. This configuration will be described in detail below. The 1-1-th sub-touch electrodes T1-1 may be provided in the first partition region DR1, the 1-2-th sub-touch electrodes T1-2 may be provided in the second partition region DR2, the 1-3-th sub-touch electrodes T1-3 may be provided in the third partition region DR3, and the 1-4-th sub-touch electrodes T1-4 may be provided in the fourth partition region DR4.

Sub-touch electrodes of the first to fourth rings C1, C2, C3, and C4 disposed in each of the first to fourth partition regions DR1, DR2, DR3, and DR4 may be electrically connected to a common signal line and/or a common signal pad.

The 1-1-th sub-touch electrodes T1-1 may include a 1-11-th sub-touch electrode T1-11 arranged in the first ring C1, a 1-12-th sub-touch electrode T1-12 arranged in the second ring C2, a 1-13-th sub-touch electrode T1-13 arranged in the third ring C3, and a 1-14-th sub-touch electrode T1-14 arranged in the fourth ring C4.

1-1-th signal lines S1-1 may be coupled to the 1-1-th sub-touch electrodes T1-1, respectively. The 1-1-th signal lines S1-1 may include a 1-11-th signal line S1-11 coupled to the 1-11-th sub-touch electrode T1-11, a 1-12-th signal line S1-12 coupled to the 1-12-th sub-touch electrode T1-12, a 1-13-th signal line S1-13 coupled to the 1-13-th sub-touch electrode T1-13, and a 1-14-th signal line S1-14 coupled to the 1-14-th sub-touch electrode T1-14.

The 1-1-th signal lines S1-1 may extend from a boundary between the first partition region DR1 and the fourth partition region DR4 to the non-sensing area NSA, and may be electrically coupled to each other in the non-sensing area NSA. For example, the 1-11-th signal line S1-11, the 1-12-th signal line S1-12, the 1-13-th signal line S1-13, and the 1-14-th signal line S1-14 may be coupled to a 1-1-th coupling pad CP1-1 provided in the non-sensing area NSA, and may be supplied with the same signal through the 1-1-th coupling pad CP1-1.

The 1-2-th sub-touch electrodes T1-2 may include a 1-21-th sub-touch electrode T1-21 arranged in the first ring C1, a 1-22-th sub-touch electrode T1-22 arranged in the second ring C2, a 1-23-th sub-touch electrode T1-23 arranged in the third ring C3, and a 1-24-th sub-touch electrode T1-24 arranged in the fourth ring C4.

1-2-th signal lines S1-2 may be coupled to the 1-2-th sub-touch electrodes T1-2, respectively. The 1-2-th signal lines S1-2 may include a 1-21-th signal line S1-21 coupled to the 1-21-th sub-touch electrode T1-21, a 1-22-th signal line S1-22 coupled to the 1-22-th sub-touch electrode T1-22, a 1-23-th signal line S1-23 coupled to the 1-23-th sub-touch electrode T1-23, and a 1-24-th signal line S1-24 coupled to the 1-24-th sub-touch electrode T1-24.

Portions of the 1-2-th signal lines S1-2, provided in the sensing area SA, may extend along the inner circumferences or outer circumferences of the 1-1-th sub-touch electrodes T1-1, and portions of the 1-2-th signal lines S1-2, provided in the non-sensing area NSA, may extend from the boundary between the first partition region DR1 and the fourth partition region DR4 in parallel to the 1-1-th signal lines S1-1.

The 1-2-th signal lines S1-2 may be electrically coupled to each other in the non-sensing area NSA. For example, the 1-21-th signal line S1-21, the 1-22-th signal line S1-22, the 1-23-th signal line S1-23, and the 1-24-th signal line S1-24 may be coupled to a 1-2-th coupling pad CP1-2 provided in the non-sensing area NSA, and may be supplied with the same signal through the 1-2-th coupling pad CP1-2.

The 1-3-th sub-touch electrodes T1-3 may include a 1-31-th sub-touch electrode T1-31 arranged in the first ring C1, a 1-32-th sub-touch electrode T1-32 arranged in the second ring C2, a 1-33-th sub-touch electrode T1-33 arranged in the third ring C3, and a 1-34-th sub-touch electrode T1-34 arranged in the fourth ring C4.

1-3-th signal lines S1-3 may be coupled to the 1-3-th sub-touch electrodes T1-3, respectively. The 1-3-th signal lines S1-3 may include a 1-31-th signal line S1-31 coupled to the 1-31-th sub-touch electrode T1-31, a 1-32-th signal line S1-32 coupled to the 1-32-th sub-touch electrode T1-32, a 1-33-th signal line S1-33 coupled to the 1-33-th sub-touch electrode T1-33, and a 1-34-th signal line S1-34 coupled to the 1-34-th sub-touch electrode T1-34.

Portions of the 1-3-th signal lines S1-3, provided in the sensing area SA, may extend along the inner circumferences or outer circumferences of the 1-4-th sub-touch electrodes T1-4, and portions of the 1-3-th signal lines S1-3, provided in the non-sensing area NSA, may extend from the boundary between the first partition region DR1 and the fourth partition region DR4 in parallel to the 1-1-th signal lines S1-1.

The 1-3-th signal lines S1-3 may be electrically coupled to each other in the non-sensing area NSA. For example, the 1-31-th signal line S1-31, the 1-32-th signal line S1-32, the 1-33-th signal line S1-33, and the 1-34-th signal line S1-34 may be coupled to a 1-3-th coupling pad CP1-3 provided in the non-sensing area NSA, and may be supplied with the same signal through the 1-3-th coupling pad CP1-3.

The 1-4-th sub-touch electrodes T1-4 may include a 1-41-th sub-touch electrode T1-41 arranged in the first ring C1, a 1-42-th sub-touch electrode T1-42 arranged in the second ring C2, a 1-43-th sub-touch electrode T1-43 arranged in the third ring C3, and a 1-44-th sub-touch electrode T1-44 arranged in the fourth ring C4.

1-4-th signal lines S1-4 may be coupled to the 1-4-th sub-touch electrodes T1-4, respectively. The 1-4-th signal lines S1-4 may include a 1-41-th signal line S1-41 coupled to the 1-41-th sub-touch electrode T1-41, a 1-42-th signal line S1-42 coupled to the 1-42-th sub-touch electrode T1-42, a 1-43-th signal line S1-43 coupled to the 1-43-th sub-touch electrode T1-43, and a 1-44-th signal line S1-44 coupled to the 1-44-th sub-touch electrode T1-44.

The 1-4-th signal lines S1-4 may extend from the boundary between the first partition region DR1 and the fourth partition region DR4 in parallel to the 1-1-th signal lines S1-1. The 1-4-th signal lines S1-4 may be electrically coupled to each other in the non-sensing area NSA. For example, the 1-41-th signal line S1-41, the 1-42-th signal line S1-42, the 1-43-th signal line S1-43, and the 1-44-th signal line S1-44 may be coupled to a 1-4-th coupling pad CP1-4 provided in the non-sensing area NSA, and may be supplied with the same signal through the 1-4-th coupling pad CP1-4.

The 1-1-th to 1-4-th coupling pads CP1-1, CP1-2, CP1-3, and CP1-4 may be provided on the same layer as at least one of the gate electrode GE and the source/drain electrodes SE/DE of the display panel DPN. For example, all of the 1-1-th to 1-4-th coupling pads CP1-1, CP1-2, CP1-3, and CP1-4 may be provided on the same layer as the source/drain electrodes SE/DE. For example, some of the 1-1-th to 1-4-th coupling pads CP1-1, CP1-2, CP1-3, and CP1-4 may be provided on the same layer as the gate electrode GE, and the remaining coupling pads may be provided on the same layer as the source/drain electrodes SE/DE.

The second touch electrodes T2 may include a plurality of second sub-touch electrodes T2-1, T2-2, T2-3, T2-4, T2-5, T2-6, T2-7, T2-8, T2-9, T2-10, T2-11, T2-12, and T2-13. For example, the second touch electrodes T2 may include 2-1-th to 2-13-th sub-touch electrodes T2-1, T2-2, T2-3, T2-4, T2-5, T2-6, T2-7, T2-8, T2-9, T2-10, T2-11, T2-12, and T2-13.

Among the 2-1-th to 2-13-th sub-touch electrodes T2-1, T2-2, T2-3, T2-4, T2-5, T2-6, T2-7, T2-8, T2-9, T2-10, T2-11, T2-12, and T2-13, portions of second sub-touch electrodes having substantially equal distances to the center of a closed curve may form the shape of rings. For instance, the second touch electrodes T2 may include a plurality of groups of sub-touch electrodes in the form of a plurality of rings having the shape of generally concentric circles, for example, fifth to eighth rings C5, C6, C7, and C8. The fifth to eighth rings C5, C6, C7, and C8 may be generally concentric with and arranged alternately with the first to fourth rings C1, C2, C3, and C4. Here, in the sequence of the fifth to eighth rings C5, C6, C7, and C8, the outermost concentric circle may be the fifth ring C5, and the innermost concentric circle may be the eighth ring C8. Also, the fifth ring C5 may be interposed between the first ring C1 and the second ring C2, the sixth ring C6 may be interposed between the second ring C2 and the third ring C3, the seventh ring C7 may be interposed between the third ring C3 and the fourth ring C4, and the eighth ring C8 may be disposed inside the fourth ring C4.

Here, the sub-touch electrodes of the first touch electrodes T1 disposed in the second to fourth rings C2, C3, and C4 may have a first width W1 in the direction of the diameter of the touch sensor TS, and the sub-touch electrodes of the second touch electrodes T2 may have a second width W2 in the direction of the diameter of the touch sensor TS. Also, the second width W2 may be 1 to 1.5 times the first width W1.

Sub-touch electrodes disposed in each of the fifth to eighth rings C5, C6, C7, and C8 may be grouped and the grouped sub-touch electrodes may be electrically connected to a common signal line and/or a common signal pad.

In each of the first to fourth partition regions DR1, DR2, DR3, and DR4 of the fifth ring C5, 2-1-th to 2-6-th sub-touch electrodes T2-1, T2-2, T2-3, T2-4, T2-5, and T2-6 may be arranged. A structure in which the 2-1-th to 2-6-th sub-touch electrodes T2-1, T2-2, T2-3, T2-4, T2-5, and T2-6 are arranged in the first to fourth partition regions DR1, DR2, DR3, and DR4 will be described below.

The 2-1-th to 2-6-th sub-touch electrodes T2-1, T2-2, T2-3, T2-4, T2-5, and T2-6 may be arranged counterclockwise in the first partition region DR1 of the fifth ring C5. The 2-1-th to 2-6-th sub-touch electrodes T2-1, T2-2, T2-3, T2-4, T2-5, and T2-6 may be arranged clockwise in the second partition region DR2 of the fifth ring C5. That is, the 2-1-th to 2-6-th sub-touch electrodes T2-1, T2-2, T2-3, T2-4, T2-5, and T2-6 may be symmetrically arranged in the first partition region DR1 and the second partition region DR2 of the fifth ring C5.

The 2-1-th to 2-6-th sub-touch electrodes T2-1, T2-2, T2-3, T2-4, T2-5, and T2-6 may be arranged counterclockwise in the third partition region DR3 of the fifth ring C5. That is, the 2-1-th to 2-6-th sub-touch electrodes T2-1, T2-2, T2-3, T2-4, T2-5, and T2-6 may be symmetrically arranged in the second partition region DR2 and the third partition region DR3 of the fifth ring C5.

The 2-1-th to 2-6-th sub-touch electrodes T2-1, T2-2, T2-3, T2-4, T2-5, and T2-6 may be arranged clockwise in the fourth partition region DR4 of the fifth ring C5. That is, the 2-1-th to 2-6-th sub-touch electrodes T2-1, T2-2, T2-3, T2-4, T2-5, and T2-6 may be symmetrically arranged in the third partition region DR3 and the fourth partition region DR4 of the fifth ring C5. That is, the 2-1-th to 2-6-th sub-touch electrodes T2-1, T2-2, T2-3, T2-4, T2-5, and T2-6 may be symmetrically arranged in the first partition region DR1 and the fourth partition region DR4 of the fifth ring C5.

Here, at the boundaries between the adjacent partition regions of the fifth ring C5, 2-1-th or 2-6-th sub-touch electrodes T2-1 or T2-6 may be arranged. The 2-1-th or 2-6-th sub-touch electrodes T2-1 or T2-6 arranged at each boundary between the adjacent partition regions may have an integrated shape. For example, the 2-6-th sub-touch electrodes T2-6 arranged at the boundary between the first partition region DR1 and the second partition region DR2 may be integrated with each other, the 2-1-th sub-touch electrodes T2-1 arranged at the boundary between the second partition region DR2 and the third partition region DR3 may be integrated with each other, and the 2-6-th sub-touch electrodes T2-6 arranged at the boundary between the third partition region DR3 and the fourth partition region DR4 may be integrated with each other. Therefore, the 2-1-th or 2-6-th sub-touch electrodes T2-1 or T2-6 arranged at each boundary between the adjacent partition regions may have an area greater than (e.g., twice) that of the 2-2-th to 2-5-th sub-touch electrodes T2-2, T2-3, T2-4, and T2-5.

The same second sub-touch electrodes arranged in the first to fourth partition regions DR1 to DR4 may be coupled to the same signal line and then be supplied with the same signal. That is, the second sub-touch electrodes disposed at substantially the same distance along the same ring from the boundary between adjacent partition regions DR1, DR2, DR3, and DR4 may be coupled to the same signal line.

In the fifth ring C5, the same second sub-touch electrodes arranged in the first, second, third, and fourth partition regions DR1, DR2, DR3, and DR4 may be coupled to the same signal line and then be supplied with the same signal. That is, in the fifth ring C5, the second sub-touch electrodes disposed at substantially the same distances from the boundaries between the adjacent partition regions DR1, DR2, DR3, and DR4 may be coupled to the same signal lines. In greater detail, in the fifth ring C5, the 2-1-th sub-touch electrodes T2-1 arranged in the first to fourth partition regions DR1, DR2, DR3, and DR4 may be coupled to a 2-1-th signal line S2-1, the 2-2-th sub-touch electrodes T2-2 arranged in the first to fourth partition regions DR1, DR2, DR3, and DR4 may be coupled to a 2-2-th signal line S2-2, the 2-3-th sub-touch electrodes T2-3 arranged in the first to fourth partition regions DR1, DR2, DR3, and DR4 may be coupled to a 2-3-th signal line S2-3, the 2-4-th sub-touch electrodes T2-4 arranged in the first to fourth partition regions DR1, DR2, DR3, and DR4 may be coupled to a 2-4-th signal line S2-4, the 2-5-th sub-touch electrodes T2-5 arranged in the first to fourth partition regions DR1, DR2, DR3, and DR4 may be coupled to a 2-5-th signal line S2-5, and the 2-6-th sub-touch electrodes T2-6 arranged in the first to fourth partition regions DR1, DR2, DR3, and DR4 may be coupled to a 2-6-th signal line S2-6.

Portions of the 2-1-th to 2-6-th signal lines S2-1, S2-2, S2-3, S2-4, S2-5, and S2-6, which are arranged in the sensing area SA, may have shapes in which they extend along the inner circumference or outer circumference of the fifth ring C5. Portions of the 2-1-th to 2-6-th signal lines S2-1, S2-2, S2-3, S2-4, S2-5, and S2-6, which are arranged in the sensing area SA, may be disposed outside the fifth ring C5 or between the fifth ring C5 and the first ring C1.

The 2-7-th to 2-10-th sub-touch electrodes T2-7, T2-8, T2-9, and T2-10 may be arranged counterclockwise in the first partition region DR1 of the sixth ring C6. The 2-7-th to 2-10-th sub-touch electrodes T2-7, T2-8, T2-9, and T2-10 may be arranged clockwise in the second partition region DR2 of the sixth ring C6. That is, the 2-7-th to 2-10-th sub-touch electrodes T2-7, T2-8, T2-9, and T2-10 may be symmetrically arranged in the first partition region DR1 and the second partition region DR2 of the sixth ring C6.

The 2-7-th to 2-10-th sub-touch electrodes T2-7, T2-8, T2-9, and T2-10 may be arranged counterclockwise in the third partition region DR3 of the sixth ring C6. That is, the 2-7-th to 2-10-th sub-touch electrodes T2-7, T2-8, T2-9, and T2-10 may be symmetrically arranged in the second partition region DR2 and the third partition region DR3 of the sixth ring C6.

The 2-7-th to 2-10-th sub-touch electrodes T2-7, T2-8, T2-9, and T2-10 may be arranged clockwise in the fourth partition region DR4 of the sixth ring C6. That is, the 2-7-th to 2-10-th sub-touch electrodes T2-7, T2-8, T2-9, and T2-10 may be symmetrically arranged in the third partition region DR3 and the fourth partition region DR4 of the sixth ring C6. Also, the 2-7-th to 2-10-th sub-touch electrodes T2-7, T2-8, T2-9, and T2-10 may be symmetrically arranged in the first partition region DR1 and the fourth partition region DR4 of the sixth ring C6.

Here, at the boundaries between adjacent partition regions of the sixth ring C6, 2-7-th or 2-10-th sub-touch electrodes T2-7 or T2-10 may be arranged. The 2-7-th or 2-10-th sub-touch electrodes T2-7 or T2-10 arranged at each boundary between the adjacent partition regions may have an integrated shape. For example, the 2-10-th sub-touch electrodes T2-10 arranged at the boundary between the first partition region DR1 and the second partition region DR2 may be integrated with each other, the 2-7-th sub-touch electrodes T2-7 arranged at the boundary between the second partition region DR2 and the third partition region DR3 may be integrated with each other, and the 2-10-th sub-touch electrodes T2-10 arranged at the boundary between the third partition region DR3 and the fourth partition region DR4 may be integrated with each other. Therefore, the 2-7-th or 2-10-th sub-touch electrodes T2-7 or T2-10 arranged at the boundary between adjacent partition regions may have an area greater than (e.g., twice) that of the 2-8-th and 2-9-th sub-touch electrodes T2-8 and T2-9.

In the sixth ring C6, the same sub-touch electrodes arranged in the first, second, third and fourth partition regions DR1, DR2, DR3, and DR4 may be coupled to the same signal line and then be supplied with the same signal. That is, in the sixth ring C6, the second sub-touch electrodes disposed at substantially the same distances from the boundaries between the adjacent partition regions DR1, DR2, DR3, and DR4 may be coupled to the same signal lines. This configuration will be described in detail below. In the sixth ring C6, the 2-7-th sub-touch electrodes T2-7 arranged in the first to fourth partition regions DR1, DR2, DR3, and DR4 may be coupled to a 2-7-th signal line S2-7, the 2-8-th sub-touch electrodes T2-8 arranged in the first to fourth partition regions DR1, DR2, DR3, and DR4 may be coupled to a 2-8-th signal line S2-8, the 2-9-th sub-touch electrodes T2-9 arranged in the first to fourth partition regions DR1, DR2, DR3, and DR4 may be coupled to a 2-9-th signal line S2-9, and the 2-10-th sub-touch electrodes T2-10 arranged in the first to fourth partition regions DR1, DR2, DR3, and DR4 may be coupled to a 2-10-th signal line S2-10.

The 2-11-th and 2-12-th sub-touch electrodes T2-11 and T2-12 may be arranged in each of the first to fourth partition regions DR1, DR2, DR3, and DR4 of the seventh ring C7. Also, the 2-11-th or 2-12-th sub-touch electrodes T2-11 or T2-12 arranged at each boundary between adjacent partition regions may have an integrated shape. For example, the 2-12-th sub-touch electrodes T2-12 arranged at the boundary between the first partition region DR1 and the second partition region DR2 may be integrated with each other, the 2-11-th sub-touch electrodes T2-11 arranged at the boundary between the second partition region DR2 and the third partition region DR3 may be integrated with each other, and the 2-12-th sub-touch electrodes T2-12 arranged at the boundary between the third partition region DR3 and the fourth partition region DR4 may be integrated with each other.

When the 2-11-th or 2-12-th sub-touch electrodes T2-11 or T2-12 arranged at each boundary between adjacent partition regions are integrated with each other, the 2-11-th sub-touch electrodes T2-11 may be provided over the second partition region DR2 and the third partition region DR3. The 2-12-th sub-touch electrodes T2-12 may be provided over the first partition region DR1 and the second partition region DR2 and over the third partition region DR3 and the fourth partition region DR4. That is, in the seventh ring C7, the 2-11-th and the 2-12-th sub-touch electrodes T2-11 and T2-12 adjacent to each other may form respective semicircular shapes.

In the seventh ring C7, the same sub-touch electrodes arranged in the first, second, third, and fourth partition regions DR1, DR2, DR3, and DR4 may be coupled to the same signal line and then be supplied with the same signal. That is, in the seventh ring C7, the second sub-touch electrodes disposed at substantially the same distances from the boundaries between the adjacent partition regions DR1, DR2, DR3, and DR4 may be coupled to the same signal lines. This configuration will be described in detail below. In the seventh ring C7, the 2-11-th sub-touch electrodes T2-11 arranged in the first to fourth partition regions DR1, DR2, DR3, and DR4 may be coupled to a 2-11-th signal line S2-11, and the 2-12-th sub-touch electrodes T2-12 arranged in the first to fourth partition regions DR1, DR2, DR3, and DR4 may be coupled to a 2-12-th signal line S2-12.

The eighth ring C8 may be arranged at the centermost location of the first to eighth rings C1, C2, C3, C4, C5, C6, C7, and C8. Also, the 2-13-th sub-touch electrode T2-13 of the eighth C8 may have a shape in which the first to fourth partition regions DR1, DR2, DR3, and DR4 are integrated, and the 2-13-th sub-touch electrode T2-13 may be coupled to a 2-13-th signal line.

In the above-described touch sensor TS, capacitors (mutual capacitance) may be formed between the first touch electrodes T1 and the second touch electrodes T2 adjacent to each other.

This configuration will be described in detail below. Capacitors may be formed between the 1-11-th to 1-41-th sub-touch electrodes T1-11, T1-21, T1-31, and T1-41 of the first touch electrodes T1 arranged in the first ring C1 and the 2-1-th to 2-6-th sub-touch electrodes T2-1, T2-2, T2-3, T2-4, T2-5, and T2-6 of the second touch electrodes T2 disposed in the fifth ring C5. Capacitors may be formed between the 1-12-th to 1-42-th sub-touch electrodes T1-12, T1-22, T1-32, and T1-42 of the first touch electrodes T1 arranged in the second ring C2 and the 2-1-th to 2-6-th sub-touch electrodes T2-1, T2-2, T2-3, T2-4, T2-5, and T2-6 of the second touch electrodes T2 arranged in the fifth ring C5. Capacitors may be formed between the 1-12-th to 1-42-th sub-touch electrodes T1-12, T1-22, T1-32, and T1-42 of the first touch electrodes T1 arranged in the second ring C2 and the 2-7-th to 2-10-th sub-touch electrodes T2-7, T2-8, T2-9, and T2-10 of the second touch electrodes T2 arranged in the sixth ring C6. Capacitors may be formed between the 1-13-th to 1-43-th sub-touch electrodes T1-13, T1-23, T1-33, and T1-43 of the first touch electrodes T1 arranged in the third ring C3 and the 2-7-th to 2-10-th sub-touch electrodes T2-7, T2-8, T2-9, and T2-10 of the second touch electrodes T2 arranged in the sixth ring C6. Capacitors may be formed between the 1-13-th to 1-43-th sub-touch electrodes T1-13, T1-23, T1-33, and T1-43 of the first touch electrodes T1 arranged in the third ring C3 and the 2-11-th and 2-12-th sub-touch electrodes T2-11 and T2-12 of the second touch electrodes T2 arranged in the seventh ring C7. Capacitors may be formed between the 1-14-th to 1-44-th sub-touch electrodes T1-14, T1-24, T1-34, and T1-44 of the first touch electrodes T1 arranged in the fourth ring C4 and the 2-11-th and 2-12-th sub-touch electrodes T2-11 and T2-12 of the second touch electrodes T2 arranged in the seventh ring C7. Capacitors may be formed between the 1-14-th to 1-44-th sub-touch electrodes T1-14, T1-24, T1-34, and T1-44 of the first touch electrodes T1 arranged in the fourth ring C4 and the 2-13-th sub-touch electrode T2-13 of the second touch electrodes T2 arranged in the eighth ring C8.

Six capacitors may be formed in each of the partition regions DR1, DR2, DR3, and DR4 between the 1-11-th to 1-41-th sub-touch electrodes T1-11, T1-21, T1-31, and T1-41 of the first touch electrodes T1 in the first ring C1 and the 2-1-th to 2-6-th sub-touch electrodes T2-1, T2-2, T2-3, T2-4, T2-5, and T2-6 of the second touch electrodes T2 in the fifth ring C5. This configuration will be described in detail below. Six capacitors may be formed between the 1-11-th sub-touch electrode T1-11 and the 2-1-th to 2-6-th sub-touch electrodes T2-1, T2-2, T2-3, T2-4, T2-5, and T2-6 in the first partition region DR1, six capacitors may be formed between the 1-21-th sub-touch electrode T1-21 and the 2-1-th to 2-6-th sub-touch electrodes T2-1, T2-2, T2-3, T2-4, T2-5, and T2-6 in the second partition region DR2, six capacitors may be formed between the 1-31-th sub-touch electrode T1-31 and the 2-1-th to 2-6-th sub-touch electrodes T2-1, T2-2, T2-3, T2-4, T2-5, and T2-6 in the third partition region DR3, and six capacitors may be formed between the 1-41-th sub-touch electrode T1-41 and the 2-1-th to 2-6-th sub-touch electrodes T2-1, T2-2, T2-3, T2-4, T2-5, and T2-6 in the fourth partition region DR4.

Six capacitors may be formed in each of the partition regions DR1, DR2, DR3, and DR4 between the 1-12-th to 1-42-th sub-touch electrodes T1-12, T1-22, T1-32, and T1-42 of the first touch electrodes T1 in the second ring C2 and the 2-1-th to 2-6-th sub-touch electrodes T2-1, T2-2, T2-3, T2-4, T2-5, and T2-6 of the second touch electrodes T2 in the fifth ring C5. This configuration will be described in detail below. Six capacitors may be formed between the 1-12-th sub-touch electrode T1-12 and the 2-1-th to 2-6-th sub-touch electrodes T2-1, T2-2, T2-3, T2-4, T2-5, and T2-6 in the first partition region DR1, six capacitors may be formed between the 1-22-th sub-touch electrode T1-22 and the 2-1-th to 2-6-th sub-touch electrodes T2-1, T2-2, T2-3, T2-4, T2-5, and T2-6 in the second partition region DR2, six capacitors may be formed between the 1-32-th sub-touch electrode T1-32 and the 2-1-th to 2-6-th sub-touch electrodes T2-1, T2-2, T2-3, T2-4, T2-5, and T2-6 in the third partition region DR3, and six capacitors may be formed between the 1-42-th sub-touch electrode T1-42 and the 2-1-th to 2-6-th sub-touch electrodes T2-1, T2-2, T2-3, T2-4, T2-5, and T2-6 in the fourth partition region DR4.

Four capacitors may be formed in each of the partition regions DR1, DR2, DR3, and DR4 between the 1-12-th to 1-42-th sub-touch electrodes T1-12, T1-22, T1-32, and T1-42 of the first touch electrodes T1 in the second ring C2 and the 2-7-th to 2-10-th sub-touch electrodes T2-7, T2-8, T2-9, and T2-10 of the second touch electrodes T2 in the sixth ring C6. This configuration will be described in detail below. Four capacitors may be formed between the 1-12-th sub-touch electrode T1-12 and the 2-7-th to 2-10-th sub-touch electrodes T2-7, T2-8, T2-9, and T2-10 in the first partition region DR1, four capacitors may be formed between the 1-22-th sub-touch electrode T1-22 and the 2-7-th to 2-10-th sub-touch electrodes T2-7, T2-8, T2-9, and T2-10 in the second partition region DR2, four capacitors may be formed between the 1-32-th sub-touch electrode T1-32 and the 2-7-th to 2-10-th sub-touch electrodes T2-7, T2-8, T2-9, and T2-10 in the third partition region DR3, and four capacitors may be formed between the 1-42-th sub-touch electrode T1-42 and the 2-7-th to 2-10-th sub-touch electrodes T2-7, T2-8, T2-9, and T2-10 in the fourth partition region DR4.

Four capacitors may be formed in each of the partition regions DR1, DR2, DR3, and DR4 between the 1-13-th to 1-43-th sub-touch electrodes T1-13, T1-23, T1-33, and T1-43 of the first touch electrodes T1 in the second ring C3 and the 2-7-th to 2-10-th sub-touch electrodes T2-7, T2-8, T2-9, and T2-10 of the second touch electrodes T2 in the sixth ring C6. This configuration will be described in detail below. Four capacitors may be formed between the 1-13-th sub-touch electrode T1-13 and the 2-7-th to 2-10-th sub-touch electrodes T2-7, T2-8, T2-9, and T2-10 in the first partition region DR1, four capacitors may be formed between the 1-23-th sub-touch electrode T1-23 and the 2-7-th to 2-10-th sub-touch electrodes T2-7, T2-8, T2-9, and T2-10 in the second partition region DR2, four capacitors may be formed between the 1-33-th sub-touch electrode T1-33 and the 2-7-th to 2-10-th sub-touch electrodes T2-7, T2-8, T2-9, and T2-10 in the third partition region DR3, and four capacitors may be formed between the 1-43-th sub-touch electrode T1-43 and the 2-7-th to 2-10-th sub-touch electrodes T2-7, T2-8, T2-9, and T2-10 in the fourth partition region DR4.

Two capacitors may be formed in each of the partition regions DR1, DR2, DR3, and DR4 between the 1-13-th to 1-43-th sub-touch electrodes T1-13, T1-23, T1-33, and T1-43 of the first touch electrodes T1 in the third ring C3 and the 2-11-th and 2-12-th sub-touch electrodes T2-11 and T2-12 of the second touch electrode T2 in the seventh ring C7. This configuration will be described in detail below. Two capacitors may be formed between the 1-13-th sub-touch electrode T1-13 and the 2-11-th and 2-12-th sub-touch electrodes T2-11 and T2-12 in the first partition region DR1, two capacitors may be formed between the 1-23-th sub-touch electrode T1-23 and the 2-11-th and 2-12-th sub-touch electrodes T2-11 and T2-12 in the second partition region DR2, two capacitors may be formed between the 1-33-th sub-touch electrode T1-33 and the 2-11-th and 2-12-th sub-touch electrodes T2-11 and T2-12 in the third partition region DR3, and two capacitors may be formed between the 1-43-th sub-touch electrode T1-43 and the 2-11-th and 2-12-th sub-touch electrodes T2-11 and T2-12 in the fourth partition region DR4.

Two capacitors may be formed in each of the partition regions DR1, DR2, DR3, and DR4 between the 1-14-th to 1-44-th sub-touch electrodes T1-14, T1-24, T1-34, and T1-44 of the first touch electrodes T1 in the fourth ring C4 and the 2-11-th and 2-12-th sub-touch electrodes T2-11 and T2-12 of the second touch electrodes T2 in the seventh ring C7. This configuration will be described in detail below. Two capacitors may be formed between the 1-14-th sub-touch electrode T1-14 and the 2-11-th and 2-12-th sub-touch electrodes T2-11 and T2-12 in the first partition region DR1, two capacitors may be formed between the 1-24-th sub-touch electrode T1-24 and the 2-11-th and 2-12-th sub-touch electrodes T2-11 and T2-12 in the second partition region DR2, two capacitors may be formed between the 1-34-th sub-touch electrode T1-34 and the 2-11-th and 2-12-th sub-touch electrodes T2-11 and T2-12 in the third partition region DR3, and two capacitors may be formed between the 1-44-th sub-touch electrode T1-44 and the 2-11-th and 2-12-th sub-touch electrodes T2-11 and T2-12 in the fourth partition region DR4.

One capacitor may be formed in each of the partition regions DR1, DR2, DR3, and DR4 between the 1-14-th to 1-44-th sub-touch electrodes T1-14, T1-24, T1-34, and T1-44 of the first touch electrodes T1 in the fourth ring C4 and the 2-13-th sub-touch electrode T2-13 of the second touch electrodes T2 in the eighth ring C8. This configuration will be described in detail below. One capacitor may be formed between the 1-14-th sub-touch electrode T1-14 and the 2-13-th sub-touch electrode T2-13 in the first partition region DR1, one capacitor may be formed between the 1-24-th sub-touch electrode T1-24 and the 2-13-th sub-touch electrode T2-13 in the second partition region DR2, one capacitor may be formed between the 1-34-th sub-touch electrode T1-34 and the 2-13-th sub-touch electrode T2-13 in the third partition region DR3, and one capacitor may be formed between the 1-44-th sub-touch electrode T1-44 and the 2-13-th sub-touch electrode T2-13 in the fourth partition region DR4.

The above-described touch sensor TS may enable the number of signal lines to be reduced compared to the case where signal lines are separately coupled to respective sub-touch electrodes. For example, sub-touch electrodes of the first touch electrodes T1 disposed in a partition region may be electrically connected to a common signal line or pad, sub-touch electrodes of a ring of the second touch electrodes T2 may be electrically connected to a common signal line or pad, and such configuration enable the number of signal lines to be reduced. Also, as the number of signal lines is reduced, the number of signal pads may also be reduced.

Figure 28:
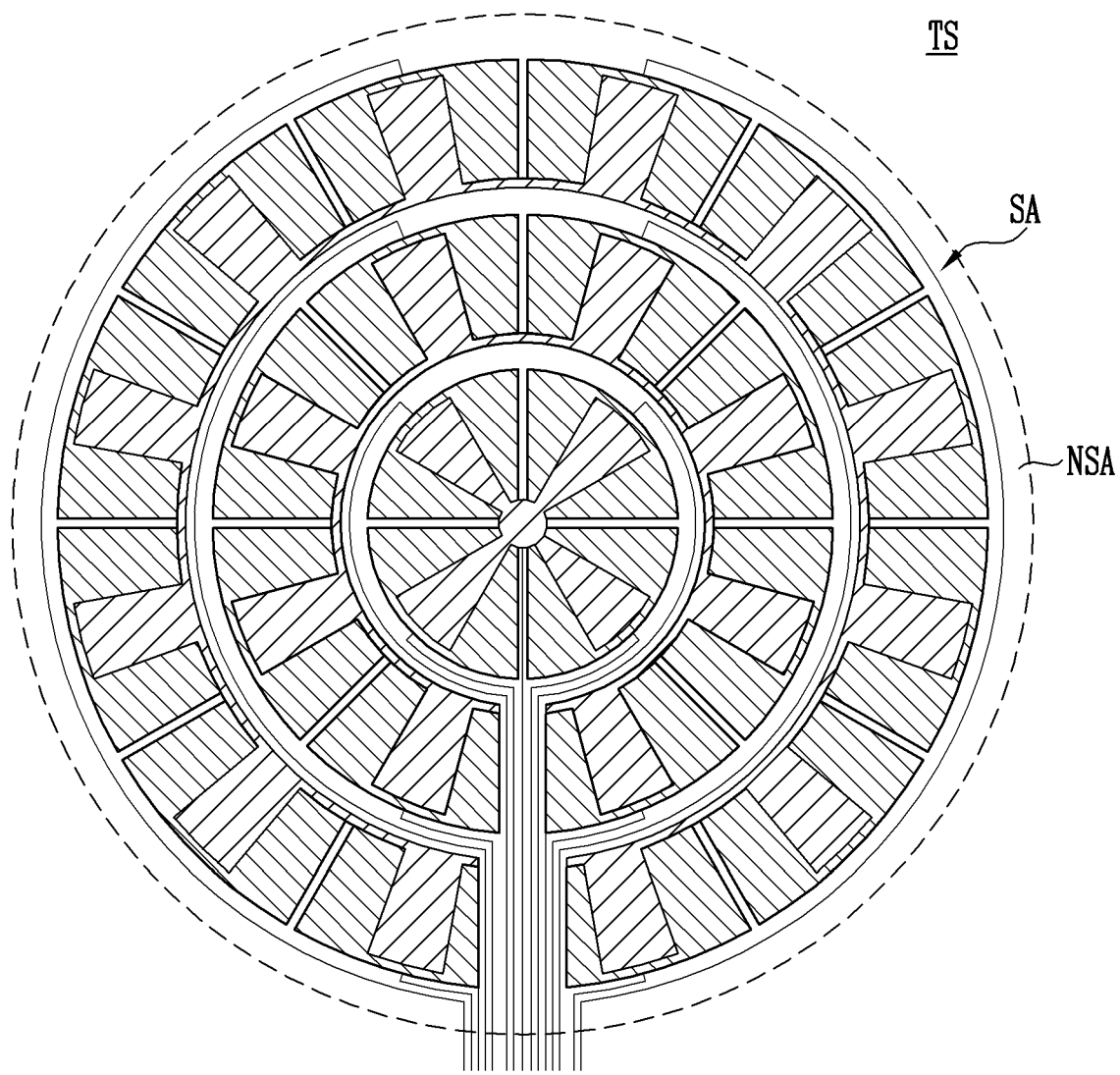
FIG. 28 is a plan view of another exemplary embodiment of the touch sensor of FIG. 3 constructed according to the principles of the invention.
Figure 29:
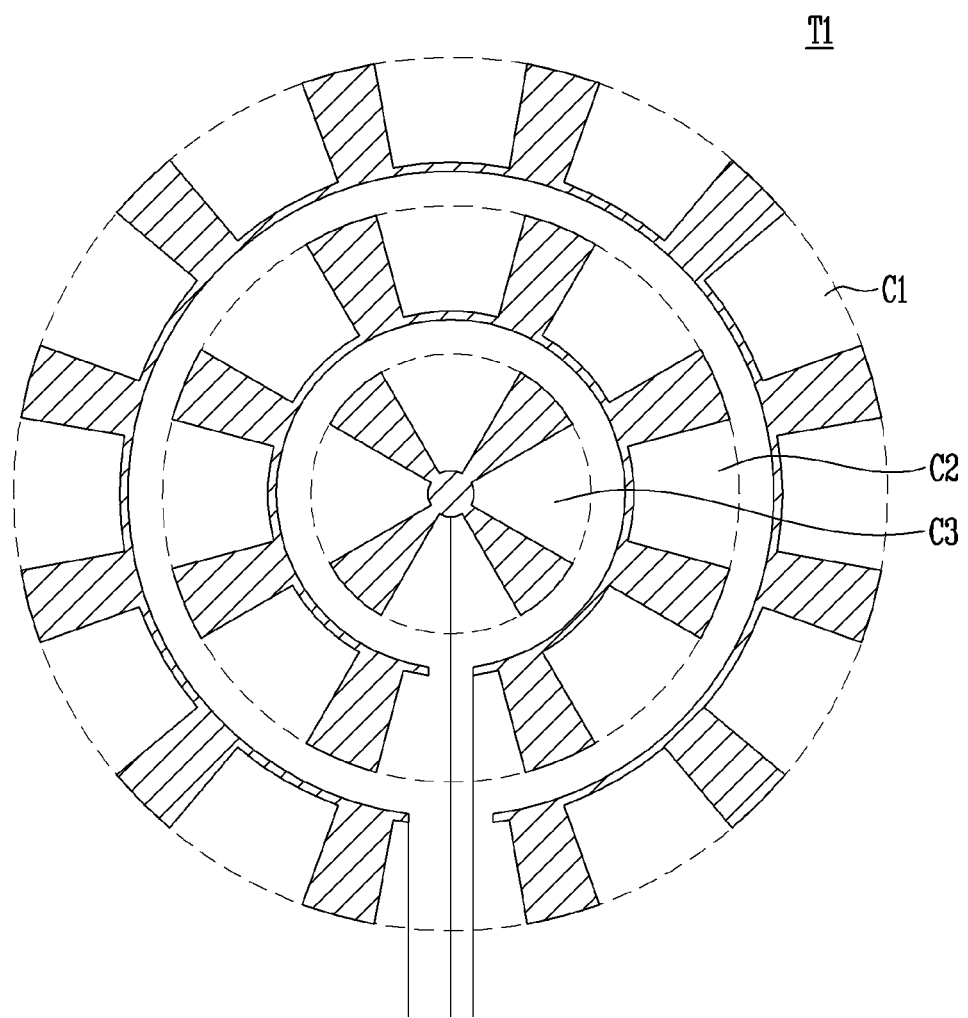
FIG. 29 is a plan view of a first touch electrode of the touch sensor of FIG. 28.
Figure 30:
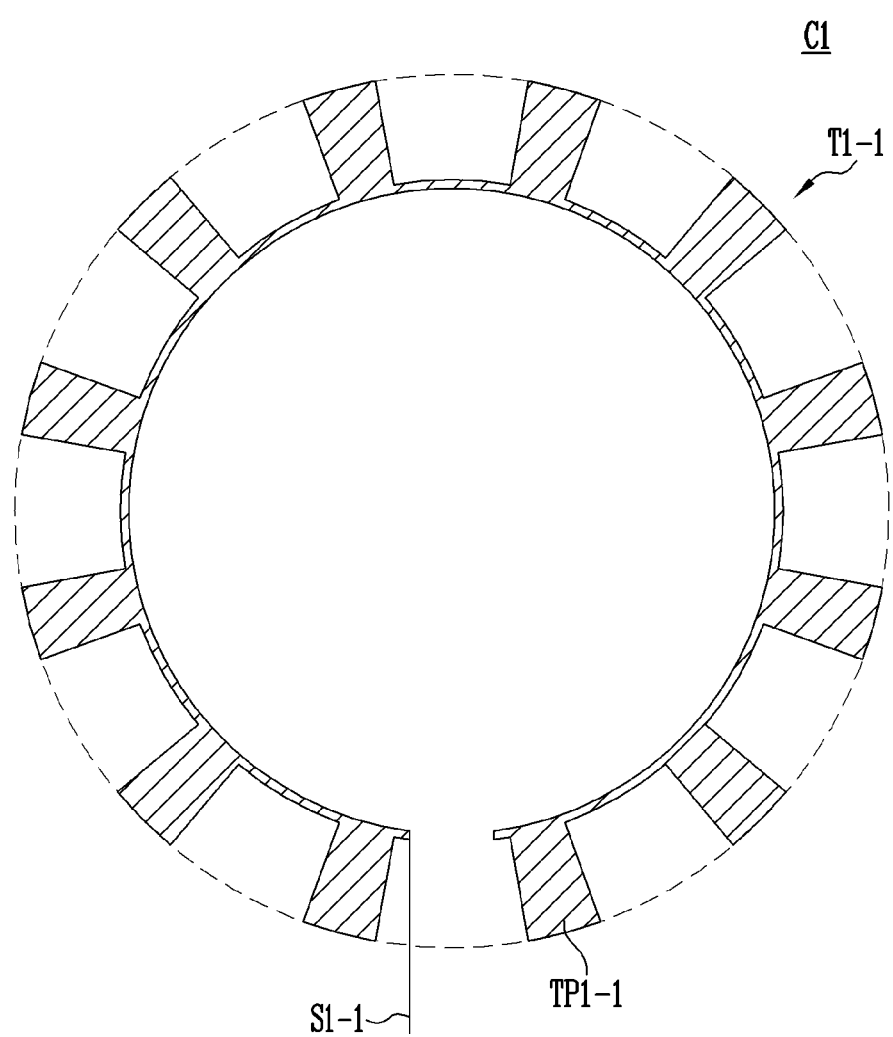
FIG. 30 is a plan view of a 1-1-th sub-touch electrode of the first touch electrode of FIG. 29.
Figure 31:
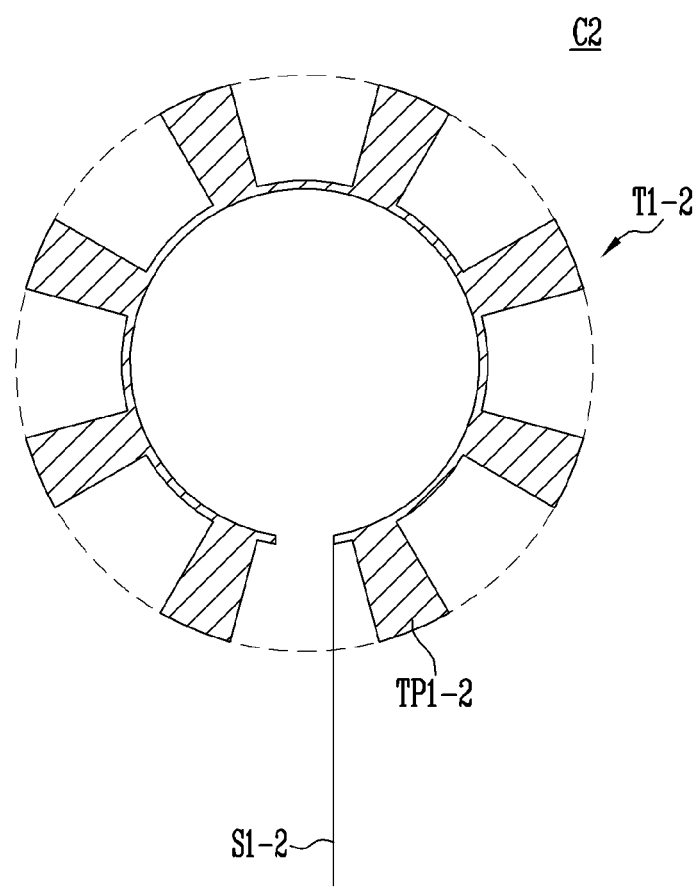
FIG. 31 is a plan view of a 1-2-th sub-touch electrode of the first touch electrode of FIG. 29.
Figure 32:
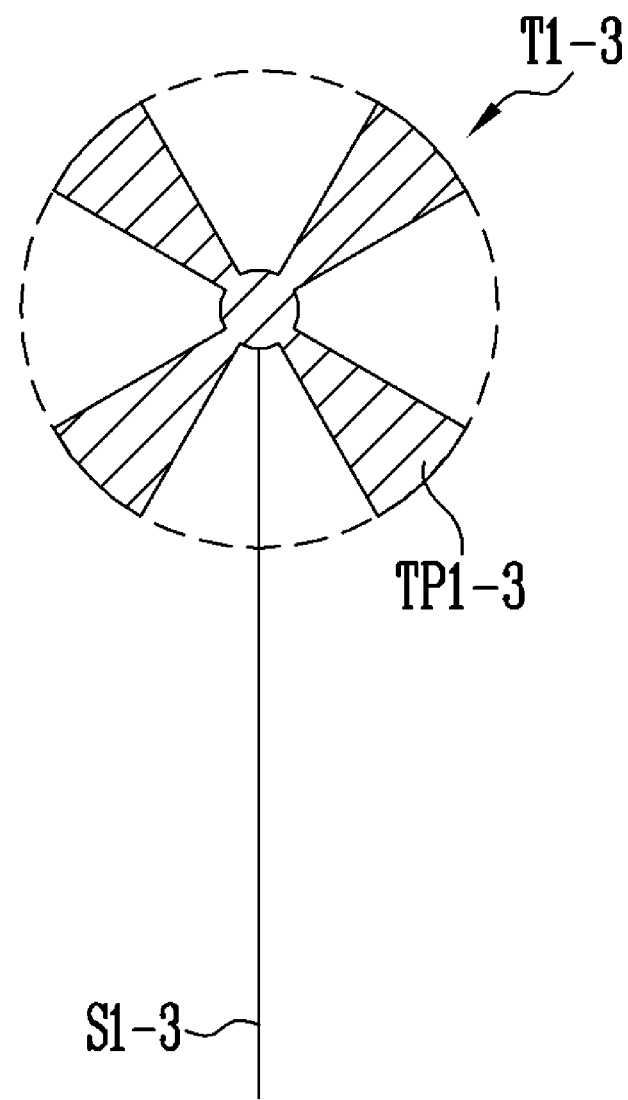
FIG. 32 is a plan view of a 1-3-th sub-touch electrode of the first touch electrode of FIG. 29.
Figure 33:
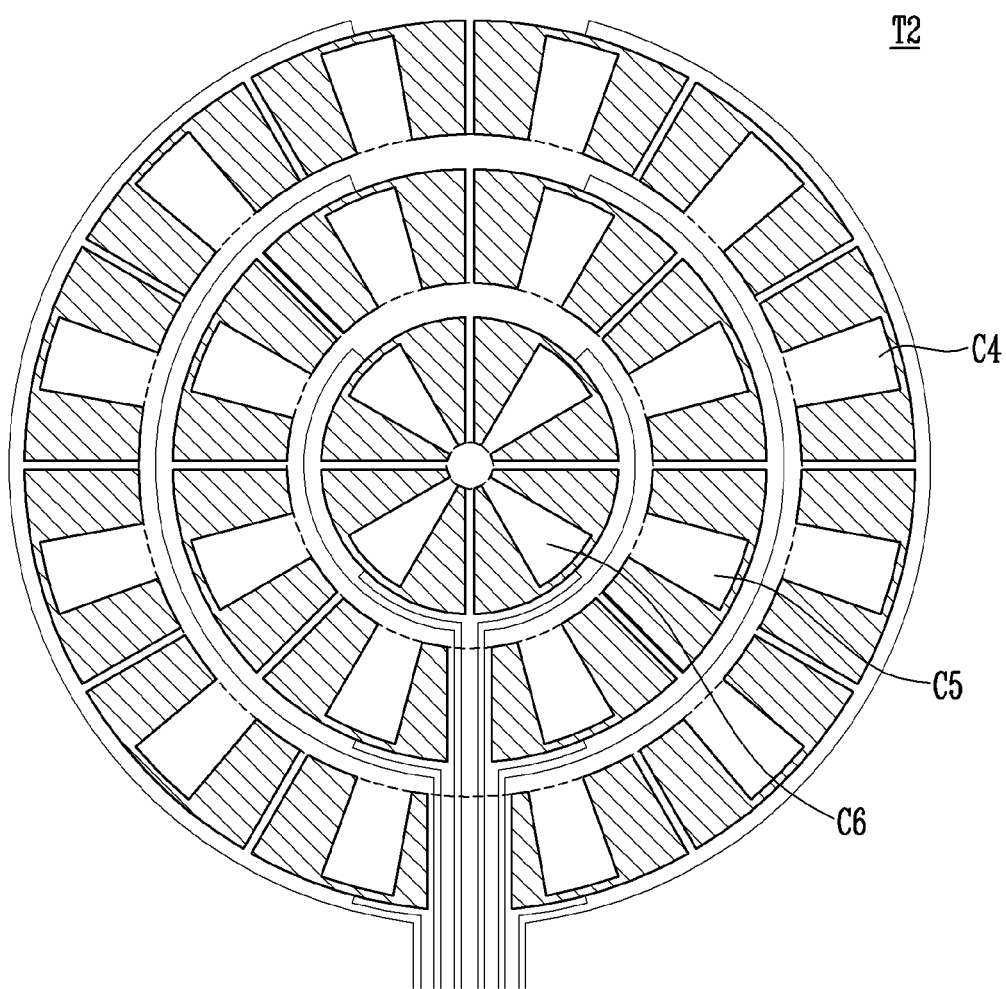
FIG. 33 is a plan view of a second touch electrode of the touch sensor of FIG. 28.
Figure 34:
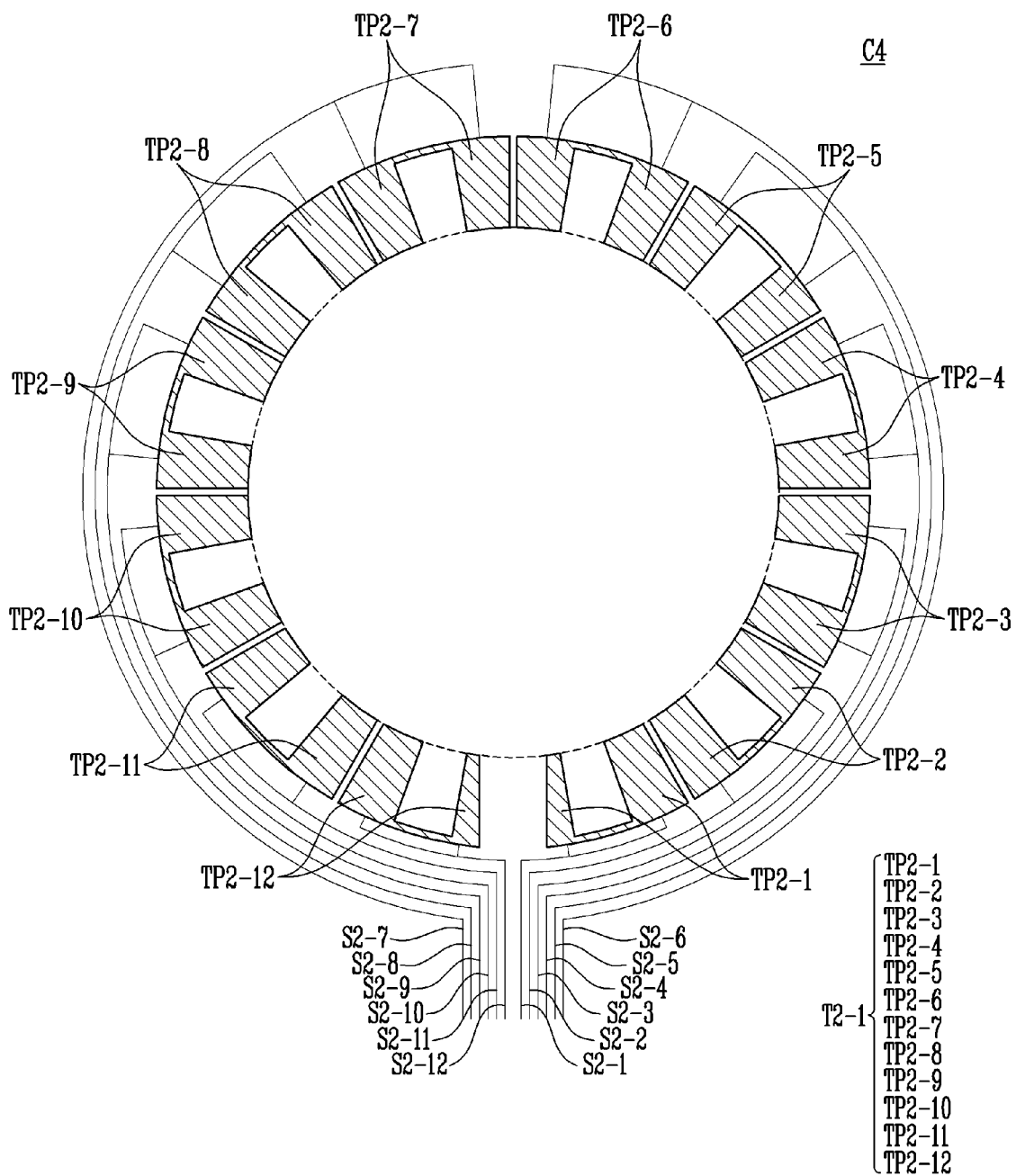
FIG. 34 is a plan view of a 2-1-th sub-touch electrode of the second touch electrode of FIG. 33.
Figure 35:
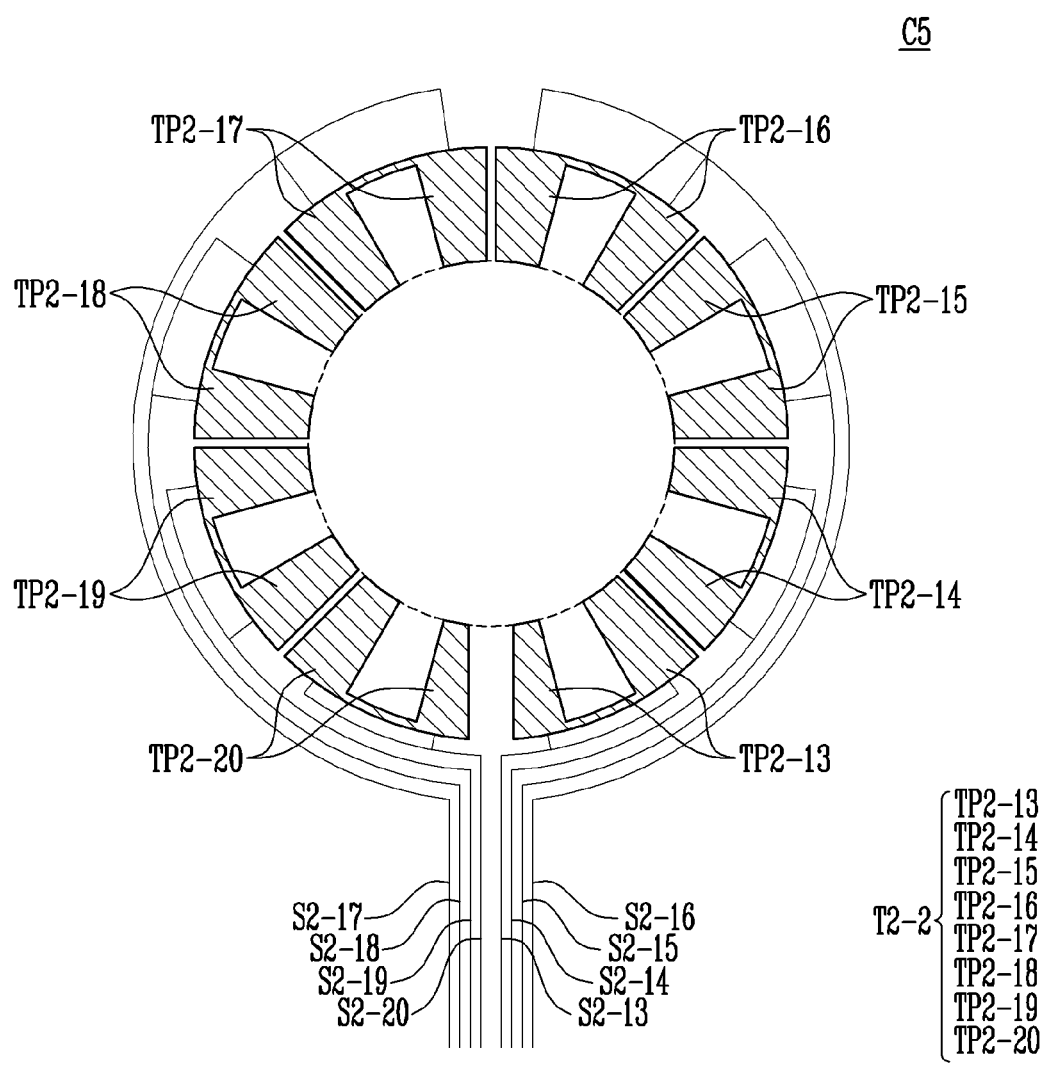
FIG. 35 is a plan view of a 2-2-th sub-touch electrode of the second touch electrode of FIG. 33.
Figure 36:
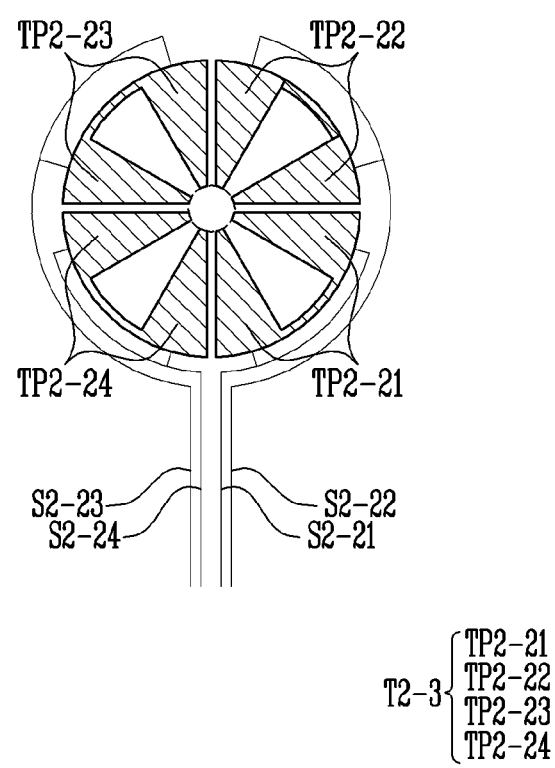
FIG. 36 is a plan view of a 2-3-th sub-touch electrode of the second touch electrode of FIG. 33.

FIG. 28 is a plan view of another exemplary embodiment of the touch sensor of FIG. 3 constructed according to the principles of the invention. FIG. 29 is a plan view of a first touch electrode of the touch sensor of FIG. 28. FIG. 30 is a plan view of a 1-1-th sub-touch electrode of the first touch electrode of FIG. 29. FIG. 31 is a plan view of a 1-2-th sub-touch electrode of the first touch electrode of FIG. 29. FIG. 32 is a plan view of a 1-3-th sub-touch electrode of the first touch electrode of FIG. 29. FIG. 33 is a plan view of a second touch electrode of the touch sensor of FIG. 28. FIG. 34 is a plan view of a 2-1-th sub-touch electrode of the second touch electrode of FIG. 33. FIG. 35 is a plan view of a 2-2-th sub-touch electrode of the second touch electrode of FIG. 33. FIG. 36 is a plan view of a 2-3-th sub-touch electrode of the second touch electrode of FIG. 33.

Referring to FIGS. 28 to 36, the touch sensor TS may include a sensing area SA and a non-sensing area NSA, wherein the sensing area SA may have a generally circular shape.

In the sensing area SA, a first touch electrode T1 and a second touch electrode T2 may be provided.

The first touch electrode T1 may include a plurality of first sub-touch electrodes T1-1, T1-2, and T1-3 having a plurality of first touch patterns TP1-1, TP1-2, and TP1-3, respectively. For example, the first touch electrode T1 may include 1-1-th to 1-3-th sub-touch electrodes T1-1, T1-2, and T1-3 having 1-1-th to 1-3-th touch patterns TP1-1, TP1-2, and TP1-3, respectively.

Touch patterns of each of the 1-1-th to 1-3-th sub-touch electrodes T1-1, T1-2, and T1-3 may be disposed at substantially the same distance to the center of a closed curve. Therefore, the first touch electrode T1 may include a plurality of rings, for example, first to third rings C1, C2, and C3, which have the shape of generally concentric circles. Here, in the sequence of the first to third rings C1, C2, and C3, the outermost concentric circle may be the first ring C1, and the innermost concentric circle may be the third ring C3.

The first touch electrode T1 will be described in detail below.

Touch patterns of each ring of the first touch electrode T1 may be electrically connected to each other and electrically connected to a common signal line and/or a common signal pad.

The first ring C1 may be provided with the 1-1-th sub-touch electrode T1-1, which may include a plurality of 1-1-th touch patterns TP1-1. The 1-1-th touch patterns TP1-1 may be coupled to a 1-1-th signal line S1-1, and may then be supplied with the same signal. The 1-1-th signal line S1-1 may couple the 1-1-th touch patterns TP1-1 to each other along the inner circumference or the outer circumference of the first ring C1.

The second ring C2 may be provided with the 1-2-th sub-touch electrode T1-2, which may include a plurality of 1-2-th touch patterns TP1-2. The 1-2-th touch patterns TP1-2 may be coupled to a 1-2-th signal line S1-2, and may then be supplied with the same signal. The 1-2-th signal line S1-2 may couple the 1-2-th touch patterns TP1-2 to each other along the inner circumference or the outer circumference of the second ring C2.

The third ring C3 may be provided with the 1-3-th sub-touch electrode T1-3, which may include a plurality of 1-3-th touch patterns TP1-3. The 1-3-th touch patterns TP1-3 may be coupled to a 1-3-th signal line S1-3, and may then be supplied with the same signal. The 1-3-th signal line S1-3 may couple the 1-3-th touch patterns TP1-3 to each other along the inner circumference of the third ring C3, and the inside of the circle formed by the 1-3-th signal line S1-3 may be filled with conductive material to function as a touch pattern.

Since the first ring C1 is arranged in the outermost portion, the number of 1-1-th touch patterns TP1-1 may be greater than the number of 1-2-th touch patterns TP1-2 and the number of 1-3-th touch patterns TP1-3. Since the second ring C2 is arranged outside the third ring C3, the number of 1-2-th touch patterns TP1-2 may be greater than the number of 1-3-th touch patterns TP1-3.

The second touch electrode T2 may include a plurality of second sub-touch electrodes T2-1, T2-2, and T2-3, each having a plurality of second touch pattern pairs. For instance, the second touch electrode T2 may include 2-1-th to 2-3-th sub-touch electrodes T2-1, T2-2, and T2-3.

The 2-1-th sub-touch electrode T2-1 may include 2-1-th to 2-12-th touch pattern pairs TP2-1, TP2-2, TP2-3, TP2-4, TP2-5, TP2-6, TP2-7, TP2-8, TP2-9, TP2-10, TP2-11, and TP2-12, the 2-2-th sub-touch electrode T2-2 may include 2-13-th to 2-20-th touch pattern pairs TP2-13, TP2-14, TP2-15, TP2-16, TP2-17, TP2-18, TP2-19, and TP2-20, and the 2-3-th sub-touch electrode T2-3 may include 2-21-th to 2-24-th touch pattern pairs TP2-21, TP2-22, TP2-23, and TP2-24.

The 2-1-th to 2-12-th touch pattern pairs TP2-1, TP2-2, TP2-3, TP2-4, TP2-5, TP2-6, TP2-7, TP2-8, TP2-9, TP2-10, TP2-11, and TP2-12 may be disposed at locations having substantially the same distance to the center of the closed curve. The 2-13-th to 2-20-th touch pattern pairs TP2-13, TP2-14, TP2-15, TP2-16, TP2-17, TP2-18, TP2-19, and TP2-20 may be disposed at locations having substantially the same distance to the center of the closed curve. The 2-21-th to 2-24-th touch pattern pairs TP2-21, TP2-22, TP2-23, and TP2-24 may be disposed at locations having substantially the same distance to the center of the closed curve. Therefore, the second touch electrode T2 may include a plurality of rings, for example, fourth to sixth rings C4, C5, and C6, which have the shape of generally concentric circles. The fourth to sixth rings C4, C5, and C6 may be generally concentric with and arranged alternately with the first to third rings C1, C2, and C3. Here, in the sequence of the fourth to sixth rings C4, C5, and C6, the outermost concentric circle may be the fourth ring C4, and the innermost concentric circle may be the sixth ring C6. Also, the fourth ring C4 may overlap the first ring C1, the fifth ring C5 may overlap the second ring C2, and the sixth ring C6 may overlap the third ring C3.

The second touch electrode T2 will be described in detail below.

The 2-1-th to 2-12-th touch pattern pairs TP2-1, TP2-2, TP2-3, TP2-4, T2-5, T2-6, T2-7, T2-8, T2-9, T2-10, T2-11, and T2-12 provided in the fourth ring C4, which is the 2-1-th sub-touch electrode T2-1, may be provided on both sides of respective 1-1-th touch patterns TP1-1 of the first ring C1. The 2-1-th to 2-12-th touch pattern pairs TP2-1, TP2-2, TP2-3, TP2-4, TP2-5, TP2-6, TP2-7, TP2-8, TP2-9, TP2-10, TP2-11, and TP2-12 may be coupled to 2-1-th 2-12-th signal lines S2-1, S2-2, S2-3, S2-4, S2-5, S2-6, S2-7, S2-8, S2-9, S2-10, S2-11, and S2-12, respectively.

The 2-1-th to 2-12-th signal lines S2-1, S2-2, S2-3, S2-4, S2-5, S2-6, S2-7, S2-8, S2-9, S2-10, S2-11, and S2-12 may extend along the inner circumference or the outer circumference of the fourth ring C4. Here, the 2-1-th to 2-12-th signal lines S2-1, S2-2, S2-3, S2-4, S2-5, S2-6, S2-7, S2-8, S2-9, S2-10, S2-11, and S2-12 may be disposed opposite to the 1-1-th signal line S1-1. This configuration is described in detail below. When the 1-1-th signal line S1-1 extends along the inner circumference of the first ring C1, the 2-1-th to 2-12-th signal lines S2-1, S2-2, S2-3, S2-4, S2-5, S2-6, S2-7, S2-8, S2-9, S2-10, S2-11, and S2-12 may extend along the outer circumference of the fourth ring C4. Further, when the 1-1-th signal line S1-1 extends along the outer circumference of the first ring C1, the 2-1-th to 2-12-th signal lines S2-1, S2-2, S2-3, S2-4, S2-5, S2-6, S2-7, S2-8, S2-9, S2-10, S2-11, and S2-12 may extend along the inner circumference of the fourth ring C4.

The 2-13-th to 2-20-th touch pattern pairs TP2-13, TP2-14, TP2-15, TP2-16, T2-17, T2-18, T2-19, and T2-20 provided in the fifth ring C5, which is the 2-2-th sub-touch electrode T2-2, may be provided on both sides of respective 1-2-th touch patterns TP1-2 of the second ring C2. The 2-13-th to 2-20-th touch pattern pairs TP2-13, TP2-14, TP2-15, TP2-16, TP2-17, TP2-18, TP2-19, and TP2-20 may be coupled to 2-13-th to 2-20-th signal lines S2-13, S2-14, S2-15, S2-16, S2-17, S2-18, S2-19, and S2-20, respectively.

The 2-13-th to 2-20-th signal lines S2-13, S2-14, S2-15, S2-16, S2-17, S2-18, S2-19, and S2-20 may extend along the inner circumference or outer circumference of the fifth ring C5. Here, the 2-13-th to 2-20-th signal lines S2-13, S2-14, S2-15, S2-16, S2-17, S2-18, S2-19, and S2-20 may be disposed opposite to the 1-2-th signal line S1-2. This configuration is described in detail below. When the 1-2-th signal line S1-2 extends along the inner circumference of the second ring C2, the 2-13-th to 2-20-th signal lines S2-13, S2-14, S2-15, S2-16, S2-17, S2-18, S2-19, and S2-20 may extend along the outer circumference of the fifth ring C5. Further, when the 1-2-th signal line S1-2 extends along the outer circumference of the second ring C2, the 2-13-th to 2-20-th signal lines S2-13, S2-14, S2-15, S2-16, S2-17, S2-18, S2-19, and S2-20 may extend along the inner circumference of the fifth ring C5.

The 2-21-th to 2-24-th touch pattern pairs TP2-21, TP2-22, TP2-23, and TP2-24 provided in the sixth ring C6, which is the 2-3-th sub-touch electrode T2-3, may be provided on both sides of respective 1-3-th touch patterns TP1-3 of the third ring C3. The 2-21-th to 2-24-th touch pattern pairs TP2-21, TP2-22, TP2-23, and TP2-24 may be coupled to 2-21-th to 2-24-th signal lines S2-21, S2-22, S2-23, and S2-24, respectively.

The 2-21-th to 2-24-th signal lines S2-21, S2-22, S2-23, and S2-24 may extend along the inner circumference or the outer circumference of the sixth ring C6. Here, the 2-21-th to 2-24-th signal lines S2-21, S2-22, S2-23, and S2-24 may be disposed opposite to that of the 1-3-th signal line S1-3. That is, since the 1-3-th signal line S1-3 extends along the inner circumference of the third ring C3, the 2-21-th to 2-24-th signal lines S2-21, S2-22, S2-23, and S2-24 may extend along the outer circumference of the sixth ring C6.

In the above-described touch sensor TS, capacitors (mutual capacitance) may be formed between the first touch electrode T1 and the second touch electrode T2 adjacent to each other.

This configuration is described in detail below. In the first ring C1 and the fourth ring C4 which overlap each other, capacitors may be formed between the 1-1-th touch patterns TP1-1 and the 2-1-th to 2-12-th touch pattern pairs TP2-1, TP2-2, TP2-3, TP2-4, TP2-5, TP2-6, TP2-7, TP2-8, TP2-9, TP2-10, TP2-11, and TP2-12 which are arranged on both sides of respective 1-1-th touch patterns TP1-1.

In the second ring C2 and the fifth ring C5 which overlap each other, capacitors may be formed between the 1-2-th touch patterns TP1-2 and the 2-13-th to 2-20-th touch pattern pairs TP2-13, TP2-14, TP2-15, TP2-16, TP2-17, TP2-18, TP2-19, and TP2-20 arranged on both sides of respective 1-2-th touch patterns TP1-2.

In the third ring C3 and the sixth ring C6 which overlap each other, capacitors may be formed between the 1-3-th touch patterns TP1-3 and the 2-21-th to 2-24-th touch pattern pairs TP2-21, TP2-22, TP2-23, and TP2-24 arranged on both sides of respective 1-3-th touch patterns TP1-3.

The above-described touch sensor TS may enable the number of signal lines to be reduced compared to the case where signal lines are separately coupled to respective touch patterns. For example, touch patterns of each ring of the first touch electrode T1 may be electrically connected to each other and electrically connected to a common signal line such as the 1-1-th signal line S1-1, the 1-2-th signal line S1-2, and the 1-3-th signal line S1-3, and such configuration enable the number of signal lines to be reduced. Also, when the number of signal lines is reduced, the number of signal pads may also be reduced.

Figure 37:
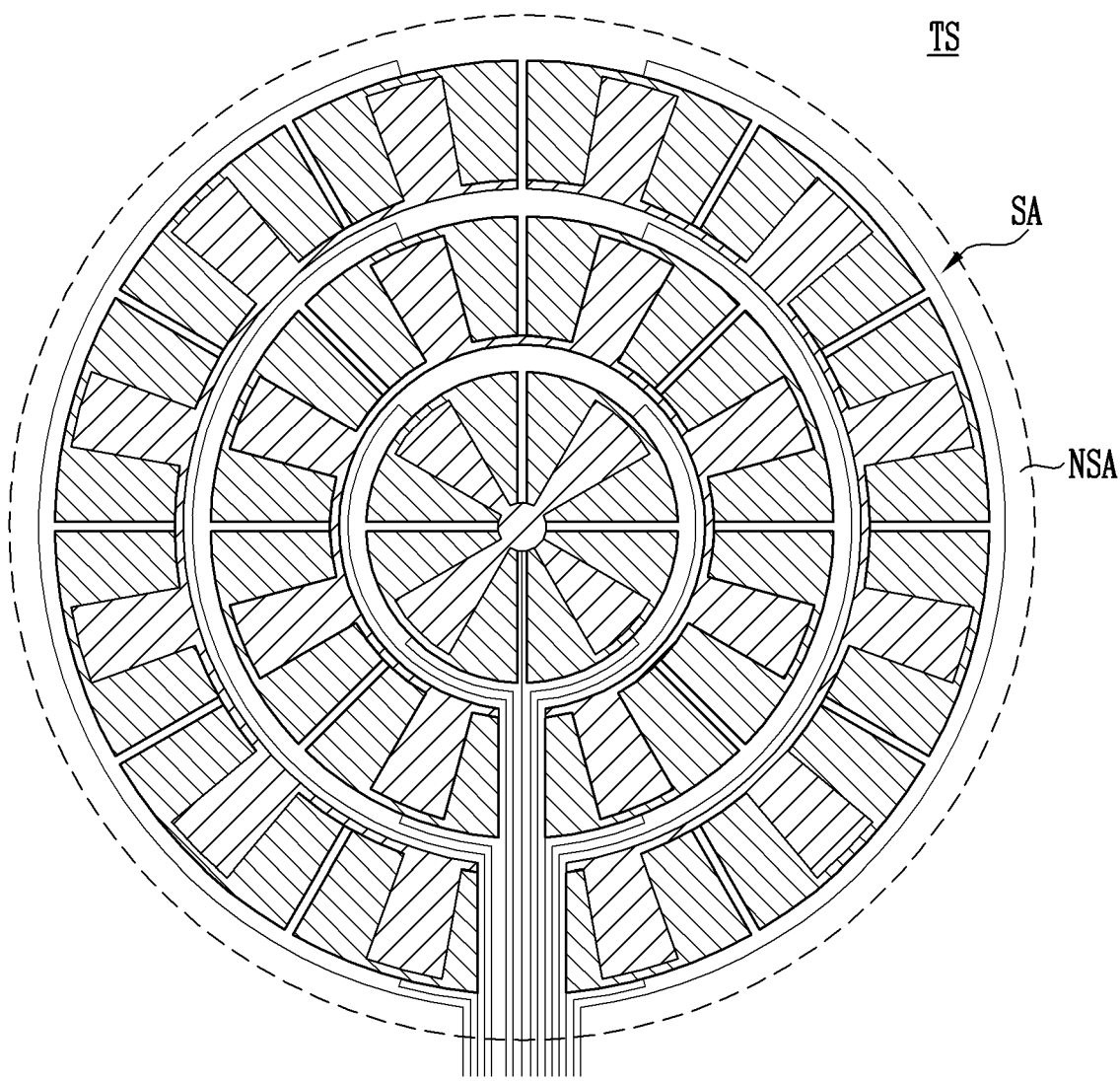
FIG. 37 is a plan view of still another exemplary embodiment of the touch sensor of FIG. 3 constructed according to the principles of the invention.
Figure 38:
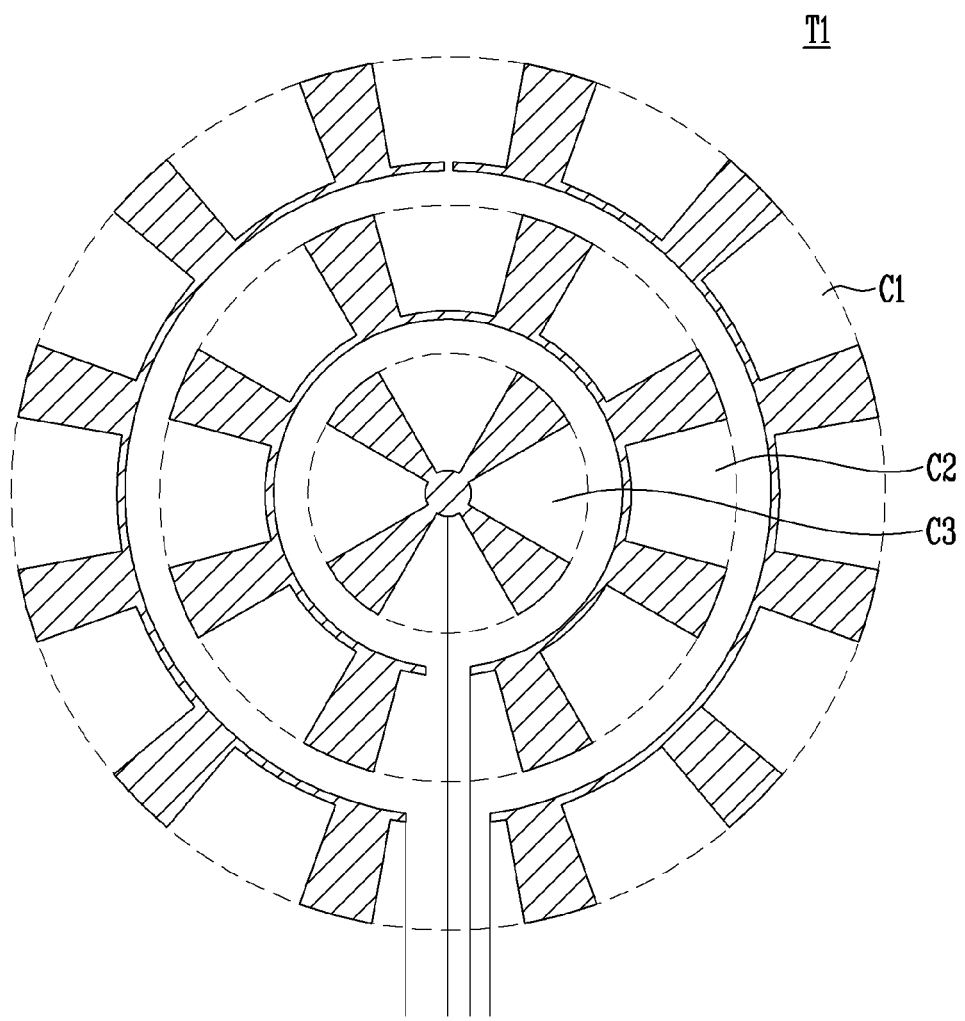
FIG. 38 is a plan view of a first touch electrode of the touch sensor of FIG. 37.
Figure 39:
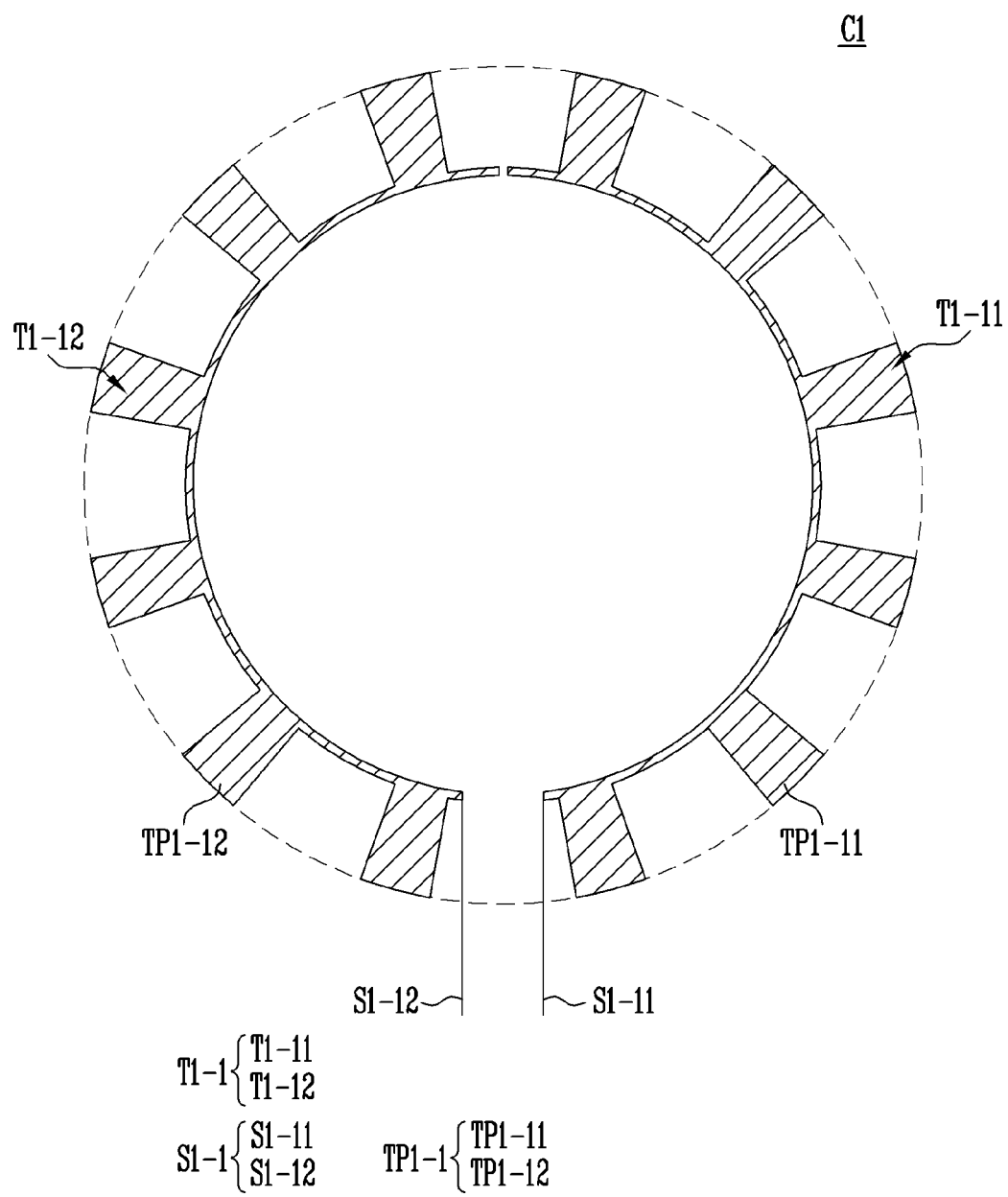
FIG. 39 is a plan view of a 1-1-th sub-touch electrode of the first touch electrode of FIG. 37.

FIG. 37 is a plan view of still another exemplary embodiment of the touch sensor of FIG. 3 constructed according to the principles of the invention. FIG. 38 is a plan view of a first touch electrode of the touch sensor of FIG. 37. FIG. 39 is a plan view of a 1-1-th sub-touch electrode of the first touch electrode of FIG. 37. FIG. 40 is a plan view of a 1-2-th sub-touch electrode of the first touch electrode of FIG. 37. FIG. 41 is a plan view of a 1-3-th sub-touch electrode of the first touch electrode of in FIG. 37.

Referring to FIGS. 37 to 41, the touch sensor TS may include a sensing area SA and a non-sensing area NSA, wherein the sensing area SA may have a generally circular shape.

In the sensing area SA, a first touch electrode T1 and a second touch electrode T2 may be provided.

The first touch electrode T1 may include a plurality of first sub-touch electrodes T1-1, T1-2, and T1-3 having a plurality of first touch patterns TP1-1, TP1-2, and TP1-3, respectively. For example, the first touch electrode T1 may include 1-1-th to 1-3-th sub-touch electrodes T1-1, T1-2, and T1-3 having 1-1-th to 1-3-th touch patterns TP1-1, TP1-2, and TP1-3, respectively.

Touch patterns of each of the 1-1-th to 1-3-th sub-touch electrodes T1-1, T1-2, and T1-3 may be disposed at substantially the same distance to the center of a closed curve. Therefore, the first touch electrode T1 may include a plurality of rings, for example, first to third rings C1, C2, and C3, which have the shape of generally concentric circles. Here, in the sequence of the first to third rings C1, C2, and C3, the outermost concentric circle may be the first ring C1, and the innermost concentric circle may be the third ring C3.

The first touch electrode T1 will be described in detail below.

Touch patterns of at least one of the first to third rings C1, C2, and C3 may be grouped and the grouped touch patterns may be electrically connected to each other and electrically connected to a common signal line and/or a common signal pad. For example, touch patterns of the first ring C1 may be divided into two (2) groups such as 1-11-th touch patterns TP1-11 and 1-12-th touch patterns TP1-12.

The first ring C1 may be provided with the 1-1-th sub-touch electrode T1-1, which may include a plurality of 1-1-th touch patterns TP1-1. The 1-1-th sub-touch electrode T1-1 may include a 1-11-th sub-touch electrode T1-11 and a 1-12-th sub-touch electrode T1-12. The 1-11-th sub-touch electrode T1-11 may be provided on a first side of the first ring C1, and the 1-12-th sub-touch electrode T1-12 may be provided on a second side of the first ring C1. That is, the 1-11-th sub-touch electrode T1-11 and the 1-12-th sub-touch electrode T1-12 may be arranged to bisect the first ring C1.

The 1-11-th sub-touch electrode T1-11 may include the 1-11-th touch patterns TP1-11. The 1-11-th touch patterns TP1-11 may be coupled to a 1-11-th signal line S1-11, and may then be supplied with the same signal. The 1-11-th signal line S1-11 may couple the 1-11-th touch patterns TP1-11 to each other along the inner circumference or the outer circumference of the first ring C1.

The 1-12-th sub-touch electrode T1-12 may include the touch patterns TP1-12. That is, the 1-1-th touch patterns TP1-1 may include the 1-11-th touch patterns TP1-11 and the 1-12-th touch patterns TP1-12. Also, the 1-12-th touch patterns TP1-12 may be coupled to a 1-12-th signal line S1-12, and may then be supplied with the same signal. The 1-12-th signal line S1-12 may couple the 1-12-th touch patterns TP1-12 to each other along the inner circumference or the outer circumference of the first ring C1.

The second ring C2 may be provided with the 1-2-th sub-touch electrode T1-2, which may include a plurality of 1-2-th touch patterns TP1-2. The 1-2-th touch patterns TP1-2 may be coupled to a 1-2-th signal line S1-2, and may then be supplied with the same signal. The 1-2-th signal line S1-2 may couple the 1-2-th touch patterns TP1-2 to each other along the inner circumference or the outer circumference of the second ring C2.

The third ring C3 may be provided with the 1-3-th sub-touch electrode T1-3, which may include a plurality of 1-3-th touch patterns TP1-3. The 1-3-th touch patterns TP1-3 may be coupled to a 1-3-th signal line S1-3, and may then be supplied with the same signal. The 1-3-th signal line S1-3 may couple the 1-3-th touch patterns TP1-3 to each other along the inner circumference of the third ring C3, and the inside of the circle formed by the 1-3-th signal line S1-3 may be filled with conductive material to function as a touch pattern.

Also, since the first ring C1 is arranged in an outermost portion, the number of 1-1-th touch patterns TP1-1, that is, the sum of the number of 1-11-th touch patterns TP1-11 and the number of 1-12-th touch patterns TP1-12, may be greater than the number of 1-2-th touch patterns TP1-2 and the number of 1-3-th touch patterns TP1-3. Since the second ring C2 is arranged outside the third ring C3, the number of 1-2-th touch patterns TP1-2 may be greater than the number of 1-3-th touch patterns TP1-3.

The second touch electrode T2 may be substantially the same as the second touch electrode T2 in the embodiment illustrated in FIGS. 28 to 36. That is, the second touch electrode T2 may include a plurality of second sub-touch electrodes T2-1, T2-2, and T2-3, each having a plurality of second touch pattern pairs.

The 2-1-th sub-touch electrode T2-1 may include 2-1-th to 2-12-th touch pattern pairs TP2-1, TP2-2, TP2-3, TP2-4, TP2-5, TP2-6, TP2-7, TP2-8, TP2-9, TP2-10, TP2-11, and TP2-12, the 2-2-th sub-touch electrode T2-2 may include 2-13-th to 2-20-th touch pattern pairs TP2-13, TP2-14, TP2-15, TP2-16, TP2-17, TP2-18, TP2-19, and TP2-20, and the 2-3-th sub-touch electrode T2-3 may include 2-21-th to 2-24-th touch pattern pairs TP2-21, TP2-22, TP2-23, and TP2-24.

The 2-1-th to 2-12-th touch pattern pairs TP2-1, TP2-2, TP2-3, TP2-4, TP2-5, TP2-6, TP2-7, TP2-8, TP2-9, TP2-10, TP2-11, and TP2-12 may be disposed at locations having substantially the same distance to the center of the closed curve. The 2-13-th to 2-20-th touch pattern pairs TP2-13, TP2-14, TP2-15, TP2-16, TP2-17, TP2-18, TP2-19, and TP2-20 may be disposed at locations having substantially the same distance to the center of the closed curve. The 2-21-th to 2-24-th touch pattern pairs TP2-21, TP2-22, TP2-23, and TP2-24 may be disposed at locations having substantially the same distance to the center of the closed curve. Therefore, the second touch electrode T2 may include a plurality of rings, for example, fourth to sixth rings C4, C5, and C6, which have the shape of generally concentric circles. Here, in the sequence of the fourth to sixth rings C4, C5, and C6, the outermost concentric circle may be the fourth ring C4, and the innermost concentric circle may be the sixth ring C6. Also, the fourth ring C4 may overlap the first ring C1, the fifth ring C5 may overlap the second ring C2, and the sixth ring C6 may overlap the third ring C3.

In the above-described touch sensor TS, capacitors (mutual capacitance) may be formed between the first touch electrode T1 and the second touch electrode T2 adjacent to each other.

Figure 42:
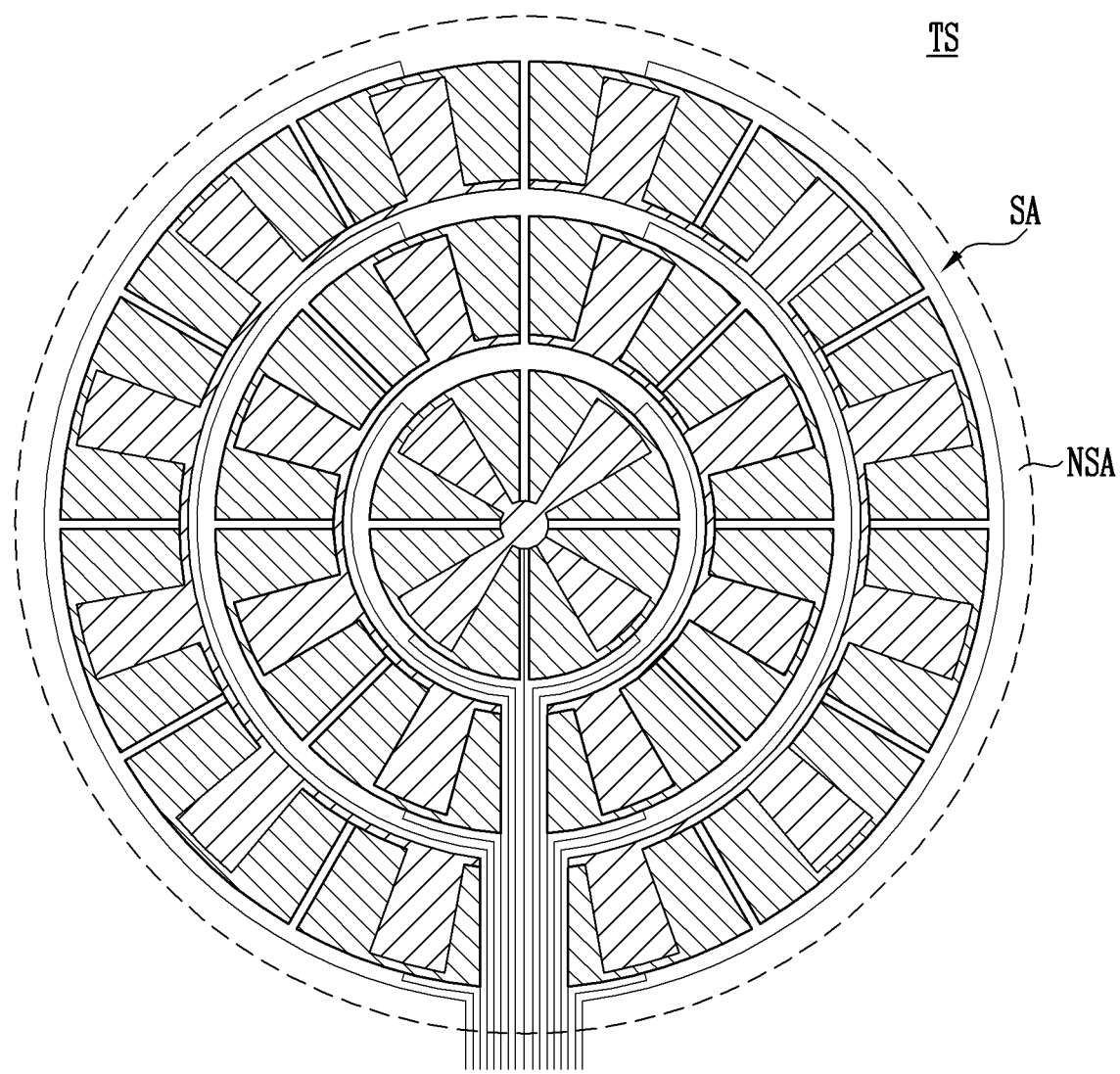
FIG. 42 is a plan view of yet another exemplary embodiment of the touch sensor of FIG. 3 constructed according to the principles of the invention.
Figure 43:
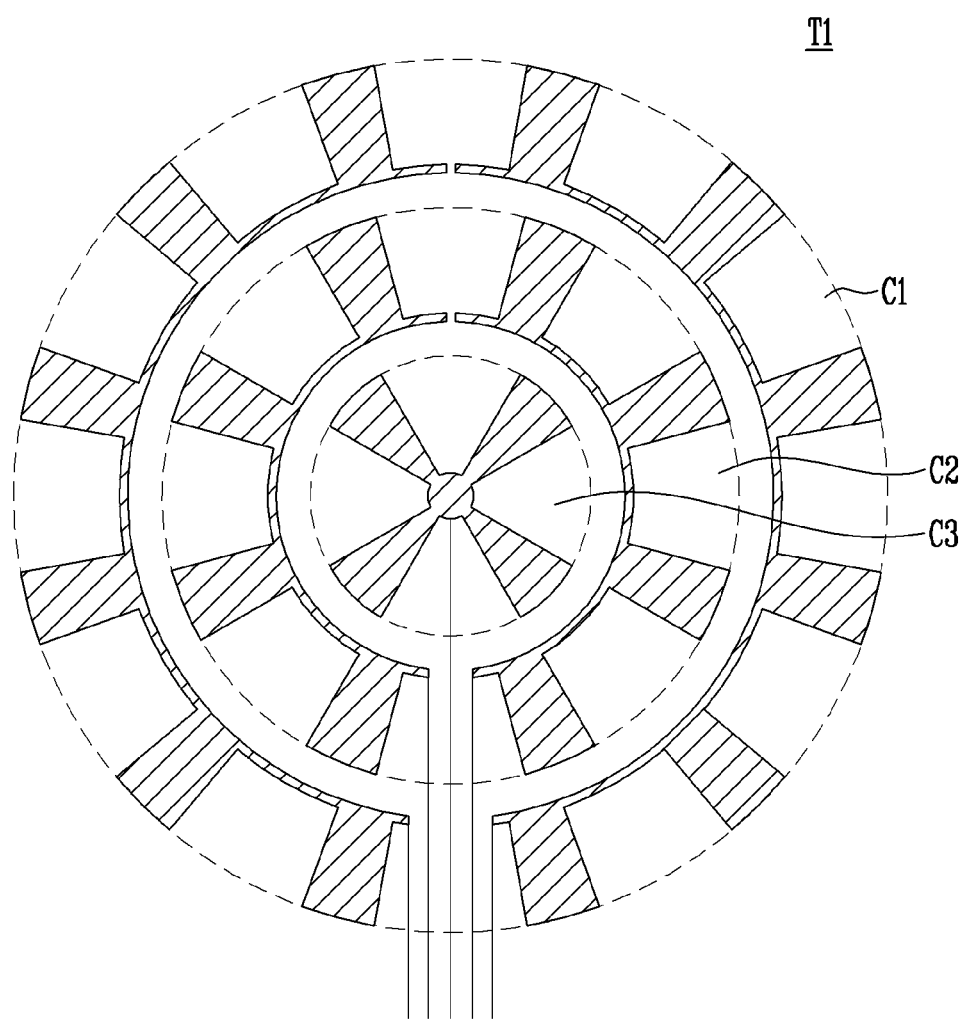
FIG. 43 is a plan view of a first touch electrode of the touch sensor of FIG. 42.
Figure 44:
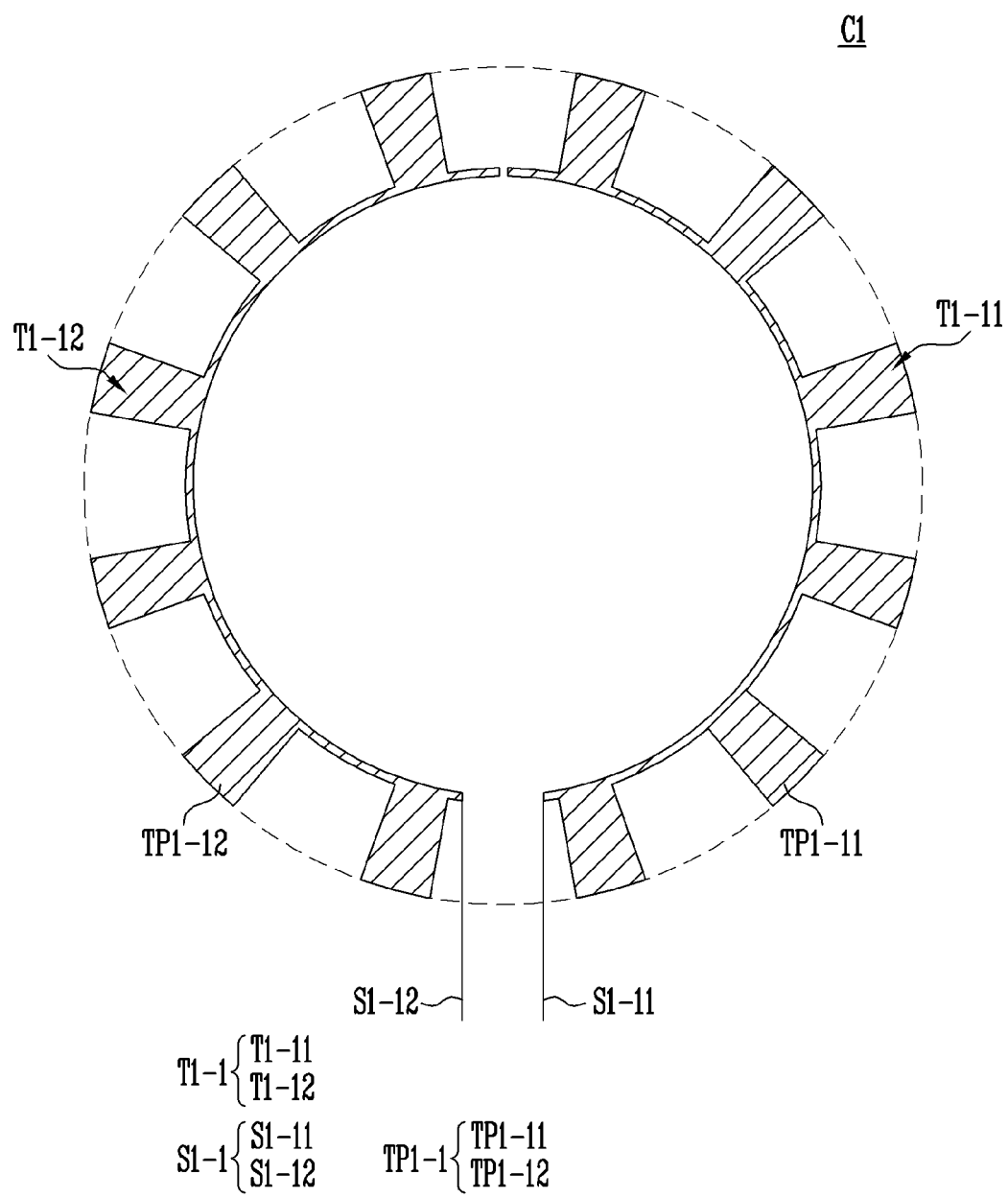
FIG. 44 is a plan view of a 1-1-th sub-touch electrode of the first touch electrode of FIG. 43.
Figure 45:
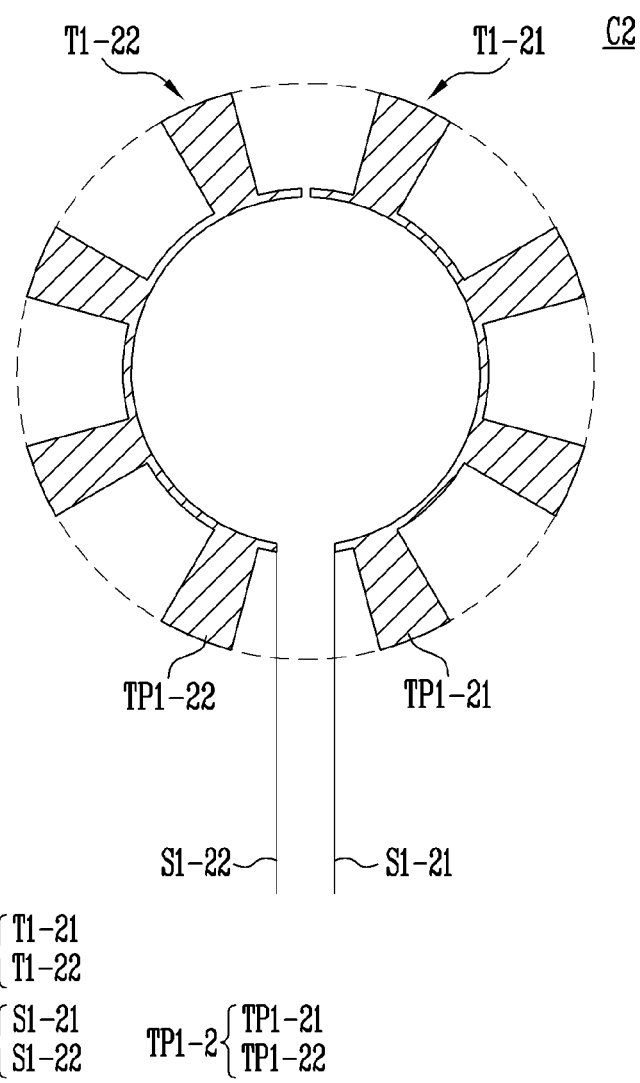
FIG. 45 is a plan view of a 1-2-th sub-touch electrode of the first touch electrode of FIG. 43.
Figure 46:
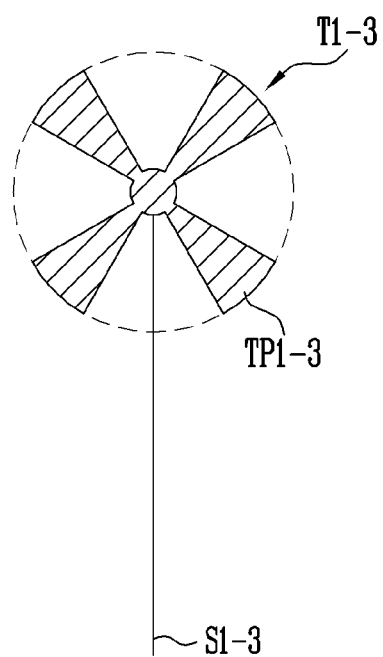
FIG. 46 is a plan view of a 1-3-th sub-touch electrode of the first touch electrode of FIG. 43.

FIG. 42 is a plan view of yet another exemplary embodiment of the touch sensor of FIG. 3 constructed according to the principles of the invention. FIG. 43 is a plan view of a first touch electrode of the touch sensor of FIG. 42. FIG. 44 is a plan view of a 1-1-th sub-touch electrode of the first touch electrode of FIG. 43. FIG. 45 is a plan view of a 1-2-th sub-touch electrode of the first touch electrode of FIG. 43. FIG. 46 is a plan view of a 1-3-th sub-touch electrode of the first touch electrode of FIG. 43.

Referring to FIGS. 42 to 46, the touch sensor TS may include a sensing area SA and a non-sensing area NSA, wherein the sensing area SA may have a generally circular shape.

In the sensing area SA, a first touch electrode T1 and a second touch electrode T2 may be provided.

The first touch electrode T1 may include a plurality of first sub-touch electrodes T1-1, T1-2, and T1-3 having a plurality of first touch patterns TP1-1, TP1-2, and TP1-3, respectively. For example, the first touch electrode T1 may include 1-1-th to 1-3-th sub-touch electrodes T1-1, T1-2, and T1-3 having 1-1-th to 1-3-th touch patterns TP1-1, TP1-2, and TP1-3, respectively.

touch patterns of each of the 1-1-th to 1-3-th sub-touch electrodes T1-1, T1-2, and T1-3 may be disposed at substantially the same distance to the center of a closed curve. Therefore, the first touch electrode T1 may include a plurality of rings, for example, first to third rings C1, C2, and C3, which have the shape of generally concentric circles. Here, in the sequence of the first to third rings C1, C2, and C3, the outermost concentric circle may be the first ring C1, and the innermost concentric circle may be the third ring C3.

The first touch electrode T1 will be described in detail below.

The first ring C1 may be provided with the 1-1-th sub-touch electrode T1-1, which may include a plurality of 1-1-th touch patterns TP1-1. The 1-1-th sub-touch electrode T1-1 may include a 1-11-th sub-touch electrode T1-11 and a 1-12-th sub-touch electrode T1-12. The 1-11-th sub-touch electrode T1-11 may be provided on a first side of the first ring C1, and the 1-12-th sub-touch electrode T1-12 may be provided on a second side of the first ring C1. That is, the 1-11-th sub-touch electrode T1-11 and the 1-12-th sub-touch electrode T1-12 may be arranged to bisect the first ring C1.

The 1-11-th sub-touch electrode T1-11 may include a plurality of 1-11-th touch patterns TP1-11. The 1-11-th touch patterns TP1-11 may be coupled to a 1-11-th signal line S1-11, and may then be supplied with the same signal. The 1-11-th signal line S1-11 may couple the 1-11-th touch patterns TP1-11 to each other along the inner circumference or the outer circumference of the first ring C1.

The 1-12-th sub-touch electrode T1-12 may include a plurality of 1-12-th touch patterns TP1-12. That is, the 1-1-th touch patterns TP1-1 may include the 1-11-th touch patterns TP1-11 and the 1-12-th touch patterns TP1-12. Also, the 1-12-th touch patterns TP1-12 may be coupled to a 1-12-th signal line S1-12, and may then be supplied with the same signal. The 1-12-th signal line S1-12 may couple the 1-12-th touch patterns TP1-12 to each other along the inner circumference or the outer circumference of the first ring C1.

The second ring C2 may be provided with the 1-2-th sub-touch electrode T1-2, which may include a plurality of 1-2-th touch patterns TP1-2. This configuration is described in detail below. The 1-2-th sub-touch electrode T1-2 may include a 1-21-th sub-touch electrode T1-21 and a 1-22-th sub-touch electrode T1-22. The 1-21-th sub-touch electrode T1-21 may be provided on a first side of the second ring C2, and the 1-22-th sub-touch electrode T1-22 may be provided on a second side of the second ring C2. That is, the 1-21-th sub-touch electrode T1-21 and the 1-22-th sub-touch electrode T1-22 may be arranged to bisect the first ring C2.

The 1-21-th sub-touch electrode T1-21 may include a plurality of 1-21-th touch patterns TP1-21. The 1-21-th touch patterns TP1-21 may be coupled to a 1-21-th signal line S1-21, and may then be supplied with the same signal. The 1-21-th signal line S1-21 may couple the 1-21-th touch patterns TP1-21 to each other along the inner circumference or the outer circumference of the second ring C2.

The 1-22-th sub-touch electrode T1-22 may include a plurality of 1-22-th touch patterns TP1-22. That is, the 1-2-th touch patterns TP1-2 may include the 1-21-th touch patterns TP1-21 and the 1-22-th touch patterns TP1-22. Also, the 1-22-th touch patterns TP1-22 may be coupled to a 1-22-th signal line S1-22, and may then be supplied with the same signal. The 1-22-th signal line S1-22 may couple the 1-22-th touch patterns TP1-22 to each other along the inner circumference or the outer circumference of the second ring C2.

The third ring C3 may be provided with the 1-3-th sub-touch electrode T1-3, which may include a plurality of 1-3-th touch patterns TP1-3. The 1-3-th touch patterns TP1-3 may be coupled to a 1-3-th signal line S1-3, and may then be supplied with the same signal. The 1-3-th signal line S1-3 may couple the 1-3-th touch patterns TP1-3 to each other along the inner circumference of the third ring C3, and the inside of the circle formed by the 1-3-th signal line S1-3 may be filled with conductive material to function as a touch pattern.

The second touch electrode T2 may be substantially the same as the second touch electrode T2 in the embodiment illustrated in FIGS. 28 to 36. That is, the second touch electrode T2 may include a plurality of second sub-touch electrodes T2-1, T2-2, and T2-3, each having a plurality of second touch pattern pairs.

The 2-1-th sub-touch electrode T2-1 may include 2-1-th to 2-12-th touch pattern pairs TP2-1, TP2-2, TP2-3, TP2-4, TP2-5, TP2-6, TP2-7, TP2-8, TP2-9, TP2-10, TP2-11, and TP2-12, the 2-2-th sub-touch electrode T2-2 may include 2-13-th to 2-20-th touch pattern pairs TP2-13, TP2-14, TP2-15, TP2-16, TP2-17, TP2-18, TP2-19, and TP2-20, and the 2-3-th sub-touch electrode T2-3 may include 2-21-th to 2-24-th touch pattern pairs TP2-21, TP2-22, TP2-23, and TP2-24.

The 2-1-th to 2-12-th touch pattern pairs TP2-1, TP2-2, TP2-3, TP2-4, TP2-5, TP2-6, TP2-7, TP2-8, TP2-9, TP2-10, TP2-11, and TP2-12 may be disposed at locations having substantially the same distance to the center of the closed curve. The 2-13-th to 2-20-th touch pattern pairs TP2-13, TP2-14, TP2-15, TP2-16, TP2-17, TP2-18, TP2-19, and TP2-20 may be disposed at locations having substantially the same distance to the center of the closed curve. The 2-21-th to 2-24-th touch pattern pairs TP2-21, TP2-22, TP2-23, and TP2-24 may be disposed at locations having substantially the same distance to the center of the closed curve. Therefore, the second touch electrode T2 may include a plurality of rings, for example, fourth to sixth rings C4, C5, and C6, which have the shape of generally concentric circles. Here, in the sequence of the fourth to sixth rings C4, C5, and C6, the outermost concentric circle may be the fourth ring C4, and the innermost concentric circle may be the sixth ring C6. Also, the fourth ring C4 may overlap the first ring C1, the fifth ring C5 may overlap the second ring C2, and the sixth ring C6 may overlap the third ring C3.

In the above-described touch sensor TS, capacitors (mutual capacitance) may be formed between the first touch electrode T1 and the second touch electrode T2 adjacent to each other.

Figure 47:
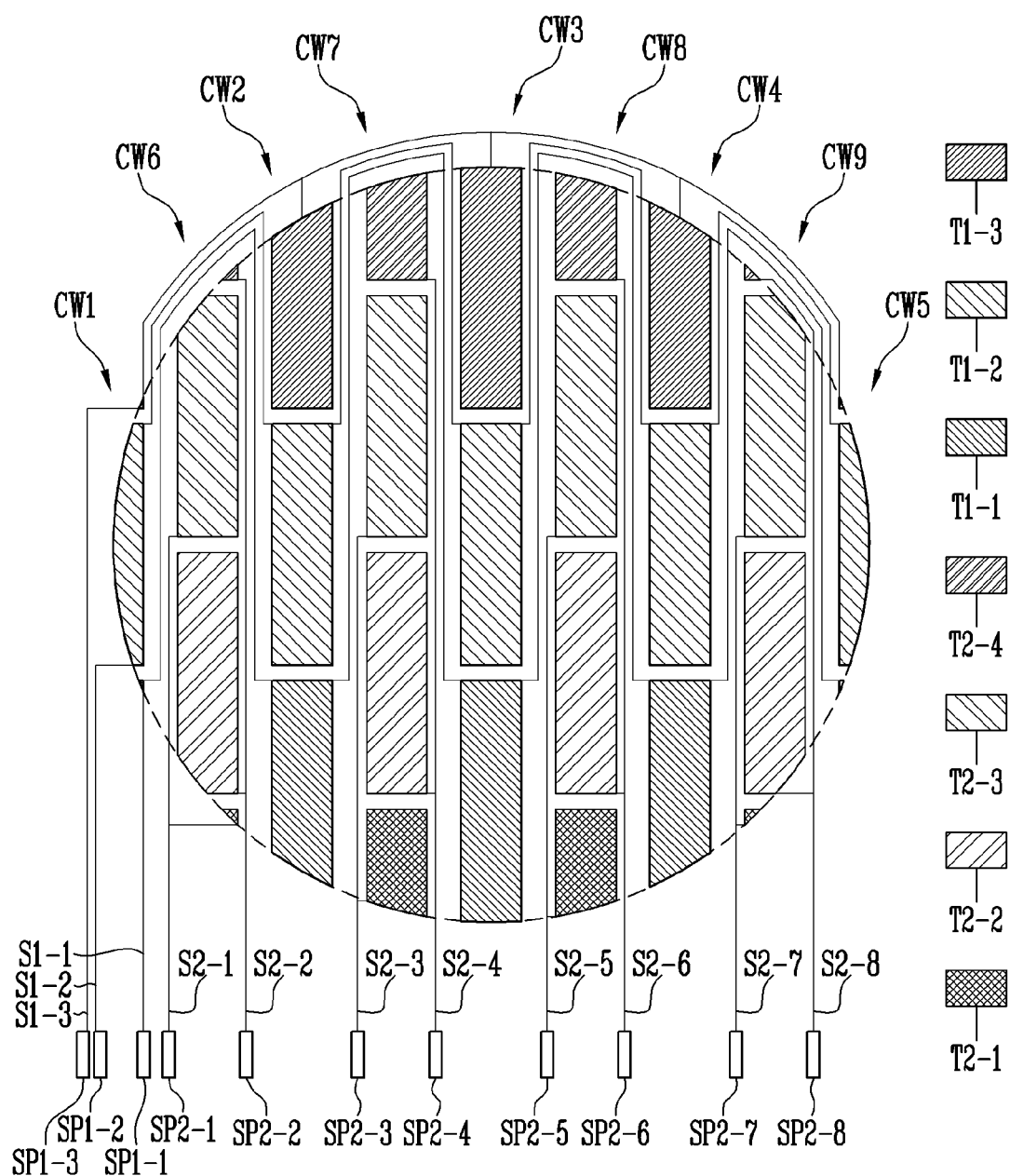
FIGS. 47 and 48 are plan views of other exemplary embodiments of the touch sensor constructed according to the principles of the invention.
Figure 48:
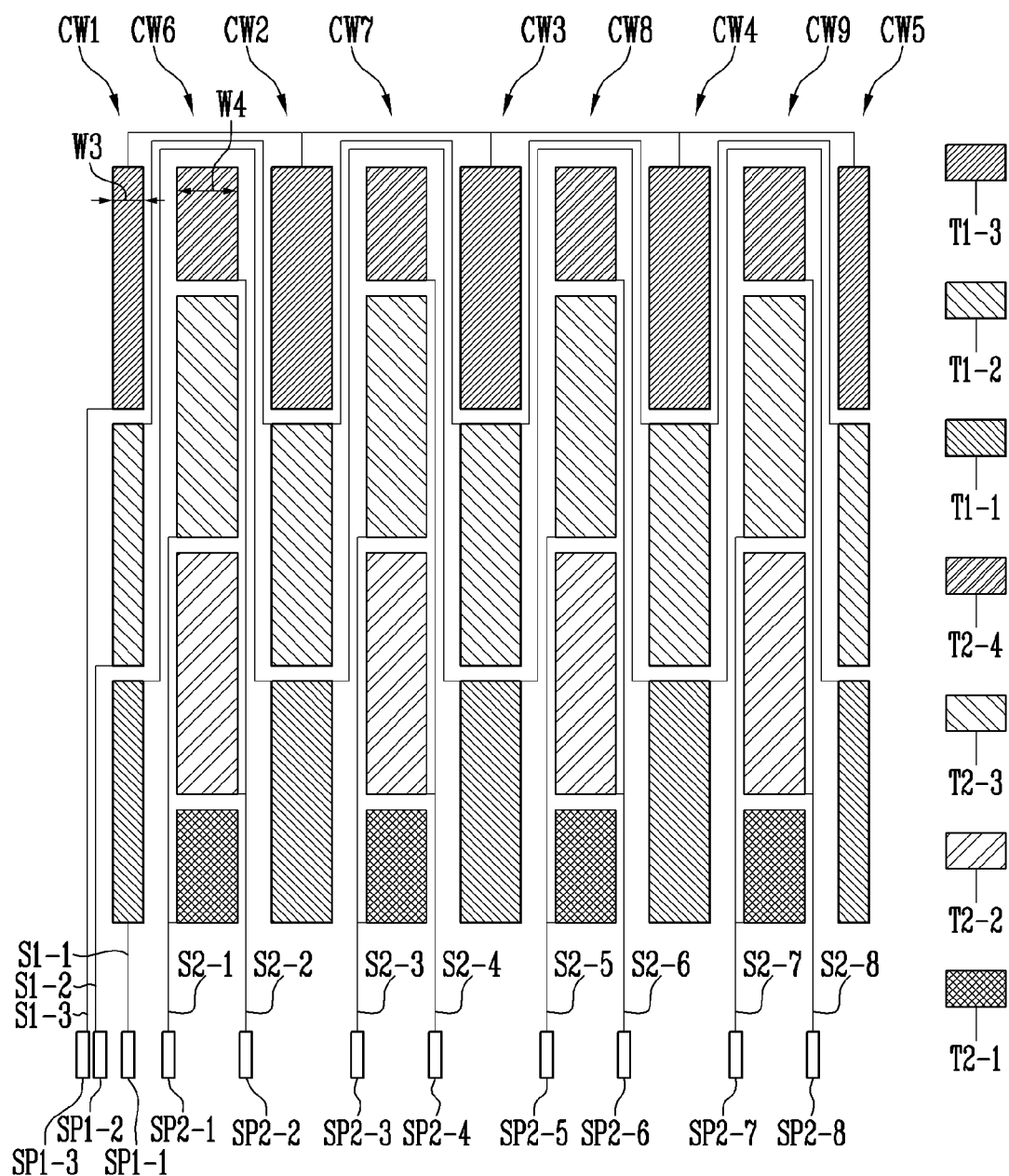

FIGS. 47 and 48 are plan views of other exemplary embodiments of the touch sensor constructed according to the principles of the invention.

Referring to FIGS. 47 and 48, the touch sensor TS may include a sensing area SA and a non-sensing area NSA, wherein the sensing area SA may have a generally circular or generally rectangular shape.

In the sensing area SA, a first touch electrode T1 and a second touch electrode T2 may be provided. Each of the first touch electrode T1 and the second touch electrode T2 may include a plurality of touch electrode columns arranged in the form of columns.

The first touch electrode T1 may include first to fifth touch electrode columns CW1, CW2, CW3, CW4, and CW5. Each of the first to fifth touch electrode columns CW1, CW2, CW3, CW4, and CW5 may include a plurality of sub-touch electrodes. For example, the first to fifth touch electrode columns CW1, CW2, CW3, CW4, and CW5 may include 1-1-th to 1-3-th sub-touch electrodes T1-1, T1-2, and T1-3.

In the first to fifth touch electrode columns CW1, CW2, CW3, CW4, and CW5, sub-touch electrodes at the same horizontal position and/or row may be coupled to the same signal line. The sub-touch electrodes T1-1, T1-2, and T1-3 of the first to fifth touch electrode columns CW1, CW2, CW3, CW4, and CW5 are arranged in a plurality of rows perpendicular to the first to fifth touch electrode columns CW1, CW2, CW3, CW4, and CW5, and sub-touch electrodes arranged in each row are electrically connected to a common signal line and/or a common signal pad. This configuration is described in detail below. The 1-1-th sub-touch electrodes T1-1 of the first to fifth touch electrode columns CW1, CW2, CW3, CW4, and CW5 may be coupled to a 1-1-th signal line S1-1, and the 1-1-th signal line S1-1 may be coupled to a 1-1-th signal pad SP1-1. The 1-2-th sub-touch electrodes T1-2 of the first to fifth touch electrode columns CW1, CW2, CW3, CW4, and CW5 may be coupled to a 1-2-th signal line S1-2, and the 1-2-th signal line S1-2 may be coupled to a 1-2-th signal pad SP1-2. The 1-3-th sub-touch electrodes T1-3 of the first to fifth touch electrode columns CW1, CW2, CW3, CW4, and CW5 may be coupled to a 1-3-th signal line S1-3, and the 1-3-th signal line S1-3 may be coupled to a 1-3-th signal pad SP1-3. In order to couple the same sub-touch electrodes of the first to fifth touch electrode columns CW1, CW2, CW3, CW4, and CW5, portions of the 1-1-th to 1-3-th signal lines may be provided in the non-sensing area NSA. For example, portions of the 1-1-th to 1-3-th signal lines S1-1, S1-2, and S1-3 may be provided in an area opposite to the area in which the 1-1-th to 1-3-th signal pads SP1-1, SP1-2, and SP1-3 are arranged.

Also, the third width W3 of the 1-1-th to 1-3-th sub-touch electrodes T1-1, T1-2, and T1-3 of the first and fifth touch electrode columns CW1 and CW5 which are provided outside the sensing area SA, among the first to fifth touch electrode columns CW1, CW2, CW3, CW4, and CW5, may be less than the fourth width W4 of the 1-1-th to 1-3-th sub-touch electrodes T1-1, T1-2, and T1-3 of the second to fourth touch electrode columns CW2, CW3, and CW4. For example, the third width W3 may be half the fourth width W4.

The second touch electrode T2 may include sixth to ninth touch electrode columns CW6, CW7, CW8, and CW9. Each of the sixth to ninth touch electrode columns CW6, CW7, CW8, and CW9 may include a plurality of sub-touch electrodes.

The sixth to ninth touch electrode columns CW6, CW7, CW8, and CW9 are arranged alternately with the first to fifth touch electrode columns CW1, CW2, CW3, CW4, and CW5. In each of the sixth to ninth touch electrode columns CW6, CW7, CW8, and CW9, sub-touch electrodes spaced apart from each other with other sub-touch electrode therebetween are electrically connected to a common signal line and/or a common signal pad. This configuration is described in detail below. The sixth touch electrode column CW6 may be provided between the first and second touch electrode columns CW1 and CW2. The sixth touch electrode column CW6 may include 2-1-th to 2-4-th sub-touch electrodes T2-1, T2-2, T2-3, and T2-4. The 2-1-th sub-touch electrode T2-1 and the 2-3-th sub-touch electrode T2-3 of the sixth touch electrode column CW6 may be coupled to the same signal line, for example, a 2-1-th signal line S2-1. The 2-1-th signal line S2-1 may be coupled to a 2-1-th signal pad SP2-1. Also, the 2-2-th sub-touch electrode T2-2 and the 2-4-th sub-touch electrode T2-4 may be coupled to the same signal line, for example, a 2-2-th signal line S2-2. The 2-2-th signal line S2-2 may be coupled to a 2-2-th signal pad SP2-2. In a longitudinal direction of the touch electrode columns, the length of the 2-1-th sub-touch electrode T2-1 and the 2-4-th sub-touch electrode T2-4 may be less than the length of the 2-2-th sub-touch electrode T2-2 and the 2-3-th sub-touch electrode T2-3. Here, the length of the 2-1-th sub-touch electrode T2-1 and the 2-4-th sub-touch electrode T2-4 may be half the length of the 2-2-th sub-touch electrode T2-2 and the 2-3-th sub-touch electrode T2-3. Therefore, the 2-1-th sub-touch electrode T2-1 and a part of the 2-2-th sub-touch electrode T2-2 may correspond to the 1-1-th sub-touch electrodes T1-1 of the first touch electrode column CW1 and the second touch electrode column CW2 which are adjacent thereto. The remaining part of the 2-2-th sub-touch electrode T2-2 and a part of the 2-3-th sub-touch electrode T2-3 may correspond to the 1-2-th sub-touch electrodes T1-2 of the first touch electrode column CW1 and the second touch electrode column CW2 which are adjacent thereto.

The remaining part of the 2-3-th sub-touch electrode T2-3 and the 2-4-th sub-touch electrode T2-4 may correspond to the 1-3-th sub-touch electrodes T1-3 of the first touch electrode column CW1 and the second touch electrode column CW2 which are adjacent to each other.

The seventh touch electrode column CW7 may be provided between the second touch electrode column CW2 and the third touch electrode column CW3. The seventh touch electrode column CW7 may include 2-1-th to 2-4-th sub-touch electrodes T2-1, T2-2, T2-3, and T2-4. The 2-1-th sub-touch electrode T2-1 and the 2-3-th sub-touch electrode T2-3 of the seventh touch electrode column CW7 may be coupled to the same signal line, for example, a 2-3-th signal line S2-3. The 2-3-th signal line S2-3 may be coupled to a 2-3-th signal pad SP2-3. The 2-2-th sub-touch electrode T2-2 and the 2-4-th sub-touch electrode T2-4 of the seventh touch electrode column CW7 may be coupled to the same signal line, for example, a 2-4-th signal line S2-4. The 2-4-th signal line S2-4 may be coupled to a 2-4-th signal pad SP2-4.

The eighth touch electrode column CW8 may be provided between the third and fourth touch electrode columns CW3 and CW4. The eighth touch electrode column CW8 may include 2-1-th to 2-4-th sub-touch electrodes T2-1, T2-2, T2-3, and T2-4. The 2-1-th sub-touch electrode T2-1 and the 2-3-th sub-touch electrode T2-3 of the eighth touch electrode column CW8 may be coupled to the same signal line, for example, a 2-5-th signal line S2-5. The 2-5-th signal line S2-5 may be coupled to a 2-5-th signal pad SP2-5. The 2-2-th sub-touch electrode T2-2 and the 2-4-th sub-touch electrode T2-4 of the eighth touch electrode column CW8 may be coupled to the same signal line, for example, a 2-6-th signal line S2-6. The 2-6-th signal line S2-6 may be coupled to a 2-6-th signal pad SP2-6.

The ninth touch electrode column CW9 may be provided between the fourth and fifth touch electrode columns CW4 and CW5. The ninth touch electrode column CW9 may include 2-1-th to 2-4-th sub-touch electrodes T2-1, T2-2, T2-3, and T2-4. The 2-1-th sub-touch electrode T2-1 and the 2-3-th sub-touch electrode T2-3 of the ninth touch electrode column CW9 may be coupled to the same signal line, for example, a 2-7-th signal line S2-7. The 2-7-th signal line S2-7 may be coupled to a 2-7-th signal pad SP2-7. The 2-2-th sub-touch electrode T2-2 and the 2-4-th sub-touch electrode T2-4 of the ninth touch electrode column CW9 may be coupled to the same signal line, for example, a 2-8-th signal line S2-8. The 2-8-th signal line S2-8 may be coupled to a 2-8-th signal pad SP2-8.

In the above-described touch sensor TS, capacitors (mutual capacitance) may be formed between the first touch electrode T1 and the second touch electrode T2 adjacent to each other. That is, capacitors may be formed between the 1-1-th to 1-3-th sub-touch electrodes T1-1, T1-2, and T1-3 of the first to fifth touch electrode columns CW1, CW2, CW3, CW4, and CW5 and the 2-1-th to 2-4-th sub-touch electrodes T2-1, T2-2, T2-3, and T2-4 of the sixth to ninth touch electrode columns CW6, CW7, CW8, and CW9.

As described above, in the first to fifth touch electrode columns CW1, CW2, CW3, CW4, and CW5, sub-touch electrodes arranged in the same row may be electrically coupled to the same signal line. In the sixth to ninth touch electrode columns CW6, CW7, CW8, and CW9, sub-touch electrodes which are not adjacent to each other may be electrically coupled to the same signal line. Accordingly, the touch sensor TS may enable the number of signal lines to be reduced compared to the case where signal lines are separately coupled to respective sub-touch electrodes. Also, as the number of signal lines is reduced, the number of signal pads may also be reduced.

Figure 49:
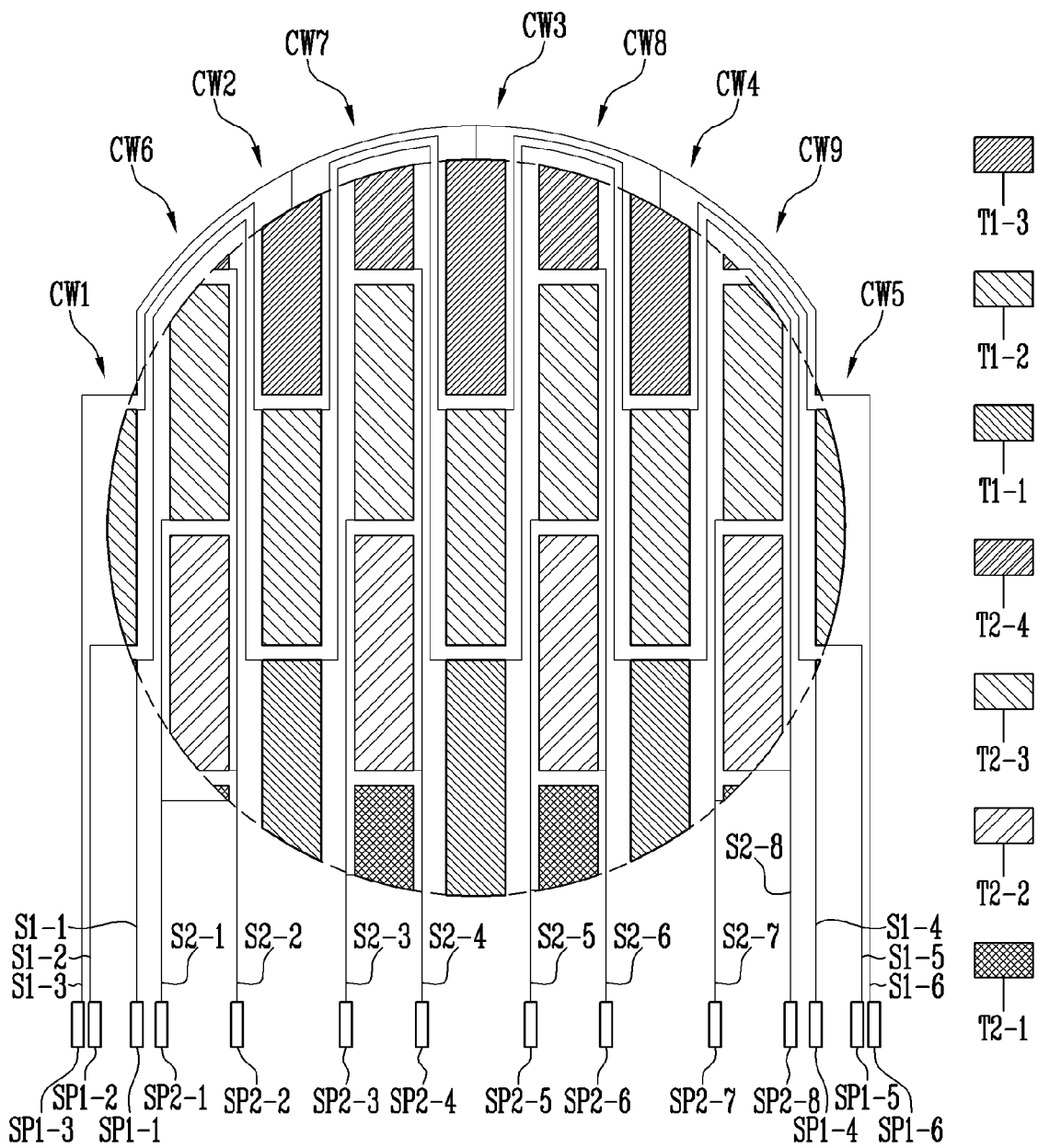
FIGS. 49 and 50 are plan views of still other exemplary embodiments of the touch sensor constructed according to the principles of the invention.
Figure 50:
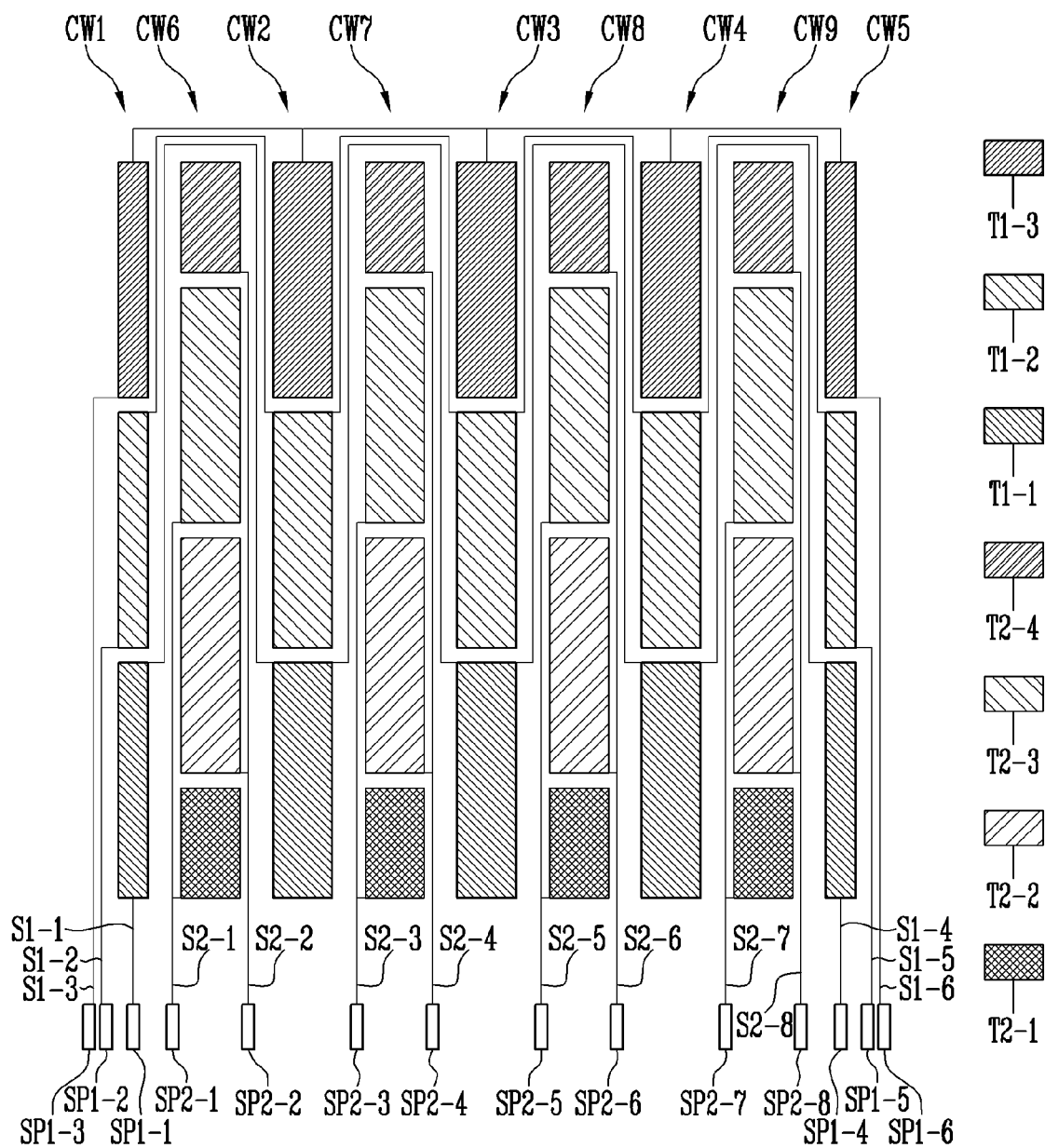

FIGS. 49 and 50 are plan views of still other exemplary embodiments of the touch sensor constructed according to the principles of the invention.

Referring to FIGS. 49 and 50, the touch sensor TS may include a sensing area SA and a non-sensing area NSA, wherein the sensing area SA may have a generally circular or generally rectangular shape.

In the sensing area SA, a first touch electrode T1 and a second touch electrode T2 may be provided. Each of the first touch electrode T1 and the second touch electrode T2 may include a plurality of touch electrode columns arranged in the form of columns.

The first touch electrode T1 may include first to fifth touch electrode columns CW1, CW2, CW3, CW4, and CW5. Each of the first to fifth touch electrode columns CW1, CW2, CW3, CW4, and CW5 may include a plurality of sub-touch electrodes. For example, the first to fifth touch electrode columns CW1, CW2, CW3, CW4, and CW5 may include 1-1-th to 1-3-th sub-touch electrodes T1-1, T1-2, and T1-3.

In the first to fifth touch electrode columns CW1, CW2, CW3, CW4, and CW5, the same sub-touch electrodes may be coupled to the same signal line. This configuration is described in detail below. The 1-1-th sub-touch electrodes T1-1 of the first to fifth touch electrode columns CW1, CW2, CW3, CW4, and CW5 may be coupled to a 1-1-th signal line S1-1, and the 1-1-th signal line S1-1 may be coupled to a 1-1-th signal pad SP1-1. The 1-2-th sub-touch electrodes T1-2 of the first to fifth touch electrode columns CW1, CW2, CW3, CW4, and CW5 may be coupled to a 1-2-th signal line S1-2, and the 1-2-th signal line S1-2 may be coupled to a 1-2-th signal pad SP1-2. The 1-3-th sub-touch electrodes T1-3 of the first to fifth touch electrode columns CW1, CW2, CW3, CW4, and CW5 may be coupled to a 1-3-th signal line S1-3, and the 1-3-th signal line S1-3 may be coupled to a 1-3-th signal pad SP1-3. Further, the 1-1-th to 1-3-th signal pads SP1-1, SP1-2, and SP1-3 may be arranged on one side of the non-sensing area NSA, for example, in a portion adjacent to the first touch electrode column CW1.

The 1-1-th to 1-3-th sub-touch electrodes T1-1, T1-2, and T1-3 of the fifth touch electrode column CW5 may be coupled not only to the 1-1-th to 1-3-th signal lines, but also to the 1-4-th to 1-6-th signal lines S1-4, S1-5, and S1-6. The 1-4-th to 1-6-th signal lines S1-4, S1-5, and S1-6 may be coupled to 1-4-th to 1-6-th signal pads SP1-4, SP1-5, and SP1-6, respectively. The 1-4-th to 1-6-th signal pads SP1-4, SP1-5, and SP1-6 may be arranged on the other side of the non-sensing area NSA, for example, in a portion adjacent to the fifth touch electrode column CW5. Therefore, signals may be applied to the 1-1-th to 1-3-th sub-touch electrodes T1-1, T1-2, and T1-3 of the first to fifth touch electrode columns CW1, CW2, CW3, CW4, and CW5 at both ends of each of the sub-touch electrodes through the 1-1-th to 1-3-th signal pads SP1-1, SP1-2, and SP1-3 and the 1-4-th to 1-6-th signal pads SP1-4, SP1-5, and SP1-6. The second touch electrode T2 may include sixth to ninth touch electrode columns CW6, CW7, CW8, and CW9 disposed between touch electrode columns adjacent to each other, among the first to fifth touch electrode columns CW1, CW2, CW3, CW4, and CW5. Each of the sixth to ninth touch electrode columns CW6, CW7, CW8, and CW9 may include a plurality of sub-touch electrodes. Each of the sixth to ninth touch electrode columns CW6, CW7, CW8, and CW9 may include 2-1-th to 2-4-th sub-touch electrodes T2-1, T2-2, T2-3, and T2-4.

As described above, the touch sensor TS illustrated in FIGS. 49 and 50 is similar to the touch sensor TS illustrated in FIGS. 47 and 48 except that signals are applied to the 1-1-th to 1-3-th sub-touch electrodes T1-1, T1-2, and T1-3 of the first touch electrode T1 at both ends of each of the sub-touch electrodes.

Figure 51:
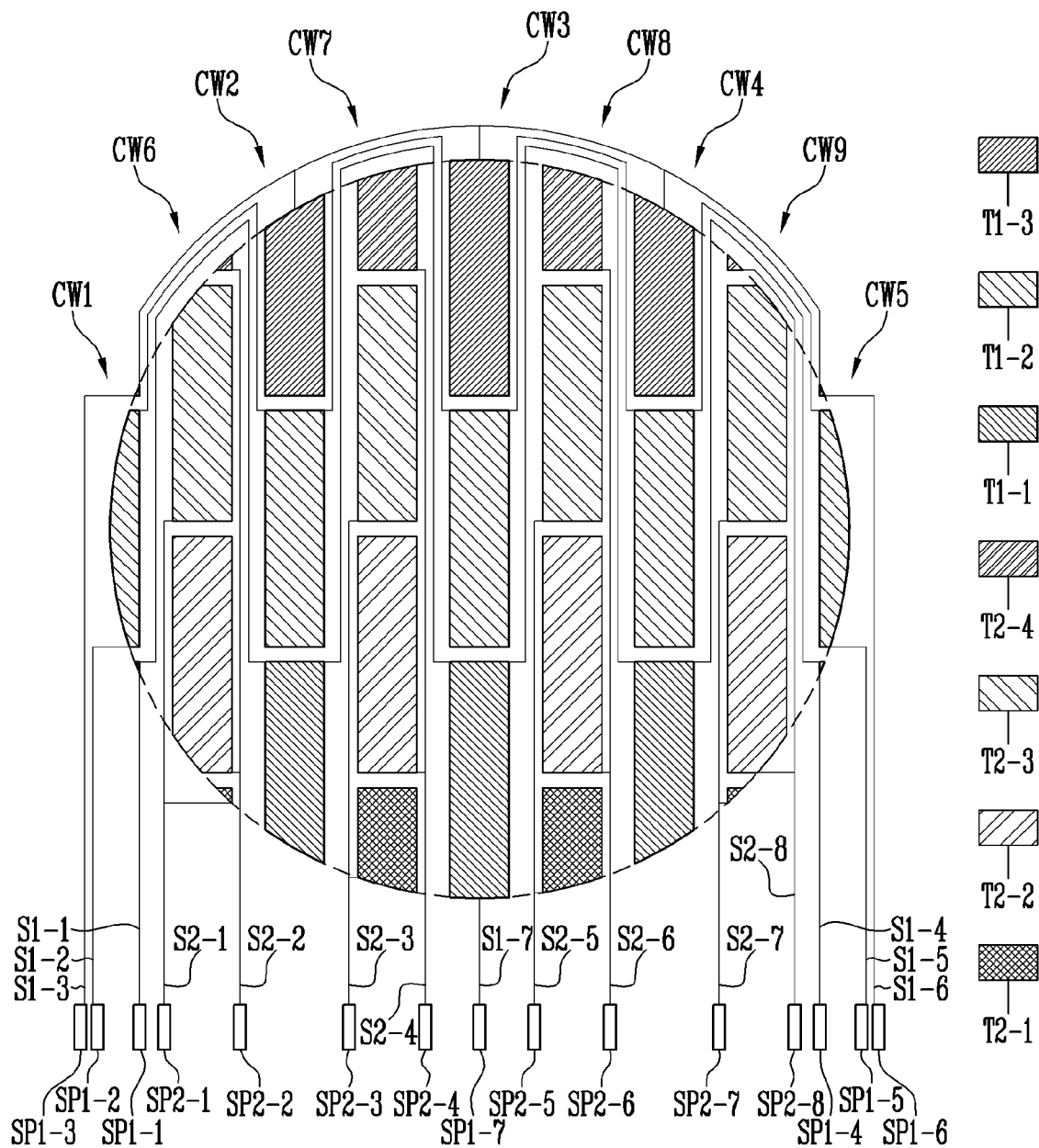
FIGS. 51 and 52 are plan views of yet other exemplary embodiments of the touch sensor constructed according to the principles of the invention.
Figure 52:
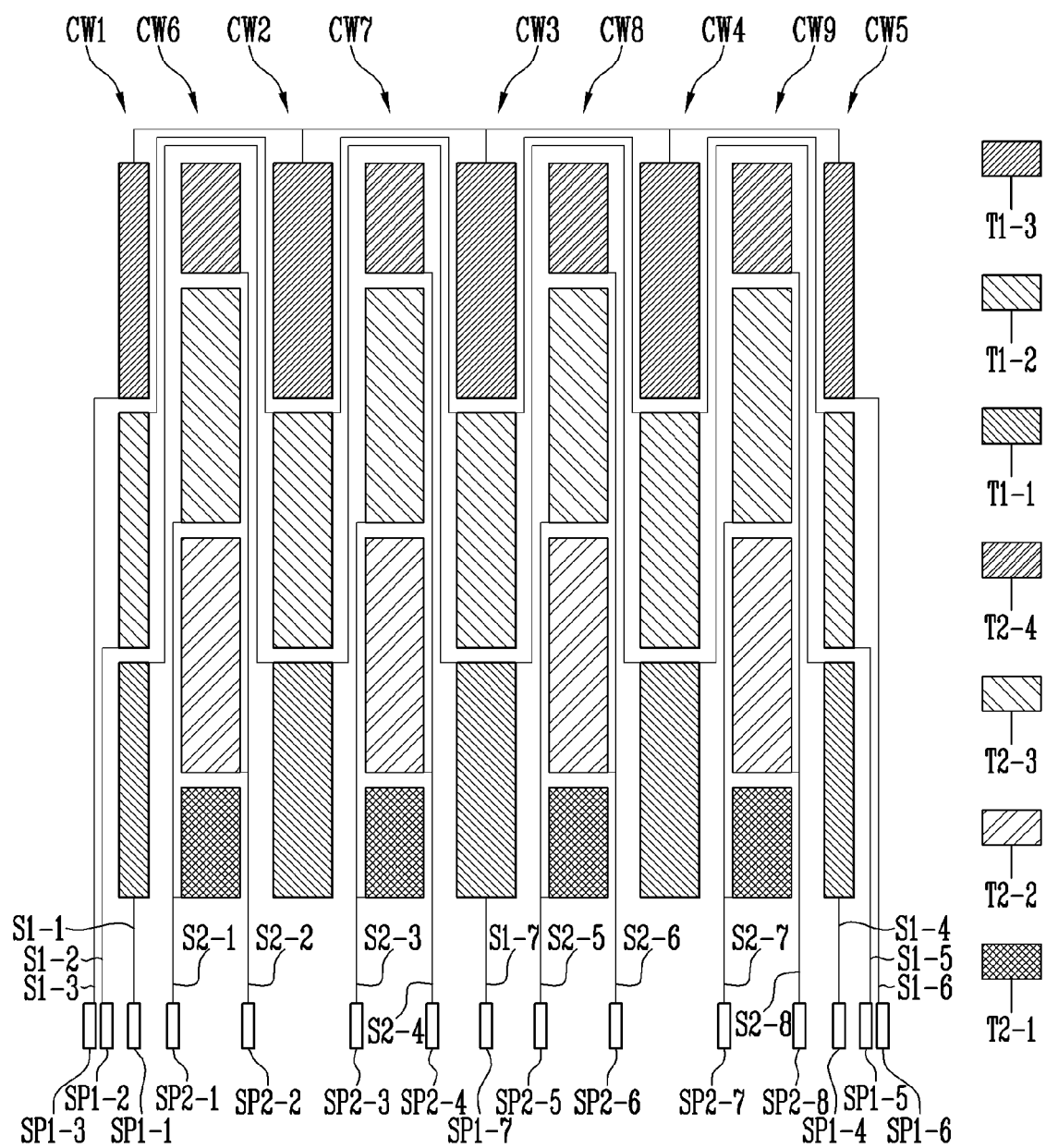

FIGS. 51 and 52 are plan views of yet other exemplary embodiments of the touch sensor constructed according to the principles of the invention.

Referring to FIGS. 51 and 52, the touch sensor TS may include a sensing area SA and a non-sensing area NSA, wherein the sensing area SA may have a generally circular or generally rectangular shape.

In the sensing area SA, a first touch electrode T1 and a second touch electrode T2 may be provided. Each of the first touch electrode T1 and the second touch electrode T2 may include a plurality of touch electrode columns arranged in the form of columns.

The first touch electrode T1 may include first to fifth touch electrode columns CW1, CW2, CW3, CW4, and CW5. Each of the first to fifth touch electrode columns CW1, CW2, CW3, CW4, and CW5 may include a plurality of sub-touch electrodes. For example, the first to fifth touch electrode columns CW1, CW2, CW3, CW4, and CW5 may include 1-1-th to 1-3-th sub-touch electrodes T1-1, T1-2, and T1-3.

In the first to fifth touch electrode columns CW1, CW2, CW3, CW4, and CW5, the same sub-touch electrodes may be coupled to the same signal line. This configuration is described in detail below. The 1-1-th sub-touch electrodes T1-1 of the first to fifth touch electrode columns CW1, CW2, CW3, CW4, and CW5 may be coupled to a 1-1-th signal line S1-1, and the 1-1-th signal line S1-1 may be coupled to a 1-1-th signal pad SP1-1. The 1-2-th sub-touch electrodes T1-2 of the first to fifth touch electrode columns CW1, CW2, CW3, CW4, and CW5 may be coupled to a 1-2-th signal line S1-2, and the 1-2-th signal line S1-2 may be coupled to a 1-2-th signal pad SP1-2. The 1-3-th sub-touch electrodes T1-3 of the first to fifth touch electrode columns CW1, CW2, CW3, CW4, and CW5 may be coupled to a 1-3-th signal line S1-3, and the 1-3-th signal line S1-3 may be coupled to a 1-3-th signal pad SP1-3. Further, the 1-1-th to 1-3-th signal pads SP1-1, SP1-2, and SP1-3 may be arranged on one side of the non-sensing area NSA, for example, in a portion adjacent to the first touch electrode column CW1.

The 1-1-th to 1-3-th sub-touch electrodes T1-1, T1-2, and T1-3 of the fifth touch electrode column CW5 may be coupled not only to the 1-1-th to 1-3-th signal lines, but also to the 1-4-th to 1-6-th signal lines S1-4, S1-5, and S1-6. The 1-4-th to 1-6-th signal lines S1-4, S1-5, and S1-6 may be coupled to 1-4-th to 1-6-th signal pads SP1-4, SP1-5, and SP1-6, respectively. The 1-4-th to 1-6-th signal pads SP1-4, SP1-5, and SP1-6 may be arranged on the other side of the non-sensing area NSA, for example, in a portion adjacent to the fifth touch electrode column CW5.

Therefore, signals may be applied to the 1-1-th to 1-3-th sub-touch electrodes T1-1, T1-2, and T1-3 of the first to fifth touch electrode columns CW1, CW2, CW3, CW4, and CW5 at both ends of each of the sub-touch electrodes through the 1-1-th to 1-3-th signal pads SP1-1, SP1-2, and SP1-3 and the 1-4-th to 1-6-th signal pads SP1-4, SP1-5, and SP1-6.

Further, the 1-1-th sub-touch electrode T1-1 of the third touch electrode column CW3 may be coupled not only to the 1-1-th signal line S1-1 and the 1-4-th signal line S1-4, but also to the 1-7-th signal line S1-7. The 1-7-th signal line S1-7 may be coupled to a 1-7-th signal pad SP1-7. Therefore, the 1-1-th sub-touch electrode T1-1 may be supplied with signals through the 1-1-th signal pad SP1-1, the 1-4-th signal pad SP1-4, and the 1-7-th signal pad SP1-7.

The second touch electrode T2 may include sixth to ninth touch electrode columns CW6, CW7, CW8, and CW9 disposed between touch electrode columns adjacent to each other, among the first to fifth touch electrode columns CW1, CW2, CW3, CW4, and CW5. Each of the sixth to ninth touch electrode columns CW6, CW7, CW8, and CW9, and CW5 may include a plurality of sub-touch electrodes. Each of the sixth to ninth touch electrode columns CW6, CW7, CW8, and CW9 may include 2-1-th to 2-4-th sub-touch electrodes T2-1, T2-2, T2-3, and T2-4.

The touch sensor TS illustrated in FIGS. 51 and 52 may enable the number of signal lines to be reduced compared to the case where signal lines are separately coupled to respective sub-touch electrodes. Also, as the number of signal lines is reduced, the number of signal pads may also be reduced FIGS. 53 and 54 are plan views of yet still other exemplary embodiments of the touch sensor constructed according to the principles of the invention.

Figure 53:
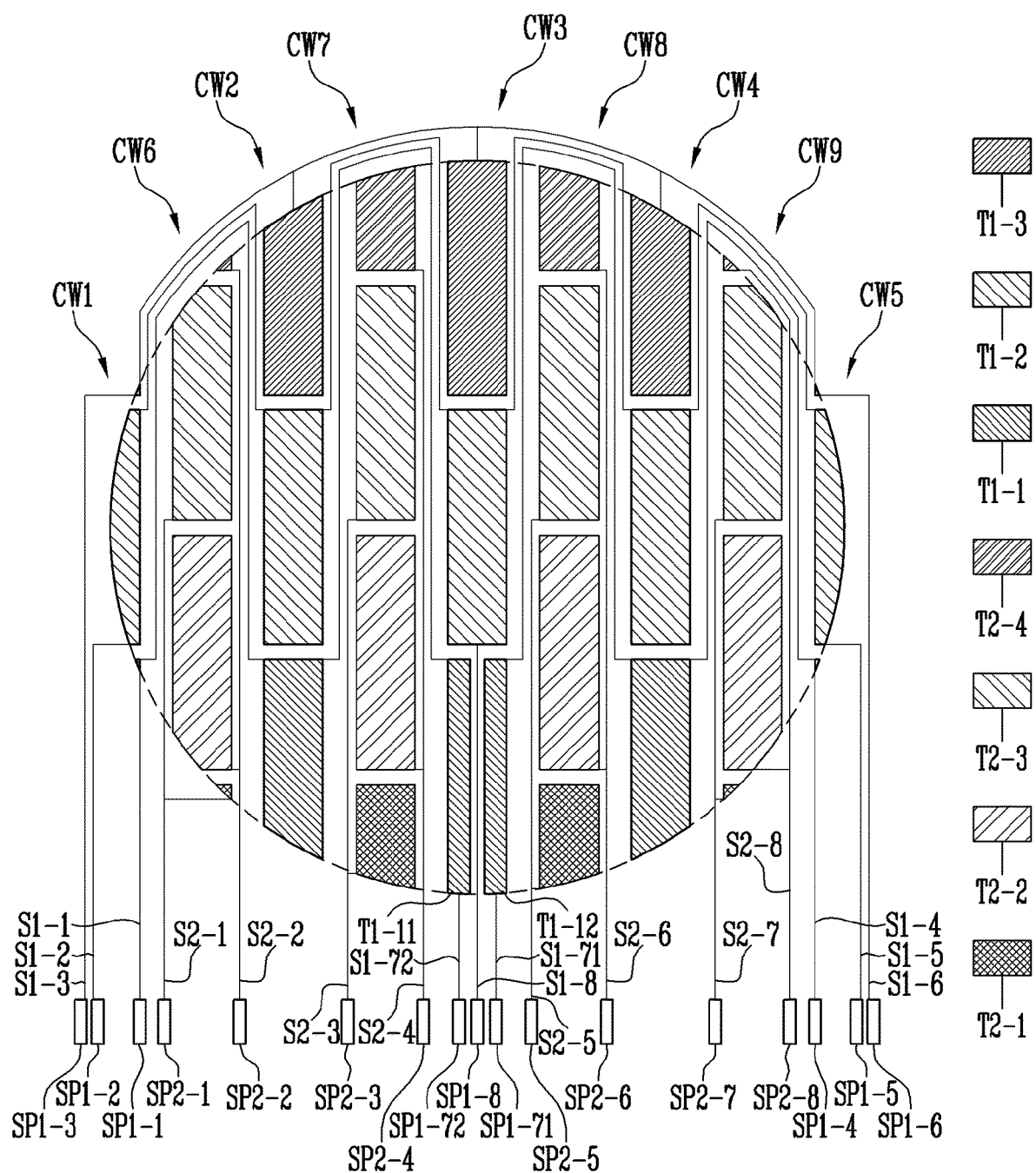
FIGS. 53 and 54 are plan views of yet still other exemplary embodiments of the touch sensor constructed according to the principles of the invention.
Figure 54:
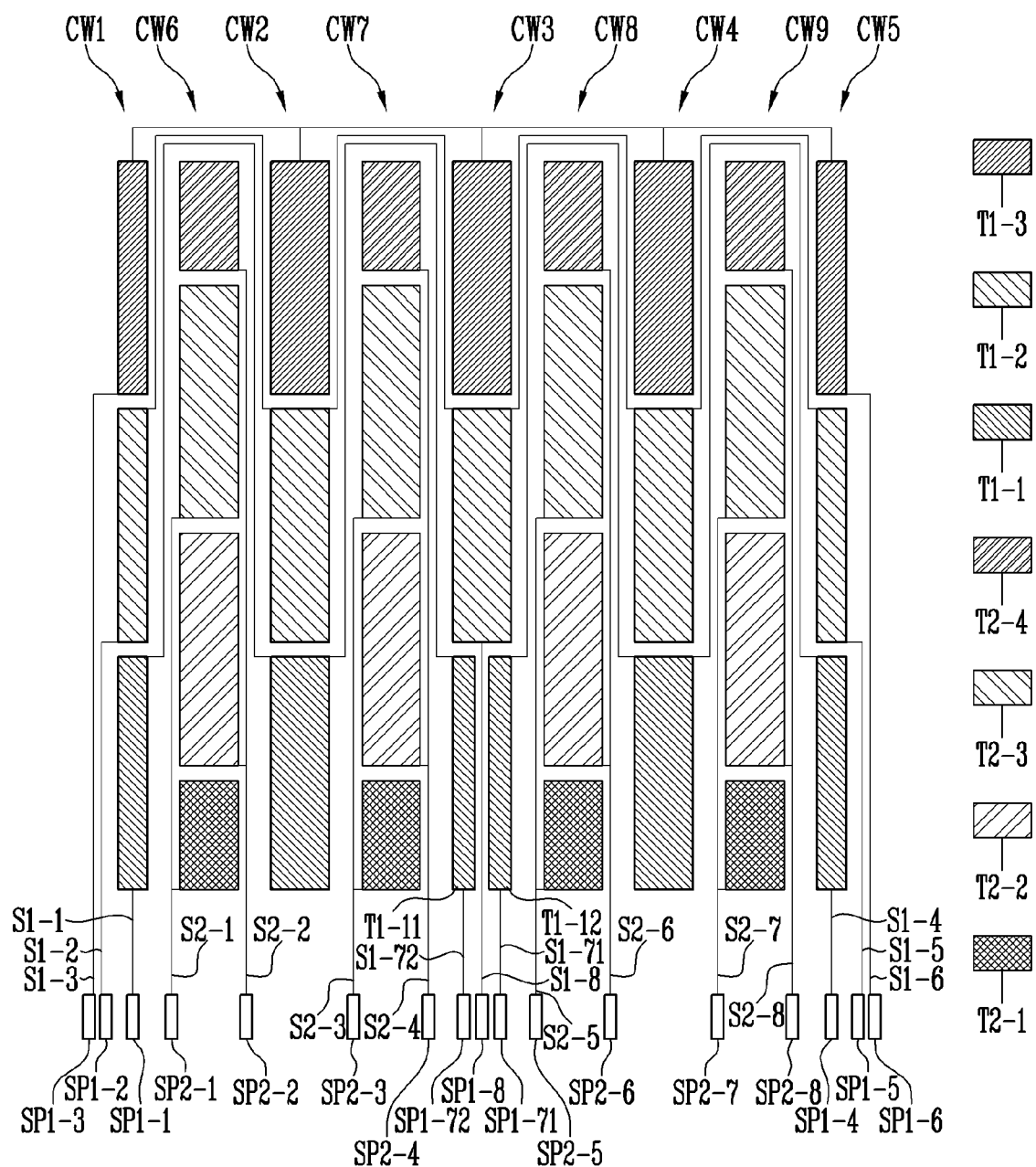

Referring to FIGS. 53 and 54, the touch sensor TS may include a sensing area SA and a non-sensing area NSA, wherein the sensing area SA may have a generally circular or generally rectangular shape.

In the sensing area SA, a first touch electrode T1 and a second touch electrode T2 may be provided. Each of the first touch electrode T1 and the second touch electrode T2 may include a plurality of touch electrode columns arranged in the form of columns.

The first touch electrode T1 may include first to fifth touch electrode columns CW1, CW2, CW3, CW4, and CW5. Each of the first to fifth touch electrode columns CW1, CW2, CW3, CW4, and CW5 may include a plurality of sub-touch electrodes. For example, the first to fifth touch electrode columns CW1, CW2, CW3, CW4, and CW5 may include 1-1-th to 1-3-th sub-touch electrodes T1-1, T1-2, and T1-3.

In the first to fifth touch electrode columns CW1, CW2, CW3, CW4, and CW5, the same sub-touch electrodes may be coupled to the same signal line. This configuration is described in detail below. The 1-1-th sub-touch electrodes T1-1 of the first to fifth touch electrode columns CW1, CW2, CW3, CW4, and CW5 may be coupled to a 1-1-th signal line S1-1, and the 1-1-th signal line S1-1 may be coupled to a 1-1-th signal pad SP1-1. The 1-2-th sub-touch electrodes T1-2 of the first to fifth touch electrode columns CW1, CW2, CW3, CW4, and CW5 may be coupled to a 1-2-th signal line S1-2, and the 1-2-th signal line S1-2 may be coupled to a 1-2-th signal pad SP1-2. The 1-3-th sub-touch electrodes T1-3 of the first to fifth touch electrode columns CW1, CW2, CW3, CW4, and CW5 may be coupled to a 1-3-th signal line S1-3, and the 1-3-th signal line S1-3 may be coupled to a 1-3-th signal pad SP1-3. Further, the 1-1-th to 1-3-th signal pads SP1-1, SP1-2, and SP1-3 may be arranged on one side of the non-sensing area NSA, for example, in a portion adjacent to the first touch electrode column CW1.

The 1-1-th sub-touch electrode T1-1 of the third touch electrode CW3 may include a 1-11-th sub-touch electrode T1-11 and a 1-12-th sub-touch electrode T1-12 which are spaced apart from each other. The 1-11-th sub-touch electrode T1-11 may be electrically coupled to the 1-1-th sub-touch electrodes T1-1 of the first touch electrode column CW1 and the second touch electrode column CW2 through the 1-1-th signal line S1-1. Also, a 1-72-th signal line S1-72, together with the 1-1-th signal line S1-1, may be coupled to the 1-11-th sub-touch electrode T1-11. The 1-72-th signal line S1-72 may be coupled to a 1-72-th signal pad SP1-72. Therefore, the 1-11-th sub-touch electrode T1-11 may be supplied with signals through the 1-1-th signal pad SP1-1 and the 1-72-th signal pad SP1-72.

The 1-12-th sub-touch electrode T1-12 may be electrically coupled to the 1-1-th sub-touch electrodes T1-1 of the fourth touch electrode column CW4 and the fifth touch electrode column CW5 through a 1-4-th signal line S1-4. Also, a 1-71-th signal line S1-71, together with the 1-4-th signal line S1-4, may be coupled to the 1-12-th sub-touch electrode T1-12. The 1-71-th signal line S1-71 may be coupled to a 1-71-th signal pad SP1-71. Therefore, the 1-12-th sub-touch electrode T1-12 may be supplied with signals through the 1-4-th signal pad SP1-4 and the 1-71-th signal pad SP1-71.

The 1-2-th and 1-3-th sub-touch electrodes T1-2 and T1-3 of the fifth touch electrode column CW5 may be coupled not only to the 1-2-th and 1-3-th signal lines, but also to the 1-5-th and 1-6-th signal lines S1-5 and S1-6. The 1-5-th and 1-6-th signal lines S1-5 and S1-6 may be coupled to 1-5-th and 1-6-th signal pads SP1-5 and SP1-6, respectively. Therefore, signals may be applied to the 1-2-th and 1-3-th sub-touch electrodes T1-2 and T1-3 of the first to fifth touch electrode columns CW1, CW2, CW3, CW4, and CW5 at both ends of each of the sub-touch electrodes T1-2 and T1-3 through the 1-2-th and 1-3-th signal pads SP1-2 and SP1-3 and the 1-5-th and 1-6-th signal pads SP1-5 and SP1-6.

In addition, a 1-8-th signal line S1-8, together with the 1-2-th signal line S1-2, may be coupled to the 1-2-th sub-touch electrode T1-2 of the third touch electrode column CW3. The 1-8-th signal line S1-8 may be coupled to a 1-8-th signal pad SP1-8. Therefore, the 1-2-th sub-touch electrode T1-2 may be supplied with signals through the 1-2-th signal pad SP1-2, the 1-5-th signal pad SP1-5, and the 1-8-th signal pad SP1-8. Also, the 1-8-th signal line S1-8 may pass through space between the 1-11-th sub-touch electrode T1-11 and the 1-12-th sub-touch electrode T1-12.

The second touch electrode T2 may include sixth to ninth touch electrode columns CW6, CW7, CW8, and CW9 disposed between touch electrode columns adjacent to each other, among the first to fifth touch electrode columns CW1, CW2, CW3, CW4, and CW5. Each of the sixth to ninth touch electrode columns CW6, CW7, CW8, and CW9, and CW5 may include a plurality of sub-touch electrodes. Each of the sixth to ninth touch electrode columns CW6, CW7, CW8, and CW9 may include 2-1-th to 2-4-th sub-touch electrodes T2-1, T2-2, T2-3, and T2-4.

The touch sensor TS illustrated in FIGS. 53 and 54 may enable the number of signal lines to be reduced compared to the case where signal lines are separately coupled to respective sub-touch electrodes. Also, as the number of signal lines is reduced, the number of signal pads may also be reduced.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A touch sensor for a display device, the touch sensor comprising:
    a sensing area having a closed shape and including a plurality of sections, and a non-sensing area at least partially surrounding the sensing area;
    first touch electrodes disposed in the sensing area; and
    second touch electrodes disposed in the sensing area,
    wherein the first touch electrodes comprise first groups of first sub-touch electrodes, and first sub-touch electrodes of at least some of the first groups are spaced at a first substantially equal distance from a center of the closed shape,
    wherein the second touch electrodes comprise second groups of second sub-touch electrodes, and second sub-touch electrodes of at least some of the second groups are spaced at a second substantially equal distance from the center of the closed shape,
    wherein at least some of the first groups of first sub-touch electrodes form a first ring, and at least some of the second groups of second sub-touch electrodes form a second ring,
    wherein the second sub-touch electrodes of the second groups are disposed in the sections, at least some of the second sub-touch electrodes of the second ring adjacent to a boundary between the sections are integral with each other, and other ones of the second sub-touch electrodes of the second ring spaced at a third substantially equal distance along the second ring from the boundary between the sections are coupled to a first signal line.

2. The touch sensor according to claim 1, wherein the first sub-touch electrodes of the first groups disposed in each of the sections are connected to receive a common signal.

3. The touch sensor according to claim 2, further comprising coupling pads disposed in the non-sensing area,
wherein the first sub-touch electrodes of the first groups are respectively coupled to second signal lines, and the second signal lines coupled to the first sub-touch electrodes of the first groups disposed in each of the sections are electrically coupled to one of the coupling pads.

4. The touch sensor according to claim 3, wherein the closed shape comprises a closed curve and the sections comprise partition regions and wherein:
the partition regions include first to fourth partition regions;
the first sub-touch electrodes of the first groups include one or more of 1-1-th sub-touch electrodes, one or more of 1-2-th sub-touch electrodes, one or more of 1-3-th sub-touch electrodes, and one or more of 1-4-th sub-touch electrodes in each of the first to fourth partition regions; and
numbers of the one or more of 1-1-th sub-touch electrodes, the one or more of 1-2-th sub-touch electrodes, the one or more of 1-3-th sub-touch electrodes, and the one or more of 1-4-th sub-touch electrodes are identical to each other.

5. The touch sensor according to claim 4, wherein:
in one of the first touch electrodes and one of the second touch electrodes corresponding to each other, a number of the second sub-touch electrodes of the second groups is greater than a number of the first sub-touch electrodes of the first groups, and
the numbers of the second sub-touch electrodes of the second groups are different from each other.

6. The touch sensor according to claim 5, wherein a number of second sub-touch electrodes of one of the second groups is greater than a number of second sub-touch electrodes of another one of the second groups closer to the center than the one of the second groups.

7. A display device, comprising:
a display panel; and
a touch sensor disposed on the display panel,
wherein the touch sensor comprises:
a sensing area having a closed shape and including a plurality of sections, and a non-sensing area at least partially surrounding the sensing area;
first touch electrodes disposed in the sensing area; and
second touch electrodes disposed in the sensing area,
wherein the first touch electrodes comprise first groups of first sub-touch electrodes, and first sub-touch electrodes of at least some of the first groups are spaced at a first substantially equal distance from a center of the closed shape,
wherein the second touch electrodes comprise second groups of second sub-touch electrodes, and second sub-touch electrodes of at least some of the second groups are spaced at a second substantially equal distance from the center of the closed shape,
wherein at least some of the first groups of first sub-touch electrodes form a first ring, and at least some of the second groups of second sub-touch electrodes form a second ring, and
wherein the second sub-touch electrodes of the second groups are disposed in the sections, at least some of the second sub-touch electrodes of the second ring adjacent to a boundary between the sections are integral with each other, and other ones of the second sub-touch electrodes of the second ring spaced at a third substantially equal distance along the second ring from the boundary between the sections are coupled to a first signal line.

8. The display device according to claim 7, wherein the first sub-touch electrodes of the first groups disposed in each of the sections are connected to receive a common signal.

9. The display device according to claim 8, further comprising coupling pads disposed in the non-sensing area,
wherein the first sub-touch electrodes of the first groups are respectively coupled to second signal lines, and the second signal lines coupled to the first sub-touch electrodes of the first groups disposed in each of the sections are electrically coupled to one of the coupling pads.

10. The display device according to claim 9, wherein the closed shape comprises a closed curve and the sections comprise partition regions and wherein:
the partition regions includes first to fourth partition regions;
the first sub-touch electrodes of the first groups include one or more of 1-1-th sub-touch electrodes, one or more of 1-2-th sub-touch electrodes, one or more of 1-3-th sub-touch electrodes, and one or more of 1-4-th sub-touch electrodes in each of the first to fourth partition regions;
numbers of the one or more of 1-1-th sub-touch electrodes, the one or more of 1-2-th sub-touch electrodes, the one or more of 1-3-th sub-touch electrodes, and the one or more of 1-4-th sub-touch electrodes are identical to each other;
in one of the first touch electrodes and one of the second touch electrodes corresponding to each other, a number of the second sub-touch electrodes of the second groups is greater than a number of the first sub-touch electrodes of the first groups; and
the numbers of the second sub-touch electrodes of the second groups are different from each other.

11. A touch sensor for a display device, the touch sensor comprising:
a sensing area having a closed curve shape and a non-sensing area at least partially surrounding the sensing area;
a first touch electrode disposed in the sensing area; and
a second touch electrode disposed in the sensing area,
wherein the first touch electrode comprises a plurality of first sub-touch electrodes in the form of first generally concentric circles, and each of the first sub-touch electrodes includes a plurality of first touch patterns,
wherein the second touch electrode comprises a plurality of second sub-touch electrodes in the form of second generally concentric circles corresponding to and concentric with the first concentric circles, and each of the second sub-touch electrodes includes a plurality of second touch patterns,
wherein the second touch patterns of at least one of the second sub-touch electrodes comprises touch pattern pairs each arranged on both sides of one of the first touch patterns of a corresponding one of the first sub-touch electrodes,
wherein the first sub-touch electrodes comprise 1-1-th to 1-3-th sub-touch electrodes,
wherein the 1-1-th sub-touch electrode includes a plurality of 1-1-th touch patterns electrically coupled to each other through a 1-1-th signal line,
wherein the 1-2-th sub-touch electrode includes a plurality of 1-2-th touch patterns electrically coupled to each other through a 1-2-th signal line, wherein the 1-3-th sub-touch electrode includes a plurality of 1-3-th touch patterns electrically coupled to each other through a 1-3-th signal line, wherein the second sub-touch electrodes comprise 2-1-th to 2-3-th sub-touch electrodes, wherein the second touch patterns of the 2-1-th sub-touch electrode includes a plurality of first touch pattern pairs, and each of the first touch pattern pairs of the 2-1-th sub-touch electrode is arranged on both sides of a corresponding one of the 1-1-th touch patterns, wherein the second touch patterns of the 2-2-th sub-touch electrode includes a plurality of second touch pattern pairs, and each of the second touch pattern pairs of the 2-2-th sub-touch electrode is arranged on both sides of a corresponding one of the 1-2-th touch patterns, and wherein the second touch patterns of the 2-3-th sub-touch electrode includes a plurality of third touch pattern pairs, and each of the third touch pattern pairs of the 2-3-th sub-touch electrode is arranged on both sides of a corresponding one of the 1-3-th touch patterns.

12. The touch sensor according to claim 11, wherein:
a number of the 1-1-th touch patterns is greater than a number of the 1-2-th touch patterns and the number of the 1-2-th touch patterns is greater than a number of the 1-3-th touch patterns, and
a number of the first touch pattern pairs of the 2-1-th sub-touch electrode is identical to the number of the 1-1-th touch patterns, a number of the second touch pattern pairs of the 2-2 sub-touch electrode is identical to the number of the 1-2-th touch patterns, and a number of the third touch pattern pairs of the 2-3-th sub-touch electrode is identical to the number of the 1-3-th touch patterns.

13. The touch sensor according to claim 11, wherein:
the 1-1-th sub-touch electrode includes a 1-11-th sub-touch electrode and a 1-12-th sub-touch electrode,
the 1-11-th sub-touch electrode includes a plurality of 1-11-th touch patterns electrically coupled to each other through a 1-11-th signal line, and
the 1-12-th sub-touch electrode includes a plurality of 1-12-th touch patterns electrically coupled to each other through a 1-12-th signal line.

14. The touch sensor according to claim 11, wherein:
the 1-1-th sub-touch electrode includes a 1-11-th sub-touch electrode and a 1-12-th sub-touch electrode, wherein the 1-11-th sub-touch electrode includes a plurality of 1-11 touch patterns electrically coupled to each other through a 1-11-th signal line, and the 1-12-th sub-touch electrode includes a plurality of 1-12-th touch patterns electrically coupled to each other through a 1-12-th signal line, and
the 1-2-th sub-touch electrode includes a 1-21-th sub-touch electrode and a 1-22-th sub-touch electrode, wherein the 1-21-th sub-touch electrode includes a plurality of 1-21 touch patterns electrically coupled to each other through a 1-21-th signal line and the 1-22-th sub-touch electrode includes a plurality of 1-22-th touch patterns electrically coupled to each other through a 1-22-th signal line.

15. A display device, comprising:
a display panel; and
a touch sensor disposed on the display panel,
wherein the touch sensor comprises:
a sensing area having a closed curve shape and a non-sensing area at least partially surrounding the sensing area;
a first touch electrode disposed in the sensing area; and
a second touch electrode disposed in the sensing area,
wherein the first touch electrode comprises a plurality of first sub-touch electrodes in the form of first generally concentric circles, and each of the first sub-touch electrodes includes a plurality of first touch patterns,
wherein the second touch electrode comprises a plurality of second sub-touch electrodes in the form of second generally concentric circles corresponding to and concentric with the first concentric circles, and each of the second sub-touch electrodes includes a plurality of second touch patterns, and
wherein the second touch patterns of at least one of the second sub-touch electrodes comprises touch pattern pairs each arranged on both sides of one of the first touch patterns of a corresponding one of the first sub-touch electrodes,
wherein the first sub-touch electrodes comprise 1-1-th to 1-3-th sub-touch electrodes,
wherein the 1-1-th sub-touch electrode includes a plurality of 1-1-th touch patterns electrically coupled to each other through a 1-1-th signal line,
wherein the 1-2-th sub-touch electrode includes a plurality of 1-2-th touch patterns electrically coupled to each other through a 1-2-th signal line,
wherein the 1-3-th sub-touch electrode includes a plurality of 1-3-th touch patterns electrically coupled to each other through a 1-3-th signal line,
wherein the second sub-touch electrodes comprise 2-1-th to 2-3-th sub-touch electrodes,
wherein the second touch patterns of the 2-1-th sub-touch electrode includes a plurality of first touch pattern pairs, and each of the first touch pattern pairs of the 2-1-th sub-touch electrode is arranged on both sides of a corresponding one of the 1-1-th touch patterns,
wherein the second touch patterns of the 2-2-th sub-touch electrode includes a plurality of second touch pattern pairs, and each of the second touch pattern pairs of the 2-2-th sub-touch electrode is arranged on both sides of a corresponding one of the 1-2-th touch patterns, and
wherein the second touch patterns of the 2-3-th sub-touch electrode includes a plurality of third touch pattern pairs, and each of the third touch pattern pairs of the 2-3-th sub-touch electrode is arranged on both sides of a corresponding one of the 1-3-th touch patterns.

16. The display device according to claim 15, wherein:
a number of the 1-1-th touch patterns is greater than a number of the 1-2-th touch patterns and the number of the 1-2-th touch patterns is greater than a number of the 1-3-th touch patterns, and
a number of the first touch pattern pairs of the 2-1-th sub-touch electrode is identical to the number of the 1-1-th touch patterns, a number of the second touch pattern pairs of the 2-2 sub-touch electrode is identical to the number of the 1-2-th touch patterns, and a number of the third touch pattern pairs of the 2-3-th sub-touch electrode is identical to the number of the 1-3-th touch patterns.

17. The display device according to claim 15, wherein:
the 1-1-th sub-touch electrode includes a 1-11-th sub-touch electrode and a 1-12-th sub-touch electrode,
the 1-11-th sub-touch electrode includes a plurality of 1-11-th touch patterns electrically coupled to each other through a 1-11-th signal line, and
the 1-12-th sub-touch electrode includes a plurality of 1-12-th touch patterns electrically coupled to each other through a 1-12-th signal line.

18. The display device according to claim 15, wherein:
the 1-1-th sub-touch electrode includes a 1-11-th sub-touch electrode and a 1-12-th sub-touch electrode, wherein the 1-11-th sub-touch electrode includes a plurality of 1-11 touch patterns electrically coupled to each other through a 1-11-th signal line, and the 1-12-th sub-touch electrode includes a plurality of 1-12-th touch patterns electrically coupled to each other through a 1-12-th signal line, and the 1-2-th sub-touch electrode includes a 1-21-th sub-touch electrode and a 1-22-th sub-touch electrode, wherein the 1-21-th sub-touch electrode includes a plurality of 1-21 touch patterns electrically coupled to each other through a 1-21-th signal line and the 1-22-th sub-touch electrode includes a plurality of 1-22-th touch patterns electrically coupled to each other through a 1-22-th signal line.

19. A touch sensor for a display device, the touch sensor comprising:
a sensing area having a closed shape and a non-sensing area at least partially surrounding the sensing area; and
a first touch electrode and a second touch electrode disposed in the sensing area,
wherein the first touch electrode comprises a plurality of first columns, each including a plurality of first sub-touch electrodes,
wherein the second touch electrode comprises a plurality of second columns each including a plurality of second sub-touch electrodes and arranged alternately with the first columns,
wherein the first sub-touch electrodes of the first columns are arranged in rows, and some of the first sub-touch electrodes of the first columns arranged in one of the rows are electrically coupled to each other,
wherein, in at least one of the second columns, some of the second sub-touch electrodes spaced apart from each other with another one of the second sub-touch electrodes therebetween are electrically coupled to each other, and
wherein the second columns comprise 2-1-th to 2-4-th touch electrode columns, each including 2-1-th to 2-4-th sub-touch electrodes of the second sub-touch electrodes;
in the 2-1-th touch electrode column, the 2-1-th sub-touch electrode and the 2-3-th sub-touch electrode are coupled to a 2-1-th signal line, and the 2-2-th sub-touch electrode and the 2-4-th sub-touch electrode are coupled to a 2-2-th signal line;
in the 2-2-th touch electrode column, the 2-1-th sub-touch electrode and the 2-3-th sub-touch electrode are coupled to a 2-3-th signal line, and the 2-2-th sub-touch electrode and the 2-4-th sub-touch electrode are coupled to a 2-4-th signal line;
in the 2-3-th touch electrode column, the 2-1-th sub-touch electrode and the 2-3-th sub-touch electrode are coupled to a 2-5-th signal line, and the 2-2-th sub-touch electrode and the 2-4-th sub-touch electrode are coupled to a 2-6-th signal line; and
in the 2-4-th touch electrode column, the 2-1-th sub-touch electrode and the 2-3-th sub-touch electrode are coupled to a 2-7-th signal line, and the 2-2-th sub-touch electrode and the 2-4-th sub-touch electrode are coupled to a 2-8-th signal line.

20. The touch sensor according to claim 19, wherein:
the closed shape comprises a closed curve;
the first columns comprise 1-1-th to 1-5-th touch electrode columns, each including 1-1-th to 1-3-th sub-touch electrodes of the first sub-touch electrodes; and
the 1-1-th to 1-3-th sub-touch electrodes are coupled to 1-1-th to 1-3-th signal lines, respectively.

21. The touch sensor according to claim 20, further comprising:
1-4-th to 1-6-th signal lines respectively coupled to the 1-1-th to 1-3-th sub-touch electrodes in the 1-5-th touch electrode column.

22. The touch sensor according to claim 21, further comprising:
a 1-7-th signal line coupled to the 1-1-th sub-touch electrode in the 1-3-th touch electrode column.

23. The touch sensor according to claim 21, wherein:
the 1-1-th sub-touch electrode in the 1-3-th touch electrode column includes a 1-11-th sub-touch electrode and a 1-12-th sub-touch electrode spaced apart from each other,
the 1-11-th sub-touch electrode is coupled to a 1-71-th signal line, and the 1-12-th sub-touch electrode is coupled to a 1-72-th signal line, and
the 1-11-th sub-touch electrode is electrically coupled to the 1-1-th sub-touch electrodes in the 1-1-th and 1-2-th touch electrode columns, and the 1-12-th sub-touch electrode is electrically coupled to the 1-1-th sub-touch electrodes in the 1-4-th and 1-5-th touch electrode columns.

24. The touch sensor according to claim 23, further comprising:
a 1-8-th signal line coupled to the 1-2-th sub-touch electrode in the 1-3-th touch electrode column,
wherein the 1-8-th signal line passes through a space between the 1-11-th sub-touch electrode and the 1-12-th sub-touch electrode.

* * * * *